(12) United States Patent
Rudakevych et al.

(10) Patent No.: US 8,375,838 B2
(45) Date of Patent: Feb. 19, 2013

(54) REMOTE DIGITAL FIRING SYSTEM

(75) Inventors: Pavlo E. Rudakevych, Arroyo Grande, CA (US); Mike E. Ciholas, Evansville, IN (US); Robert Pack, Nashua, NH (US)

(73) Assignee: iRobot Corporation, Bedford, MA (US)

( * ) Notice: Subject to any disclaimer, the term of this patent is extended or adjusted under 35 U.S.C. 154(b) by 1106 days.

(21) Appl. No.: 11/776,722

(22) Filed: Jul. 12, 2007

(65) Prior Publication Data

US 2008/0121097 A1    May 29, 2008

Related U.S. Application Data

(63) Continuation-in-part of application No. 11/347,557, filed on Feb. 3, 2006, now Pat. No. 7,559,269, which is a continuation-in-part of application No. 11/024,243, filed on Dec. 28, 2004, now Pat. No. 7,143,696, which is a continuation of application No. 10/319,853, filed on Dec. 13, 2002, now Pat. No. 6,860,206.

(60) Provisional application No. 60/340,175, filed on Dec. 14, 2001.

(51) Int. Cl.
F41A 19/00 (2006.01)
(52) U.S. Cl. ........ 89/27.11; 89/41.01; 89/1.11; 700/245
(58) Field of Classification Search ............... 89/27.11, 89/41.01, 1.11; 102/206; 700/245; 701/1, 701/2; 235/404
See application file for complete search history.

(56) References Cited

U.S. PATENT DOCUMENTS

| | | | |
|---|---|---|---|
| 3,711,638 A * | 1/1973 | Davies ............................ 348/143 |
| 3,828,458 A * | 8/1974 | Skone-Palmer ............... 42/69.01 |
| 3,888,181 A | 6/1975 | Kups |
| 4,012,860 A * | 3/1977 | Auger ................................ 42/94 |
| 4,196,653 A * | 4/1980 | Jackson ......................... 89/136 |
| 4,205,589 A * | 6/1980 | Engler et al. ................. 89/41.07 |
| 4,234,850 A | 11/1980 | Collins |
| 4,253,132 A | 2/1981 | Cover |
| 4,256,013 A * | 3/1981 | Quitadama ................. 89/41.05 |
| 4,674,047 A | 6/1987 | Tyler et al. |
| 4,682,435 A * | 7/1987 | Heltzel ........................ 42/70.01 |
| 4,685,396 A | 8/1987 | Birse et al. |
| 4,718,187 A * | 1/1988 | Blake ................................ 42/84 |
| 4,869,008 A * | 9/1989 | Rasmussen ................. 42/71.01 |
| 4,884,506 A | 12/1989 | Guerreri |
| 5,020,411 A * | 6/1991 | Rowan .......................... 89/1.11 |
| 5,090,321 A | 2/1992 | Abouav |
| 5,272,955 A * | 12/1993 | Bond et al. ................... 89/37.04 |
| 5,359,576 A * | 10/1994 | Bunner et al. ................ 367/197 |
| 5,442,358 A | 8/1995 | Keeler et al. |
| 5,520,114 A | 5/1996 | Guimard et al. |
| 5,563,366 A | 10/1996 | La Mura et al. |
| 5,636,464 A * | 6/1997 | Ciluffo ......................... 42/70.11 |
| 5,764,888 A | 6/1998 | Bolan et al. |
| 5,767,437 A | 6/1998 | Rogers |
| 5,924,232 A * | 7/1999 | Rhoden et al. ............... 42/70.11 |
| 5,949,015 A * | 9/1999 | Smith et al. .................. 89/41.05 |
| 5,953,844 A * | 9/1999 | Harling et al. ............... 42/70.06 |
| 5,966,859 A * | 10/1999 | Samuels ..................... 42/70.11 |
| 6,009,791 A * | 1/2000 | Medlin .............................. 89/38 |

(Continued)

FOREIGN PATENT DOCUMENTS

DE    33 17 376       11/1984
DE    3317376 A1     11/1984
(Continued)

*Primary Examiner* — Michelle Clement
(74) *Attorney, Agent, or Firm* — Myers Bigel Sibley & Sajovec, P.A.

(57) ABSTRACT

An apparatus for weaponizing a mobile robotic platform with a mechanically triggered weapon and a firing circuit provides a weaponized mobile robotic platform, in which the mechanically triggered weapon can be fired in a safe, secure, and controlled manner in response to a single electrical pulse from the firing circuit.

18 Claims, 32 Drawing Sheets

U.S. PATENT DOCUMENTS

| | | | |
|---|---|---|---|
| 6,113,343 A | 9/2000 | Goldenberg et al. | |
| 6,154,694 A | 11/2000 | Aoki et al. | |
| 6,173,651 B1 | 1/2001 | Pathe et al. | |
| 6,174,288 B1* | 1/2001 | Samuels | 600/500 |
| 6,223,461 B1* | 5/2001 | Mardirossian | 42/70.11 |
| 6,237,462 B1* | 5/2001 | Hawkes et al. | 89/41.05 |
| 6,250,194 B1* | 6/2001 | Brandl et al. | 89/1.41 |
| 6,269,730 B1* | 8/2001 | Hawkes et al. | 89/41.05 |
| 6,283,034 B1 | 9/2001 | Miles | |
| 6,286,242 B1* | 9/2001 | Klebes | 42/84 |
| 6,332,400 B1 | 12/2001 | Meyer | |
| 6,412,207 B1* | 7/2002 | Crye et al. | 42/70.06 |
| 6,449,892 B1* | 9/2002 | Jenkins | 42/1.01 |
| 6,490,977 B1 | 12/2002 | Bossarte et al. | |
| 6,535,793 B2 | 3/2003 | Allard | |
| 6,557,104 B2 | 4/2003 | Vu et al. | |
| 6,624,744 B1 | 9/2003 | Wilson et al. | |
| 6,679,158 B1* | 1/2004 | Hawkes et al. | 89/41.05 |
| 6,839,662 B2 | 1/2005 | Schnatterly et al. | |
| 6,860,206 B1* | 3/2005 | Rudakevych et al. | 102/206 |
| 6,951,071 B1* | 10/2005 | Acosta et al. | 42/69.01 |
| 7,047,863 B2* | 5/2006 | Hawkes et al. | 89/37.04 |
| 7,089,844 B2* | 8/2006 | Becker | 89/9 |
| 7,092,867 B2 | 8/2006 | Huang et al. | |
| 7,143,696 B2* | 12/2006 | Rudakevych et al. | 102/215 |
| 7,159,500 B2 | 1/2007 | John et al. | |
| 7,228,261 B2 | 6/2007 | Leonard et al. | |
| 7,275,691 B1 | 10/2007 | Wright et al. | |
| 7,339,456 B1* | 3/2008 | Buckley et al. | 340/5.51 |
| 7,469,623 B1* | 12/2008 | Olcott | 89/27.3 |
| 7,471,216 B2 | 12/2008 | Chen et al. | |
| 7,559,269 B2* | 7/2009 | Rudakevych et al. | 89/27.11 |
| 7,587,854 B2* | 9/2009 | Werner | 42/94 |
| 7,600,339 B2* | 10/2009 | Schumacher et al. | 42/70.01 |
| 7,650,826 B2* | 1/2010 | Son et al. | 89/27.3 |
| 7,748,324 B2* | 7/2010 | Sutcliffe | 102/265 |
| 7,783,387 B2* | 8/2010 | Calcagno | 700/264 |
| 7,788,476 B2* | 8/2010 | McNutt et al. | 713/1 |
| 7,802,511 B2* | 9/2010 | Doll et al. | 89/148 |
| RE41,916 E* | 11/2010 | Bates et al. | 340/10.1 |
| 7,866,247 B2* | 1/2011 | Son et al. | 89/27.3 |
| 7,891,128 B2* | 2/2011 | Brundula et al. | 42/84 |
| 7,905,177 B2* | 3/2011 | Deguire et al. | 102/262 |
| 7,974,736 B2* | 7/2011 | Morin et al. | 700/245 |
| 2001/0033228 A1* | 10/2001 | Kisreman et al. | 340/568.1 |
| 2001/0043509 A1 | 11/2001 | Green et al. | |
| 2001/0045883 A1 | 11/2001 | Holdaway et al. | |
| 2003/0028257 A1* | 2/2003 | Crawford et al. | 700/3 |
| 2003/0074823 A1* | 4/2003 | Golan | 42/77 |
| 2004/0020394 A1* | 2/2004 | Boucher et al. | 102/217 |
| 2004/0050240 A1* | 3/2004 | Greene et al. | 89/41.06 |
| 2004/0241622 A1* | 12/2004 | White | 434/23 |
| 2005/0000382 A1* | 1/2005 | Hummel et al. | 102/200 |
| 2005/0066808 A1* | 3/2005 | Hawkes et al. | 89/41.05 |
| 2005/0172912 A1* | 8/2005 | Crist et al. | 119/720 |
| 2005/0257676 A1* | 11/2005 | Ealovega | 89/28.1 |
| 2005/0262992 A1* | 12/2005 | Becker | 89/1.4 |
| 2006/0011082 A1* | 1/2006 | Jacobson et al. | 102/200 |
| 2006/0027127 A1 | 2/2006 | Cerovic et al. | |
| 2006/0044146 A1* | 3/2006 | Ferguson et al. | 340/679 |
| 2007/0044673 A1* | 3/2007 | Hummel et al. | 102/206 |
| 2007/0051235 A1* | 3/2007 | Hawkes et al. | 89/37.04 |
| 2007/0072662 A1 | 3/2007 | Templeman | |
| 2007/0074438 A1* | 4/2007 | Parhofer et al. | 42/70.01 |
| 2007/0097592 A1 | 5/2007 | Smith | |
| 2007/0105070 A1* | 5/2007 | Trawick | 434/11 |
| 2007/0119326 A1* | 5/2007 | Rudakevych et al. | 102/206 |
| 2007/0124979 A1* | 6/2007 | Newkirk et al. | 42/70.11 |
| 2007/0156286 A1 | 7/2007 | Yamauchi | |
| 2007/0180749 A1* | 8/2007 | Schumacher et al. | 42/70.01 |
| 2007/0186457 A1* | 8/2007 | Pitt | 42/70.06 |
| 2007/0204745 A1* | 9/2007 | Son et al. | 89/27.3 |
| 2007/0209501 A1* | 9/2007 | Ko | 89/40.01 |
| 2007/0261544 A1* | 11/2007 | Philippe | 89/41.05 |
| 2008/0053300 A1* | 3/2008 | Berkovich et al. | 89/40.01 |
| 2008/0083344 A1* | 4/2008 | Deguire et al. | 102/262 |
| 2008/0121097 A1* | 5/2008 | Rudakevych et al. | 89/28.05 |
| 2008/0134555 A1* | 6/2008 | Werner | 42/69.01 |
| 2008/0202326 A1* | 8/2008 | Carroll et al. | 89/38 |
| 2008/0302264 A1* | 12/2008 | Hummel et al. | 102/215 |
| 2008/0307993 A1* | 12/2008 | Chan et al. | 102/214 |
| 2009/0107024 A1* | 4/2009 | Doll et al. | 42/70.01 |
| 2009/0158922 A1* | 6/2009 | Werner | 89/136 |
| 2009/0164045 A1* | 6/2009 | Deguire et al. | 700/259 |
| 2009/0205237 A1* | 8/2009 | Gorali et al. | 42/70.08 |
| 2009/0223104 A1* | 9/2009 | Anzeloni | 42/70.06 |
| 2009/0241763 A1* | 10/2009 | Revord | 89/1.11 |
| 2009/0255160 A1* | 10/2009 | Summers | 42/70.01 |
| 2009/0281676 A1* | 11/2009 | Beavis et al. | 700/295 |
| 2009/0300961 A1* | 12/2009 | Ruhland et al. | 42/1.01 |
| 2010/0083817 A1* | 4/2010 | Son et al. | 89/27.3 |
| 2010/0107464 A1* | 5/2010 | Beckmann et al. | 42/69.01 |
| 2010/0117888 A1* | 5/2010 | Simon | 342/67 |
| 2010/0170411 A1* | 7/2010 | Ballantine et al. | 102/206 |
| 2010/0175547 A1* | 7/2010 | Hoffman | 89/9 |
| 2010/0212482 A1* | 8/2010 | Morin et al. | 89/27.11 |
| 2010/0251880 A1* | 10/2010 | Hektoen et al. | 89/1.4 |
| 2010/0257769 A1* | 10/2010 | Doll et al. | 42/69.02 |
| 2010/0263524 A1* | 10/2010 | Morin et al. | 89/27.12 |
| 2010/0269391 A1* | 10/2010 | Doll et al. | 42/70.05 |
| 2010/0275768 A1* | 11/2010 | Quinn | 89/41.05 |
| 2011/0005847 A1* | 1/2011 | Andrus et al. | 180/9.1 |
| 2011/0030544 A1* | 2/2011 | Hodge | 89/41.05 |
| 2011/0061521 A1* | 3/2011 | Gardner et al. | 89/1.13 |

FOREIGN PATENT DOCUMENTS

| | | |
|---|---|---|
| EP | 0 433 697 | 6/1991 |
| EP | 433697 A2 | 6/1991 |

\* cited by examiner

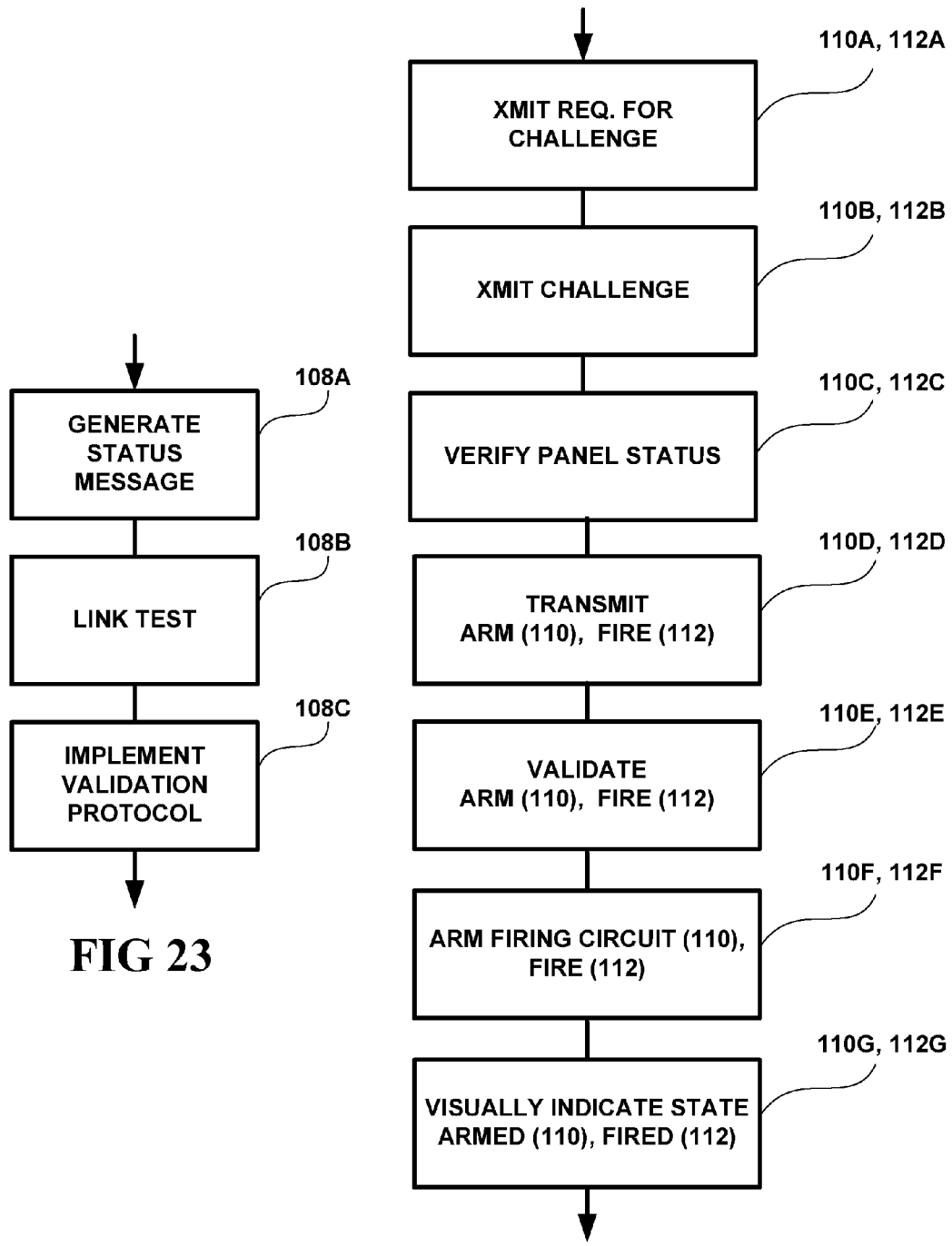

REMOTE DIGITAL FIRING SYSTEM

CROSS-REFERENCE TO RELATED APPLICATIONS

This is a Continuation in Part of U.S. patent application Ser. No. 11/347,557, "Remote Digital Firing System," filed Feb. 3, 2006 (published as U.S. pre-grant application publication 2007/0119326), which is a Continuation in Part of U.S. patent application Ser. No. 11/024,243, "Remote Digital Firing System," filed Dec. 28, 2004 (issued as U.S. Pat. No. 7,143,696), which is a Continuation of U.S. patent application Ser. No. 10/319,853, "Remote Digital Firing System," filed Dec. 13, 2002 (issued as U.S. Pat. No. 6,860,206), each of which claims the benefit of priority of U.S. provisional application No. 60/340,175, "Remote Digital Firing System," filed Dec. 14, 2001. Each of the aforementioned U.S. patents, U.S. pre-grant application publication, and U.S. provisional application are incorporated herein by reference.

TECHNICAL FIELD

The present discussion relates generally to mobile robotic platforms, and more specifically to circuitry and mechanical control assemblies included in a system of an operator control unit and a mobile robotic platform, that can respond to command signals transmitted from the operator control unit by discharging a mechanically triggered weapon mounted on the mobile robotic platform.

BACKGROUND

The use of stationary and mobile robotic platforms for tasks that are inherently dangerous in nature has become increasingly common as robot technology has grown progressively more sophisticated. Tasks that are inherently dangerous in nature are usually within the province of the police and/or the military where there is generally a significant risk of injury and/or death to human operators. Such tasks include, for example, the controlled detonation of EODs (Explosive Ordinance Devices) and IEDs (Improvised Explosive Devices), the controlled detonation of charges to breach a structure, the identification, retrieval, and storage of HAZMAT, and reconnaissance or surveillance in a hazardous environment.

The use of mobile robotic platforms to accomplish some of the tasks that occur within the province of the military and/or police are not without a degree of risk of damage or destruction to the mobile robotic platforms. For example, the use of a mobile robotic platform for the controlled detonation of EODs and IEDs or involves the placement of a small detonation device (e.g., a blasting cap) in close proximity to the EOD or IED by maneuvering of the mobile robotic platform to such position and then detonating the small detonation device (which causes the EOD or IED to explode) after the mobile robotic platform has been maneuvered sufficiently far from the EOD or IED (to prevent or limit blast damage to the mobile robotic platform). Similarly, the use of a mobile robotic platform to breach a structure involves maneuvering of the mobile robotic platform in close proximity to the structure to attach a shaped charge (e.g., C4) that includes a small detonation device to the structure, and then maneuvering the mobile robotic platform sufficiently far from the structure before detonating the shaped charge (as non-limiting examples of mobile robotic platforms, refer to the "unmanned ground vehicles" set forth in U.S. pre-grant patent application publication 2007/0156286 published Jul. 5, 2007, which is incorporated herein by reference in its entirety).

There is a basic degree of risk of damage or destruction inherent in the operation of mobile robotic platforms in such hostile environments due to the operation of hostile forces (e.g., gunfire or small detonating devices such as grenades directed at the mobile robotic platform) as well as risks arising from the premature detonation of the detonation device or a shaped charge while being transported by the mobile robotic platform and/or the premature detonation of the EOD or IED. There is also a degree of risk imposed by the time required to first maneuver the mobile robotic into close proximity to the object and subsequently maneuver the mobile robotic platform sufficiently far from the object, i.e., the exposure time of the mobile robotic platform in the hostile environment. In addition, this extended maneuvering time increases the time required to accomplish the task, which represents a deficiency.

Accordingly, a need exists for technology that can accomplish tasks such as the foregoing while concomitantly reducing the risks associated therewith. One such approach may involve the use of a relatively dense projectile that can launched from the mobile robotic platform to impact with the EOD or IED or the structure to be breached, in which the kinetic energy (impact shock) of the dense projectile is sufficient to detonate the EOD or IED or to breach the structure. This may eliminate the extended maneuvering required of the mobile robotic platform described above, and may at the same time reduce the risks and deficiencies associated with such extended maneuvering.

In order to advance such an approach, it may be possible to design, develop, and manufacture a specialized mobile robotic platform having a built-in projectile launcher. However, this approach is not deemed optimal because the time required to design, develop, and manufacture such a custom-purpose mobile robotic platform may be lengthy and the cost high. Further, the specialized design of such a mobile robotic platform may severely limit (if not completely negate) its usefulness for other tasks, which increases the cost of ownership thereof.

In contrast, another approach is to integrate a conventional mechanically triggered weapon in combination with a multi-purpose mobile robotic platform that can be used for military and police applications. One potential concern in this approach is that a conventional mechanically triggered weapon includes a safety mechanism that 'unsafes' the weapon so that it can be remotely fired to achieve the mission objective, and correspondingly 'safes' the weapon when it not imminently expected to be fired (e.g., during mission maneuvering prior to and after 'firing' to achieve the mission objective). To overcome this deficiency, one could disable the safety mechanism so that the mechanically triggered weapon could be remotely fired at will at any time. This solution is not acceptable because it entails a significant risk that the mechanically triggered weapon would be inadvertently fired at an inopportune time due to mechanical shocks arising as a result of operating the mobile robotic platform. Another deficiency in this approach is that most (if not all) multi-purpose mobile robotic platforms designed for military and police applications include a built-in firing stage that outputs a signal to activate small detonation devices and such firing stages are not generally functional to provide an output while armed. Overcoming this deficiency may likely include the addition of an electrical circuit configured to disable the safety mechanism and actuate the weapon's trigger. Such a circuit may be cumbersome and inefficient as it requires complex integration of the weapon with the mobile robotic platform and firing the weapon requires the operator to perform additional actions. Further to this, the requirement that the operator perform addition actions may likely introduce latency into the system such that there is a noticeable time lag between the point in time when the operator initiated the firing routine and the point in time when the weapon discharges.

Therefore, a need exists to weaponize a mobile robotic platform with a mechanically triggered weapon using an unobtrusive, add-on electromechanical system that is compatible with one or more mechanically triggered weapons, in which the weapon can be fired in a safe, secure, quick, and controlled manner in response to a single electrical pulse.

SUMMARY

In view of the issues noted above and otherwise existing in the prior art, the present disclosure provides a system for removably securing a mechanically triggered weapon in integrated combination with a mobile robotic platform. The system may include a safety control assembly for unsafing the mechanically triggered weapon, a trigger control assembly for firing the mechanically triggered weapon, a firing circuit included on the mobile robotic platform for responding to encrypted commands sent from a remote operator control unit, a sequencing circuit that operates in response to a single electrical pulse to activate the safety control assembly and subsequently activate the trigger control assembly after a preselected delay time to fire the mechanically triggered weapon in a preselected firing mode, and a weapon controller for providing an interface between the firing circuit and the sequencing circuit and for providing a mechanical user interface for selecting a delay time for activation of the trigger control assembly and for selecting a firing mode for the mechanically triggered weapon.

The weaponized mobile robotic platform disclosed herein enables the weapon of the weaponized mobile robotic platform to be fired in a safe, secure, quick, and controlled manner in response to a single electrical pulse. The apparatus may include a mounting assembly for removably securing the mechanically triggered weapon in integrated combination with the mobile robotic platform, the safety control assembly integrated in combination with the mechanically triggered weapon that disables a safety latch on the mechanically triggered weapon when actived, a trigger control assembly integrated in combination with the mechanically triggered weapon that actuates the trigger of the mechanically triggered weapon when activated, a sequencing circuit coupled to the safety control assembly and the trigger control assembly to control each assembly, and a weapon controller integrated in combination with the weaponized mobile robotic platform and the sequencing circuit and which enables an operator to select a delay time for activation of the trigger control assembly and a firing mode for firing of the mechanically triggered weapon.

The sequencing circuit may operate when activated by the single electrical pulse to activate the safety control assembly and to subsequently activate the trigger control assembly after the delay time, in which the mechanically triggered weapon is fired in the selected firing mode. Further to this, the sequencing circuit may be connected and in communication with a firing circuit installed in the mobile robotic platform that produces a single electrical pulse in response to a properly formatted, encrypted command transmitted from an operator control unit. Transmission of a properly formatted and encrypted command may require that a key be inserted into the operator control unit, and that the key be properly formatted with the mobile robotic platform's unique identification information. Moreover, the safety control assembly and the trigger control assembly may default to a safe mode of operation following the occurrence of a power failure, short circuit, initialization of an emergency stop, or other action indicative that the assemblies should remain un-armed and safe.

BRIEF DESCRIPTION OF THE DRAWINGS

FIGS. 23 and 24 are block diagrams further illustrating the operation of the remote firing system.

DETAILED DESCRIPTION

A mobile robotic platform, such as discussed herein, can also be called a mobile robotic platform, a vehicle, a remote control vehicle, a robot or any combination of those terms. Furthermore, a mobile robotic platform may include any suitable mobile machine able to operate in an autonomous or semi-autonomous mode.

An operator control unit, such as the one referred to below, can also be called an operator control unit, a portable control console, or any combination of those terms. Furthermore, an operator control unit may include any suitable control assembly capable of establishing a communication link with a mobile robotic platform, sending control commands to the mobile robotic platform via the communication link, and receiving sensor data from the mobile robotic platform via the communication link.

Robotic Platform

Figure 1:
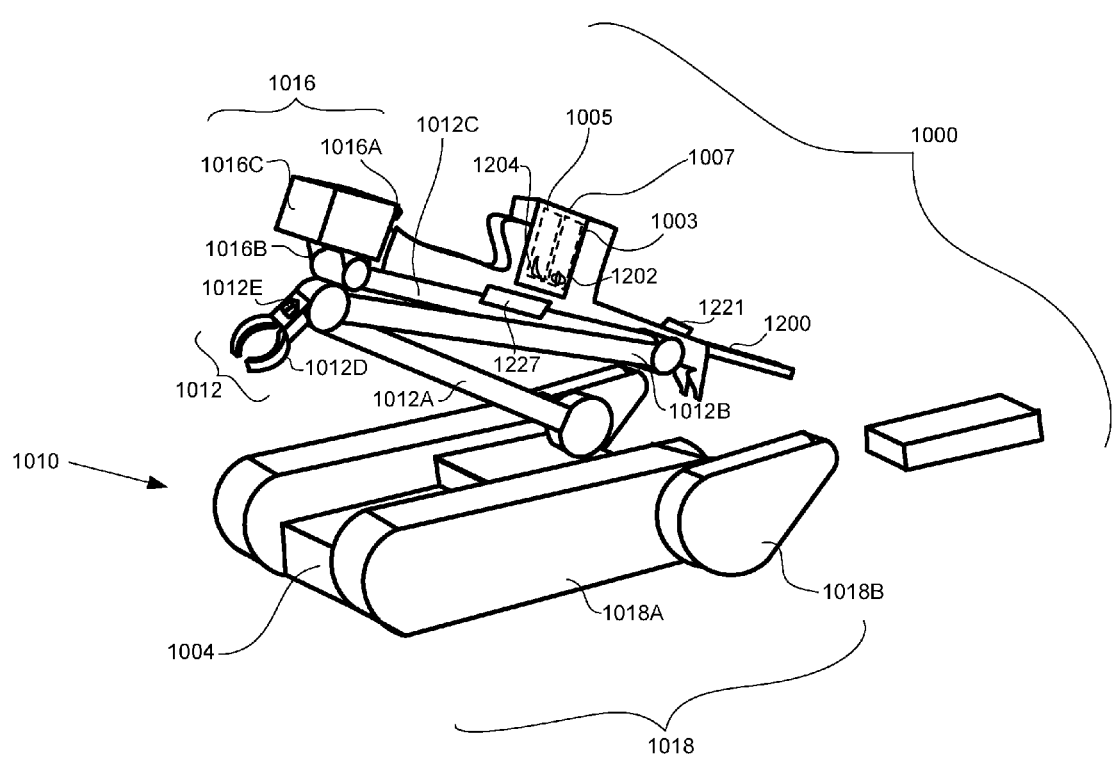
FIG. 1 is a schematic representation of an exemplary mobile robotic platform fitted with a mechanically triggered weapon such that the platform is a weaponized mobile robotic platform.

Referring now to the drawings wherein like reference numerals identify corresponding or similar elements throughout the several views, FIG. 1 is a schematic representation of a weaponized mobile robotic platform 1000 according to the present invention. This schematic illustrates a mechanically triggered weapon 1200 removably secured to a mobile robotic platform 1010 such that the mechanically triggered weapon 1200 can be fired in a safe, secure, quick and controlled manner in response to a single electrical pulse. The weaponized mobile robotic platform 1000 includes a mounting assembly 1227 for removably securing the mechanically triggered weapon 1200 in integrated combination with the mobile robotic platform 1010 to create the weaponized mobile robotic platform 1000. Installed proximate to the barrel of the mechanically triggered weapon 1200 is a sighting camera 1221 for gathering and relaying image data of the environment to the operator to aid an operator in positioning the mechanically triggered weapon 1200 for firing. Mounted in combination with the mechanically triggered weapon 1200 is a safety control assembly 1003 that can 'disarm' and 'arm' ('safe' and 'unsafe') a dual-position safety selector switch 1202 of the mechanically triggered weapon 1200. Also mounted in combination with the mechanically triggered weapon 1200 is a trigger control assembly 1005 for mechanically displacing the trigger 1204 of an 'armed' mechanically triggered weapon 1200 to fire the weapon 1200 according to a pre-selected firing mode. A weapon controller 1007 is interfaced with the safety control assembly 1003 and the trigger control assembly 1005. The weapon controller 1007 enables operative interaction (via its weapon controller interface 1730) with an operator between the circuitry associated with the safety control assembly 1003 and the circuitry associated with the trigger control assembly 1005 of the mechanically triggered weapon 1200 and a microprocessor 1050 and a weapon controller circuit 1063 of the weaponized mobile robotic platform 1000. Accessible on the weapon controller interface 1730 are actuators for an operator to control and define the operation of the trigger control assembly 1005. The actuators installed on the weapon controller interface 1730 preferably include dual inline pin switches, but alternatively may include a dial, a switch, a lever, a button, or any other mechanical actuator able to alter the state of a delay circuit 1086 and a firing period circuit 1088 of a sequencing circuit 1008 of a sequencer 1030.

Further referring to FIG. 1, the example robotic platform 1010 illustrated is a PackBot EOD platform that is designed, manufactured, and distributed by the iRobot Corporation of Burlington, Mass. (see, for example, U.S. pre-grant patent application publication 2007/0072662, published May 29, 2007, which is incorporated herein by reference in its entirety). Operation of the PackBot EOD platform is remotely controlled with an external operator control (OC) unit 1100 of the type illustrated in FIG. 3. While the weaponized mobile robotic platform 1000 according to the present embodiment preferably includes a PackBot EOD platform (and is further described herein in terms of the PackBot EOD platform), the present embodiment is not limited thereto. Rather, any other autonomously mobilized platform that can be controlled using an operator control unit and can be weaponized using the sequencer 1030 presently disclosed may alternatively be used, without departing from the scope of the invention.

The robotic platform 1010 is a rugged, lightweight robotic platform suitable for hazardous missions such as Explosive Ordnance Disposal (EOD), HAZMAT, search-and-surveillance, hostage rescue, and other sensitive missions conducted by entities such as bomb squads, SWAT teams, and military and security units, in a wide variety of environments. The robotic platform 1010 illustrated includes a chassis 1004, a track system 1018, a manipulator system 1012, and a vision and targeting system 1016.

The chassis 1004 provides the structural framework of the robotic platform 1010 for mounting of the track system 1018 and the manipulator system 1012. A central control system 1020 and related circuits and systems are housed within the chassis 1004.

The track system 1018 of the robotic platform 1010 includes a pair of primary tracks 1018A and a pair of rotatable flipper tracks 1018B integrated in combination with the chassis 1004. This track system 1018 provides the motive force that allows the robotic platform 1010 to easily climb stairs, maneuver over rocks and rubble, and navigate through narrow twisting passages to quickly penetrate inaccessible and hazardous areas such as collapsed buildings, tunnels, airplane aisles, railroad cars and other tight spots. The tracks 1018A, 1018B of the track system 1018 are fabricated from a flexible polymeric material that facilitates the ejection of debris therefrom and allows the robotic platform 1010 to traverse a wide range of surfaces such as tiled floors, rocks, sand, mud, and snow with "human-like" dexterity.

The manipulator system 1012 of the robotic platform 1010 is a multi-linked articulated configuration that includes a base arm 1012A having one end thereof articulatively integrated in combination with the chassis 1004, an intermediate arm 1012B with one end articulatively integrated in combination with the base arm 1012A and the other end articulatively integrated in combination with a terminal arm 1012C interfaced with the vision and targeting system 1016. The articulated linked arms 1012A, 1012B, 1012C can be individually controlled through a wide range of motions to implement the missions of the robotic platform 1010.

Mounted at the joint defined between the intermediate arm 1012B and the terminal arm 1012C is a rotating gripper 1012D with a camera 1012E installed proximate to the gripper 1012D such that the camera 1012E can be used to aid and guide the user in controlling the gripper 1012D. The gripper 1012D is configured and operable to pick up and handle a wide range of different sized objects. The gripper 1012D is rotatable through 360° to provide precise positioning or placement of any gripped object in connection with the mission of the robotic platform 1010. Both the gripper 1012D and the camera 1012E comprise elements of an actuator control assembly 1051.

The vision and targeting system 1016, which is included within a sensor assembly 1054, is integrated in combination the terminal arm 1012C of the manipulator system 1012 by means of an interface arm 1016B. The vision and targeting system 1016 includes a head 1016C that provides both tilt and a 360°-pan coverage for a high-powered viewing subsystem 1016A installed within the head 1016C. Examples of components that could be included within the high-powered viewing subsystem 1016A are: a camera; a laser range finder/targeting module able to size objects and facilitate precise positioning of mission payloads and/or define the precise position of targets; and/or a super-bright light source for illuminating objects during missions.

Figure 2:
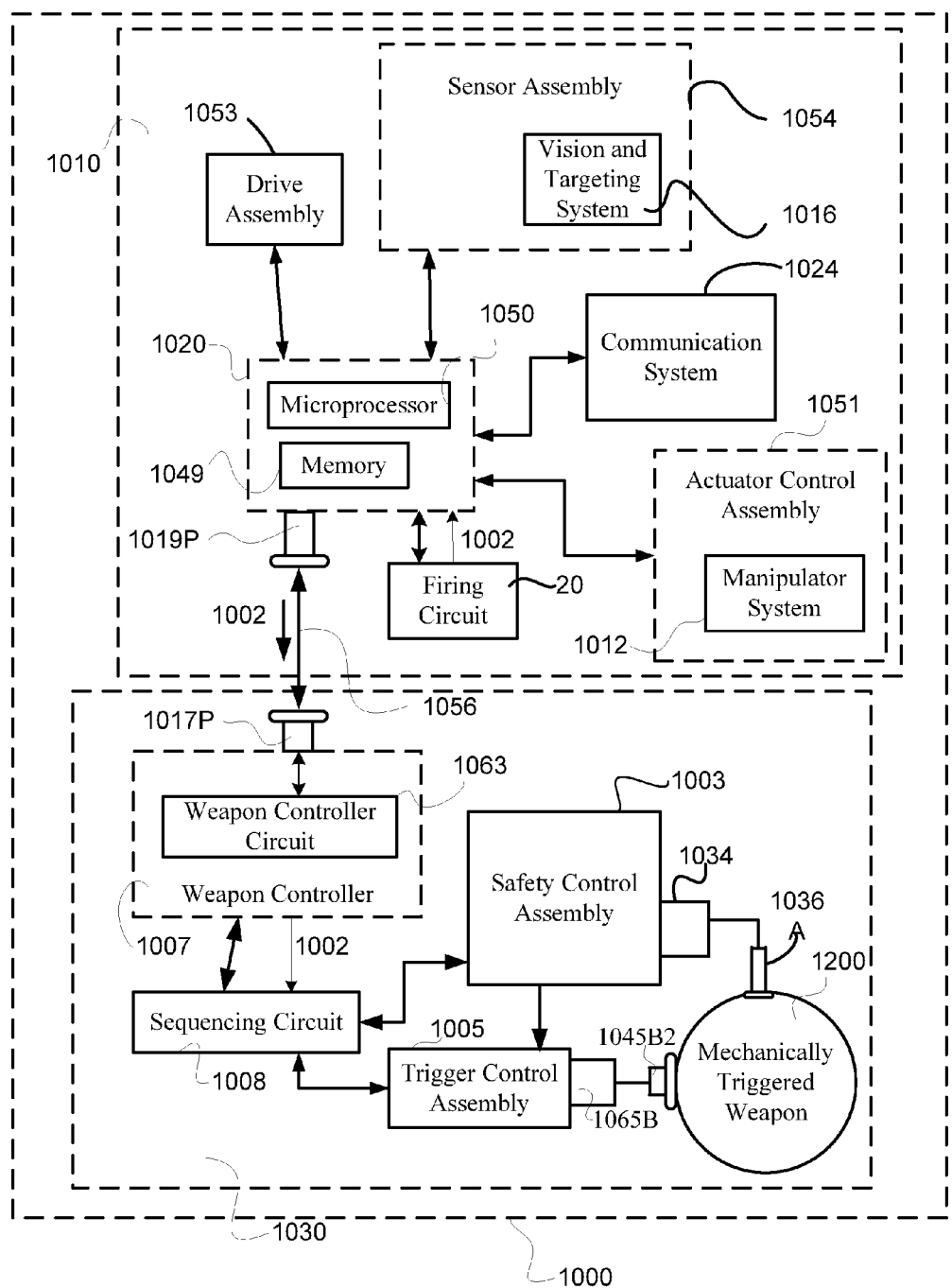
FIG. 2 is a block diagram of the components included within the mobile robotic platform, the attached sequencer, and the mechanically triggered weapon; where together these components form a weaponized mobile robotic platform.

Illustrated in FIG. 2 is a block diagram of the system components housed within the weaponized robotic platform 1000. This diagram illustrates the interfacing of circuits included in the sequencer 1030 according to the present invention to standard circuits included in the robotic platform 1010. The robotic platform 1010 has a central control system 1020 that includes a memory module 1049 and a microprocessor 1050, although in other versions a single board computer or a microcontroller could be substituted for the microprocessor 1050. Connected to the microprocessor 1050 of the central control system 1020 are a drive assembly 1053, the sensor assembly 1054, a communication system 1024, a firing circuit 20, the sequencer 1030, and an actuator control assembly 1051.

The central control system 1020 is housed within the chassis 1004 of the robotic platform 1010 and preferably includes an industry-standard microprocessor 1050, e.g., a Mobile Pentium PC (alternatively, the central control system 1020 may include a microcontroller, logic circuitry implementing a finite state machine, or any other suitable processor), memory 1049, internal software routines, power circuitry and control circuitry. Software routines are installed in memory 1049 and executed by the microprocessor 1050 to generate control commands that control the operation of the weaponized robotic platform 1000. These control commands are relayed to the circuits and systems connected to the central control system 1020 and included in the weaponized robotic platform 1000. Further, such control commands are in part generated in response to operator command signals sent to the weaponized robotic platform 1000 via the OC unit 1100. Also included in the central control system 1020 is power circuitry that provides the power necessary to drive the track system 1018 and operate all subsystems and circuits included within the weaponized robotic platform 1000.

The communication system 1024, included within the weaponized platform 1000 and connected to the central control system 1020, receives command signals generated by the OC unit 1100. Such command signals may control operation of one or more of: the drive assembly 1053, and in particular the track system 1018; the actuator control assembly 1051; the sensor assembly 1054, and in particular the vision and targeting system 1016; the firing circuit 20; the sequencer 1030; and all software routines included in the central control system 1020. The communication system 1024 further transmits data packets generated by the systems of the weaponized platform 1000 to the OC unit 1100. These data packets provide feedback to the operator of the OC unit 1100 as to the status of the systems, software routines and circuits included within the weaponized platform 1000. In particular, sensor data and system status information generated by: the drive assembly 1053; the actuator control assembly 1051; the sensor assembly 1054; the firing circuit 20; the sequencer 1030; and the central control system 1020 is transmitted to the OC unit 1100 as data packets.

For the illustrated embodiment of the weaponized platform 1000, the communication system 1024 includes an intelligent fiber spooler system that is operative to trail a fiber optic cable behind the weaponized platform 1000 as it traverses its mission environment. One end of the fiber optic cable is communicatively connected to the OC unit 1100 and the other end of the fiber optic cable is communicatively interfaced with the central control system 1020 of the robotic platform 1010.

Use of a fiber-optic communication system 1024 as part of the weaponized robotic platform 1000 pragmatically minimizes the interception and/or jamming of command signals and/or data packages between the weaponized robotic platform 1000 and the OC unit 1100. While it is preferred that the communication system 1024 comprises a fiber-optic communication system, alternative systems may be used in the weaponized robotic platform 1010 such as a wireless transceiver system that provides a wireless communication link to the OC unit 1100, or a hybrid wireless transceiver and intelligent fiber spooler system for providing dual communication channels between the weaponized robotic platform 1000 and the OC unit 1100.

The drive assembly 1053 includes the power modules, control circuits, motors and encoders necessary to mobilize the weaponized robotic platform 1000. Mobilization of the weaponized robotic platform 1000 is accomplished through routines that operate the track system 1018 and accompanying drive assembly 1053 components in response to drive commands generated by the central control system 1020. The generation of drive commands is also implemented in response to command signals transmitted by an operator using the OC unit 1100 and internal software routines for controlling the movement of the weaponized robotic platform 1000 through its environment.

Further referring to FIG. 2, also connected to the central control system 1020 are the actuator control assembly 1051 and the sensor assembly 1054. The actuator control assembly 1051 includes the power modules, control circuits, actuators, motors and encoders necessary to mobilize actuators such as the rotating gripper 1012B. Further controlled by operation of the actuator control assembly 1051 are the articulated linked arms 1012A, 1012B, 1012C of the manipulator system 1012 and the terminal arm 1016B, which is used to position the vision and targeting system 1016. The sensor assembly 1054 contains sensors and their corresponding control circuitry for operation of the vision and targeting system 1016, the sighting camera 1221 installed proximate to the barrel of the mechanically triggered weapon 1200, and the camera 1012E installed proximate the rotating gripper 1012D. Particular sensors that may be utilized in the sensor assembly 1054 include: an odometry system comprised of gyros, IMUs, tilt sensors, absolute and relative position encoders, or other sensors for gathering sensory data regarding the environment in which the weaponized robotic platform 1000 is operating.

Further connected to the microprocessor 1050 is the firing circuit 20. The firing circuit 20 responds to encrypted command signals transmitted from the OC unit 1100 to the weaponized robotic platform 1000 via the communication system 1024 by authenticating such commands and then, if appropriate, generating a single electrical pulse 1002 (aka the internal command signal pulse) which is then transmitted to the sequencer 1030 (via the central control system 1020). The firing circuit 20 generates the internal command signal pulse 1002 only when it receives a properly formatted, encrypted command signal transmitted from the OC unit 1100 as described hereinbelow in further detail. The firing circuit 20 is in communication with the microprocessor 1050 which can accept command signals from the firing circuit 20, process the signals and transmit the internal command signal pulse 1002 to the weapon controller circuit 1063 included in the weapon controller 1007 via a serial connection 1056. Pass through software routines included in the microprocessor 1050 are able to perform a number of tasks including the processing of internal inhibit, arm, and/or fire commands coupled from the firing circuit 20, transmitting flags to the firing circuit 20 and the sequencer 1030 indicating when a digitally encoded key plug 40 is inserted or removed from the weaponized robotic platform 1000, relaying the status of the firing circuit 20 to the sequencer 1030, and logging the type and frequency of data package transfers between the sequencer 1030 and the firing circuit 20.

Figure 27:
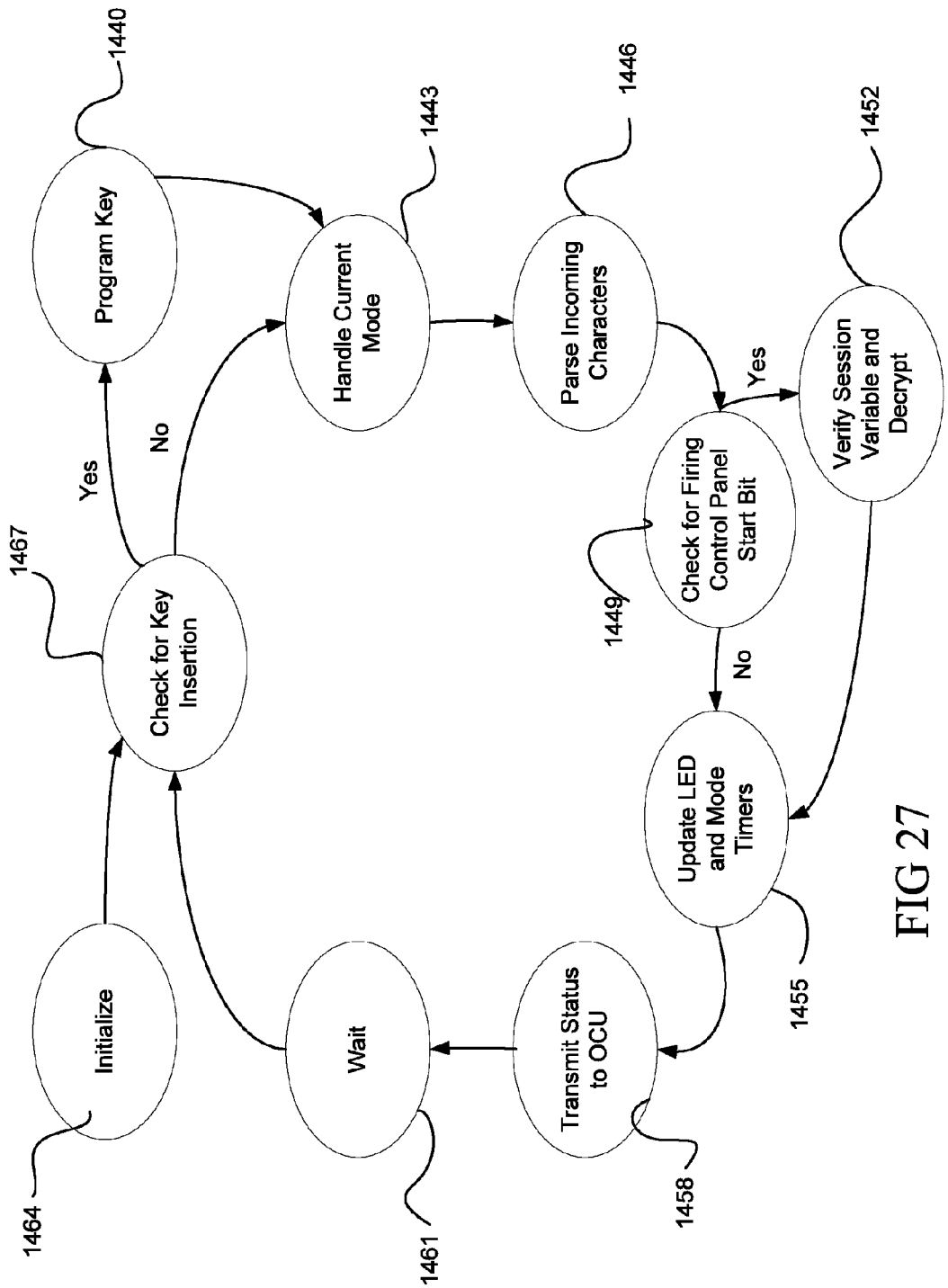
FIG. 27 is a state diagram illustrating the operation of the firing circuit.

The routine included in the microprocessor 1050 that is operative to obtain the status of the digitally encoded key 40, is illustrated in FIG. 27 (the process for encoding the digitally encoded key 40 is described in further detail hereinbelow with reference to FIG. 28). This firing circuit 20 routine runs on a continuous loop that is initialized at step 1464 when the weaponized robotic platform 1000 is powered up, and exited when the weaponized robotic platform 1000 is powered down. Each routine iteration begins with a check at step 1467 to determine whether the uncoded key is integrated in combination with the weaponized robotic platform 1000. Should this step 1467 check return a "yes" flag, the routine will then implement a programming routine 1440 at step 1440 to program the uncoded key 40 with the data necessary to operationally control the weaponized robotic platform 1000; otherwise the routine will continue on to step 1443 of handling the current mode. The current mode step 1443 could be characterized by a wait routine, an input routine to handle incoming command signals, or any other routine included within the firing circuit 20. Data sent to the firing circuit 20 is then processed and parsed in step 1446 to determine the point of origin of any received command signal. In particular the characters comprising the received command signal are checked for a start bit from the firing control panel 1156 of the OC unit 1100 at step 1449, which indicates that the data is a command signal transmitted from the firing control panel 1156 of the OC unit 1100. Should the start bit indicate that the data is a command signal from the firing control panel 1156, a one-time session variable included in the command string is verified and the command is decrypted at step 1452, otherwise the routine proceeds to step 1455.

After parsing incoming data, a display panel (not shown) on the weaponized robotic platform 1000 is updated to ensure that LED panel displays are displaying the correct status, and all internal mode timers are incremented per their associated routines at step 1455. A status signal is transmitted to the OC unit 1100 at step 1458 indicating the state of the firing circuit 20 and the sequencer 1030 of the weaponized robotic platform 1000. Once these steps are complete the routine waits at step 1461a predetermined period of time and then initiates the routine again by checking for the presence of the uncoded key at step 1467.

Referring back to FIG. 2, the sequencer 1030 interfaces with the weaponized robotic platform 1000 via the mounting assembly 1227 and the weapon controller 1007. The weapon controller 1007 includes a plug 1017P that mates with a complementary plug 1019P on the central control system 1020. When these plugs 1017P, 1019P are mated, the serial connection 1056 is established between the weapon controller 1007 and the microprocessor 1050 for the exchange of data therebetween. The sequencing circuit 1008, which is included in the sequencer 1030, receives the internal command signal pulse 1002 generated by the firing circuit 20. After being generated by the firing circuit 20, the internal command signal pulse 1002 is sent to the microprocessor 1050 in the central control system 1020 where it is processed and relayed to the weapon controller 1007 via the serial connection 1056 formed by the mated plugs 1017P, 1019P. The weapon controller circuit 1063 included in the weapon controller 1007 then passes the internal command signal pulse 1002 to the sequencing circuit 1008 via a wire (not shown) linking the sequencing circuit 1008 to the weapon controller 1007. Once the internal command signal pulse 1002 is received by the sequencing circuit 1008, the safety control assembly 1003 is activated. Upon activation of the safety control assembly 1003, a time lag is implemented after which the trigger control assembly 1005 is activated. The length of the time lag before activation of the trigger control assembly 1005 is chosen via actuation of a time delay selector 1710 connected to a delay circuit 1086 included in the sequencing circuit 1008. Similarly, the operative mode of the trigger control assembly 1005 (i.e. firing period, single shot, or a multiple-round burst) is chosen via actuation of one of either a firing period selector 1735 or a single or burst mode selector 1740 included in the weapon controller 1007. The firing period selector 1735 is connected to the firing circuit 1088 and controls the length of time that the trigger 1204 remains depressed. The internal command signal pulse 1002 generated by the firing circuit 20 preferably comprises a single electrical pulse but can also alternatively comprise a software command, a mechanical actuation or any other action able to alter the state of a circuit.

The safety control assembly 1003 and trigger control assembly 1005 included as components of the sequencer 1030 are each connected to a mechanically triggered weapon 1200 via actuators 1034, 1065B that further actuate actuators 1036A, 1045B2, respectively, which operate the mechanically triggered weapon 1200 in response to activation of the safety control assembly 1003 and the trigger control assembly 1005. While the firing circuit 20 preferably is included on the weaponized robotic platform 1000 as described herein, the firing circuit 20 can alternatively be included on the OC unit 1100. A version such as this may enable the firing circuit 20 to communicate with the sequencing circuit 1008 via any one of the following communication methods: wireless, Ethernet, serial, RS-485, radio, or other compatible communication method. Furthermore, this version may specify that both the firing circuit 20 and the sequencing circuit 1008 have communication systems able to implement the above communication protocols.

The weapon controller 1007 installed on the weaponized robotic platform 1000 provides the functional interface between the central control system 1020 and the sequencer 1030. This interface facilitates transfer of the internal command signal pulse 1002 generated by the firing circuit 20 to the sequencing circuit 1008. Furthermore, the weapon controller 1007 provides a mechanical structure 1730 on which selectors can be installed, where such selectors are connected to the delay-time circuit 1086 and the firing mode circuit 1088 of the sequencing circuit 1008 to define the parameters controlling the operation of the trigger control assembly 1005, and, in consequence, the firing of the mechanically triggered weapon.

Operator Control (OC) Unit

Figure 3:
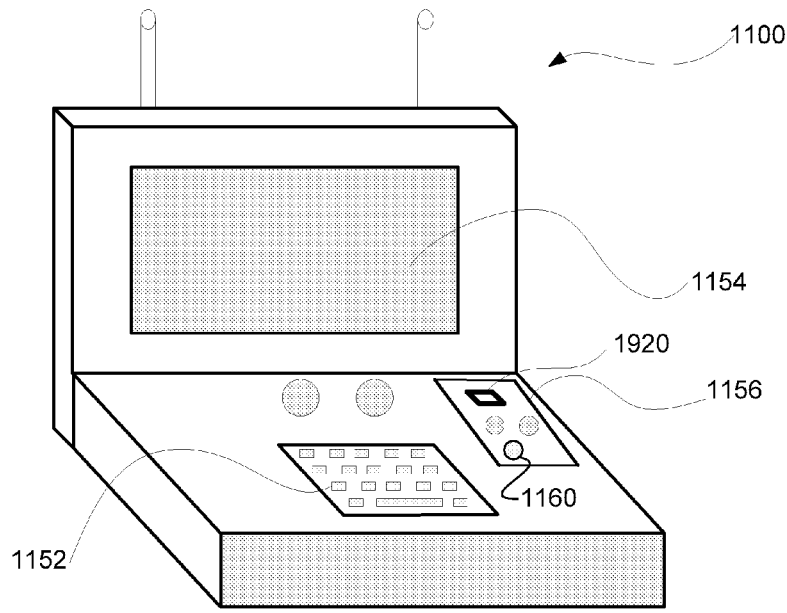
FIG. 3 is a schematic representation of an operator control unit configured to operate as part of a remote digital firing system.
Figure 3A:
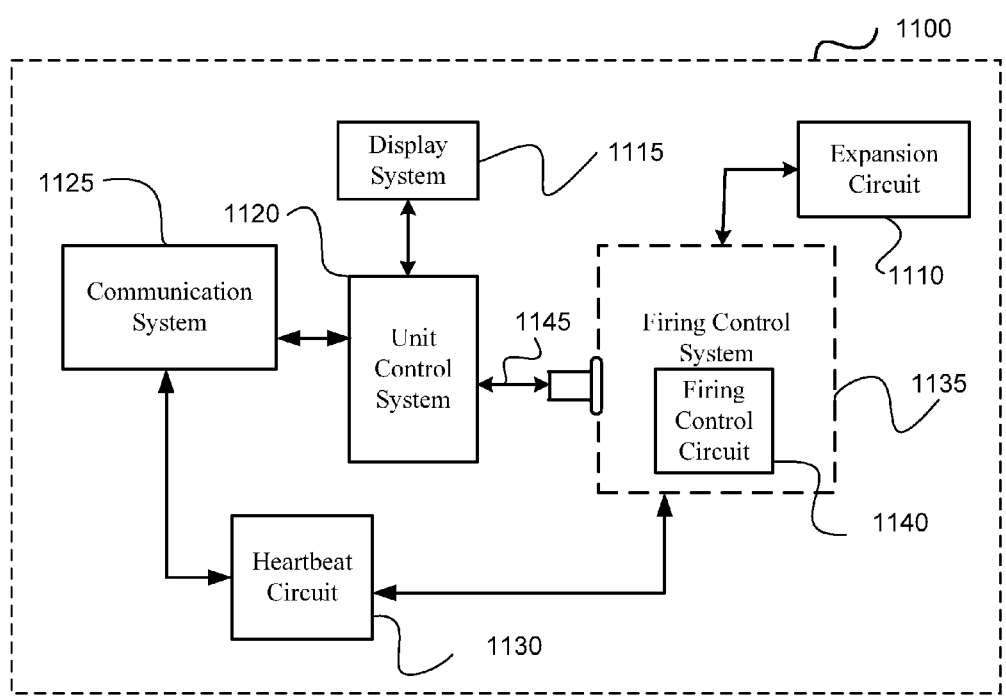
FIG. 3a is a block diagram of the systems and circuits included within the operator control unit.

The OC unit 1100 used in combination with the weaponized robotic platform 1000 described herein is illustrated in FIGS. 3, 3A. Operators can use the OC unit 1100 to generate command signals, and send such signals to the weaponized robotic platform 1000 to operate and control it and its associated circuits, routines and mechanical systems. The OC unit 1100 houses a microprocessor and processing circuitry that allows the OC unit 1100 to generate and transmit command signals to the communication system 1024 of the weaponized robotic platform 1000 and to receive, process, and display communication signals and data packages transmitted from the communication system 1024.

Each OC unit 1100 preferably includes an operator command panel 1152 (e.g., keyboard, joystick, touchscreen, or other user input device) that allows the operator to generate and transmit operating command signals to the weaponized robotic platform 1000, via the communication system 1024, to remotely control the physical operation of the weaponized robotic platform 1000 within its mission environment. This includes, but is not limited to, operating commands to control: (1) the movement of the weaponized robotic platform 1000 via the drive assembly 1053; (2) the operation of the manipulator system 1012 to position the rotating gripper 1012D and/or the head 1016C via the actuator control assembly 1051; (3) the operation of the various elements of the sensor assembly 1054; (4) the operation of the communication system 1024; and (5) to exercise remote control over the central control system 1020 of the weaponized robotic platform 1010.

The OC unit 1100 also includes a display panel 1154 that is operative to provide the operator with visual and parametric feedback regarding the operation of the weaponized robotic platform 1000 within its mission environment, thereby allowing the operator to precisely control the operation of the weaponized robotic platform 1000 therein. Visual feedback is generated by the viewing subsystem 1016A of the vision and targeting system 1016, the sighting camera 1221, and/or the gripper camera 1012E included within the sensor assembly 1054, processed by the central control system 1020, and communicated to the OC unit 1100 via the communication system 1024. Parametric feedback, e.g., relative position of the articulated, linked arms 1012A, 1012B, 1012C of the manipulator system 1012, position of the rotatable flipper tracks 1018B of the track system 1018, speed and heading of the weaponized robotic platform 1000, and tilt and pan positions (spatial orientation) of the head 1016C in the vision and targeting system 1016, is generated by the central control system 1020, which processes inputs from the embedded sensors and position encoders of the weaponized robotic platform 1000 to generate feedback data packages that are communicated to the OC unit 1100 via the communication system 1024.

The OC unit 1100 further includes a firing control panel 1156 of the type described and illustrated in U.S. Pat. No. 6,860,206, entitled Remote Digital Firing System, owned by the iRobot Corporation, that is interfaced to a firing control circuit 1140 within the OC unit 1100, and that includes mechanical actuators with electrical connections to the firing control circuit 1140. The firing control circuit 1140 responds to the actuation of the mechanical actuators by generating command signals and other signals, some of which are transmitted to the weaponized robotic platform 1000 and received by the communication system 1024 thereon. Each command signal transmitted from the OC unit 1100 is an encoded message that is encrypted using a one time session variable included within a digitally encoded key 40 integrated in combination with the OC unit 1100. Such command signals typically include an instruction to fire the weapon but can also include a number of ancillary instructions that direct the initiation of missions such as EOD disposal, identification and/or retrieval of HAZMAT material, laser designation of a target for destruction by an independent weapons systems (e.g., laser-guided bomb dropped by an aircraft), or remote video surveillance of a designated target. When the communication system 1024 receives a command signal, the command is processed by the firing circuit 20. Each command received by the firing circuit 20 is reviewed to ensure that the command was properly encrypted using the digitally encoded key 40 that was coded data from the corresponding weaponized robotic platform 1000 (as described in further detail hereinbelow). Upon authentication of the command, the firing circuit 40 then decrypts the command signal and responds to the command's instructions. An instruction sent from the OC unit 1100 to the weaponized robotic platform 1000 to fire the mechanically triggered weapon 1200, causes the firing circuit 20 to generate and output the internal command pulse 1002.

Illustrated in FIG. 3A is a block diagram of exemplary electromechanical components connected to a unit control system 1120 housed in the OC unit 1100, the unit control system 1120 comprising, inter alia, a microcontroller, memory and accompanying control circuitry. A display system 1115 interconnected to the unit control system 1120 includes circuitry and software routines operative to receive raw video data input, process such input and display the processed input on the display panel 1154 of the OC unit 1100. Further connected to the unit control system 1120 is a communication system 1125 that includes the circuitry required to implement communication links between the OC unit 1100 and the corresponding weaponized robotic platform 1000. Such links could be created using radio, Ethernet, serial and wireless Internet using wireless application protocol.

Connected to the communication system 1125 and a firing control system 1135 (which includes a firing control circuit 1140) is a heartbeat circuit 1130 that is operative to provide an LED or other visual display indicating the existence of a communication link between the OC unit 1100 and the weaponized robotic platform 1000. When the OC unit 1100 and the weaponized robotic platform 1000 are in communicative connection with each other, the heartbeat circuit 1130 outputs a pulsed signal to an LED display included on the firing control panel 1156. The lack of a pulsing LED display indicates that there is no communicative connection between the weaponized robotic platform 1000 and the OC unit 1100. To monitor the state of the communication link between the OC unit 1100 and the weaponized robotic platform 1000, the heartbeat circuit 1130 periodically generates a data packet (the interrogation signal) that is transmitted to the weaponized robotic platform 1000 using the communication system 1125 of the OC unit 1100. Once received by the weaponized robotic platform 1000, the data packet is processed and a return data packet (the verification signal) is transmitted to the OC unit 1100 using the communication system 1024 on the weaponized robotic platform 1000. Should the time period between an interrogation signal and the corresponding verification signal exceed a predetermined threshold, the heartbeat circuit 1130 interacts with the display system 1115, causing it to terminate illumination of the LED display on the firing control panel 1156. Alternatively, the OC unit 1100 may include programming such that heartbeat circuit 1130 is operative to illuminate an LED on the firing control panel 1156 whenever the communication link between the weaponized robotic platform 1000 and the OC unit 1100 is lost.

Further connected to the unit control system 1120 is the firing control system 1135. The firing control system 1135 is preferably a stand-alone module that includes a connection plug 1145 that mates with the unit control system 1120. Once mated, the electrical connection established between the unit control system 1120 and the firing control system 1135 allows the firing control circuit 1140 included in the firing control system 1135 to process operator input via the firing control panel 1156 and transmit such input to the unit control system 1120 where such input is processed and transmitted to the weaponized robotic platform 1000 via the communication system 1125. Furthermore, the existence of the digitally encoded key 40 and the one-time session variable stored within the key 40 are accessible by the microprocessor of the unit control system 1120 by means of the connection plug between the unit control system 1120 and the firing control system 1135. An expansion circuit 1110 can be connected to the firing control system 1135 and includes circuitry for enabling the firing control panel 1156 to accept more than one digitally encoded key, thereby allowing a single OC unit 1100 to control more than one weaponized robotic platform 1000. Exemplary components included in the expansion circuit 1110 include circuits able to connect to multiple mechanical plugs installed in the firing control panel 1156, such plugs being able to accept and interpret data from several digitally encoded keys 40. Other components may include separate data input circuits for handling commands sent via the firing control panel 1156 to several weaponized robotic platforms 1000 corresponding to the additional digitally encoded keys 40 inserted into the firing control panel 1156.

For purposes of the present invention, the command signal generated by the firing control circuit 1140 is an encrypted signal that the OC unit 1100 transmits to the communication system 1024 of the weaponized robotic platform 1000. Alternatively, such a command signal can be an unencrypted signal that does not require further processing, and that immediately initiates the sequencing circuit 1008 according to the present invention. In response to the command signal originated by the firing control circuit 1140, the firing circuit 20 of the weaponized robotic platform 1000 may be operative to output internal command signal pulse 1002. The internal command signal pulse 1002 for the embodiment of the invention described herein is a 24V electrical pulse having a nominal duration of 3 seconds, and a current limited to 3 amps. This electrical pulse is transmitted to the sequencing circuit 1008, which responds by firing the mechanically triggered weapon 1200 in a safe, secure, and controlled manner as described hereinbelow in further detail.

The process of initializing the OC unit 1100 for subsequent firing of the mechanically triggered weapon 1200 commences with the placement of an uncoded key into a platform receiving cavity 1930 on the weaponized robotic platform 1000, wherein it is in electrical communication with the firing circuit 20 of the weaponized robotic platform 1000, which causes the firing circuit 20 to generate several one-time random session variables. These one-time random session variables are stored in a memory module of the firing circuit 20 of the weaponized robotic platform 1000, simultaneously one of such one-time random session variables is written into the memory of the uncoded key to create the digitally encoded key 40. The digitally encode key 40 is then removed from the platform receiving cavity 1930, disconnecting it from the firing circuit 20 of the weaponized robotic platform 1000.

During mission deployment of the weaponized robotic platform 1000 the digitally encoded key 40 is inserted into a panel receiving cavity 1920 of the OC unit 1100, which integrates it in electrical combination with the firing control circuit 1140 of the OC unit 1100. Upon activation by the operator, the firing control circuit 1140 is operative to generate a complex command signal that includes information representative of the one-time random session variable stored in the digitally encoded key 40. The OC unit 1100 then transmits the command signal to the firing circuit 20 on the weaponized robotic platform 1000 (via the communication system 1024). Upon receipt of such command signal, the firing circuit 20 is operative to compare the one-time random session variable embodied in the command signal with the one-time random session variables stored in the memory module of the firing circuit 20. If there is a one-to-one correspondence between the one-time random session variable embodied in the command signal and one of the one-time random session variables stored in the memory module of the firing circuit 20, the firing circuit 20 authenticates the command signal. In response to an authenticated command signal, the firing circuit 20 is operative to generate the internal command signal pulse 1002 that activates the sequencing circuit 1008, causing the mechanically triggered weapon 1200 of the weaponized robotic platform 1000 to be fired in a safe, secure, and controlled manner.

The use of such a complex command signal that is encrypted is advantageous for several reasons. An encrypted command signal allows the use of a single, common communication channel between the OC unit 1100 and the weaponized robotic platform 1000, because a distinction can be made as to where any command signal originated. Furthermore, such a complex command signal effectively prevents a "replay attack" scenario wherein a hostile party can record the command signal and play the recorded signal back at an inopportune time.

Figure 28:
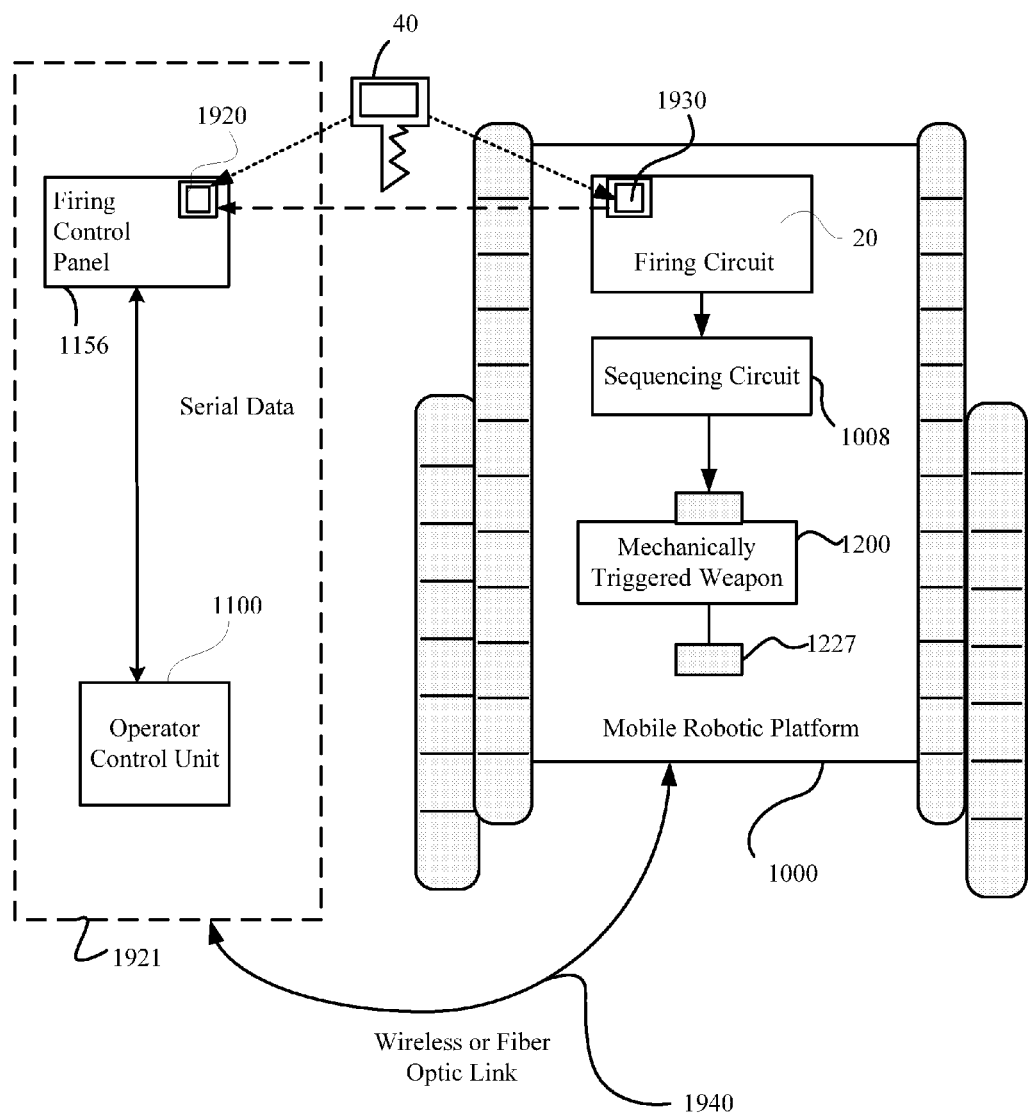
FIG. 28 is a schematic illustration of the process of configuring and communicating with a weaponized mobile robotic platform using the operator control unit.

The process of generating and accepting a command signal generated by the firing control panel 1156 is schematically illustrated in FIG. 28. The firing circuit 20 programs an uncoded key with a one-time random session variable and an encryption algorithm as well as the necessary command codes for arming, disarming, and firing the mechanically triggered weapon 1200 installed on the weaponized robotic platform 1000. Programming of the uncoded key requires the operator to insert the uncoded key into the platform receiving cavity 1930 on the weaponized robotic platform 1000, which places the uncoded key 40 in electrical in combination with the firing circuit 20. Preferably the uncoded key 40 comprises an EEPROM encased in a waterproof metal key assembly, but the uncoded key 40 could also include any one of: flash memory, a completion circuit, or a random password generated by the firing circuit 20 for entering via a keypad into the OC unit 1100.

Once the uncoded key 40 is programmed with data by the firing circuit 20 to create the digitally encoded key 40, the operator removes the digitally encoded key 40 from the platform receiving cavity 1930 and inserts it into a panel receiving cavity 1920 of the firing control panel 1156 of the OC unit 1100. Once inserted, the digitally encoded key 40 establishes an electrical connection with the OC unit 1100 and enables the OC unit 1100 to generate properly formatted and encrypted command signals. Additionally, a system 1921 defined by the OC unit 1100 and the digitally encoded key 40 integrated in combination with the firing control panel 1156 exclusively controls the firing circuit 20 of the weaponized robotic platform 1000 that was to program the digitally encoded key 40. Exclusive control means that only one specific system controls one specific weaponized robotic platform 1000 via command signals. For example, should an OC unit 1100 that includes a digitally encoded key 40B (i.e., that was programmed by the firing circuit 20 of a weaponized robotic platform $1000_B$) send command signals to a weaponized robotic platform $1000_A$; the weaponized robotic platform $1000_A$ is nonresponsive to such command signals, i.e., such commands cannot be authenticated. Control of the weaponized robotic platform $1000_A$ is exclusively reserved for a system 40A that includes a digitally encoded key 40A that was programmed by the firing circuit 20 of the weaponized robotic platform $1000_A$. Thus, the weaponized robotic platform $1000_A$ will not respond to command signals sent from a system 1921B that includes the digitally encoded key 40B. Alternative versions of this embodiment may include a firing circuit able to accept and program several digitally encoded keys such that more than one OC unit can control a single weaponized robotic platform 1000. Further embodiments may include a firing control panel able to accept several digitally encoded keys such that a single OC unit could control and operate several weaponized robotic platforms 1000.

Further referring to FIG. 28, once a system 1921 comprising the OC unit 1100 and the digitally encoded key 40 is created; the OC unit 1100 is operative to send command signals to the weaponized robotic platform 1000 via a communication link 1940. The communication link 1940 preferably includes a fiber optic cable interconnected between the OC unit 1100 and the weaponized robotic platform 1000 as described hereinabove. Other alternative communication links 1940 include a wireless signal such as infrared or laser, a radio signal, or any other serial communication link capable of relaying command signals between the OC unit 1100 and the weaponized robotic platform 1000. Once a command signal is received by the communication system 1024 of the weaponized robotic platform 1000, this signal is transmitted to the firing circuit 20 via the serial connection with microprocessor 1050. The signal is then decrypted by the firing circuit 20 and, if such signal is authenticated by the firing circuit 20, relayed to the sequencing circuit 1008, which activates the mechanically triggered weapon 1200 by means of the safety and trigger control assemblies 1003, 1005, as discussed below in further detail.

Alternative versions of the embodiment described above allow for different methods of achieving communication between the OC unit 1100 and the weaponized robotic platform 1000 to activate the components included in the sequencer. A first alternative embodiment includes one wherein a first OC unit 1100 establishes a communication link with the weaponized robotic platform 1000 and thus is the only OC unit 1100 able to control the weaponized robotic platform 1000. The weaponized robotic platform 1000 locks onto the OC 1100 such that other OC units are unable to establish a communication link with the weaponized robotic platform 1000 or control operation of the weaponized robotic platform 1000. A locked communication link between the weaponized robotic platform 1000 and the OC unit 1100 is maintained until the weaponized robotic platform 1000 powers down, the unit 1100 powers down, or the communication link between the OC unit 1100 and the weaponized robotic platform 1010 is lost or disrupted for a predetermined period of time. Once the locked communication link is lost or disrupted, other OC units 1100 are free to establish a communication link with the weaponized robotic platform 1000. An alternative to this embodiment includes a similar locked communication link scheme where the weaponized robotic platform 1000 and the OC unit 1100 exchange encryption algorithms once a locked communication link is established. The exchanged encryption algorithms allow the weaponized robotic platform 1000 and the OC unit 1100 to exchange encrypted data packets that are protected from interception by hostile parties due to the fact that authentication of such encrypted data packets can be accomplished only with the proper encryption algorithm. Yet another alternative embodiment contemplates a public key exchange where OC units 1100 and weaponized robotic platforms 1000 are encrypted with a public key before being sent out into the field. In such an embodiment, an OC unit 1100 and a weaponized robotic platform 1000 designated to perform a mission may be encrypted with a public key using a public key encryption algorithm prior to being dispatched on such mission. Such a public key encryption scheme ensures that only the designated weaponized robotic platform 1000 and the designated OC unit are able to communicate with each other. Such an embodiment also allows the encryption of several weaponized robotic platforms 1010 and several OC units 1100 by a single public key encryption algorithm so that a fleet of weaponized robotic platforms 1000 only communicate with like-encrypted OC units 1100. Thus, if any weaponized robotic platforms 1000 are intercepted by an adversary, such intercepted platforms 1000 are unable to communicate with other OC units 1100.

Further embodiments may include a charging and docking assembly for programming an OC unit 1100 and a weaponized robotic platform 1000 with a specific encryption algorithm. In such an embodiment, an OC unit 1100 and a weaponized robotic platform 1000 are integrated in combination with the charging and docking assembly to establish electrical communications therebetween. Once communications between all three components are established, the dock initiates an encryption routine in which an encryption algorithm is transmitted simultaneously to the docked OC unit 1100 and the docked weaponized robotic platform 1000. This encryption algorithm limits encrypted data communications between only the programmed OC unit 1100 and the programmed weaponized robotic platform 1100.

Other embodiments can include a charging and docking assembly able to program several weaponized robotic platforms 1010 and several OC units 1100 so that if any OC unit 1100 is destroyed or lost during a mission, alternative and properly programmed OC units 1100 are available. While the above embodiments relate to encrypted communications between an OC unit 1100 and a weaponized robotic platform 1000, alternative embodiments may include encrypted communication between a unit 1100 and a first weaponized robotic platform 1000, which is then able to communicate with and control one or more weaponized robotic platforms 1000.

Remote Firing Assembly

Figure 4:
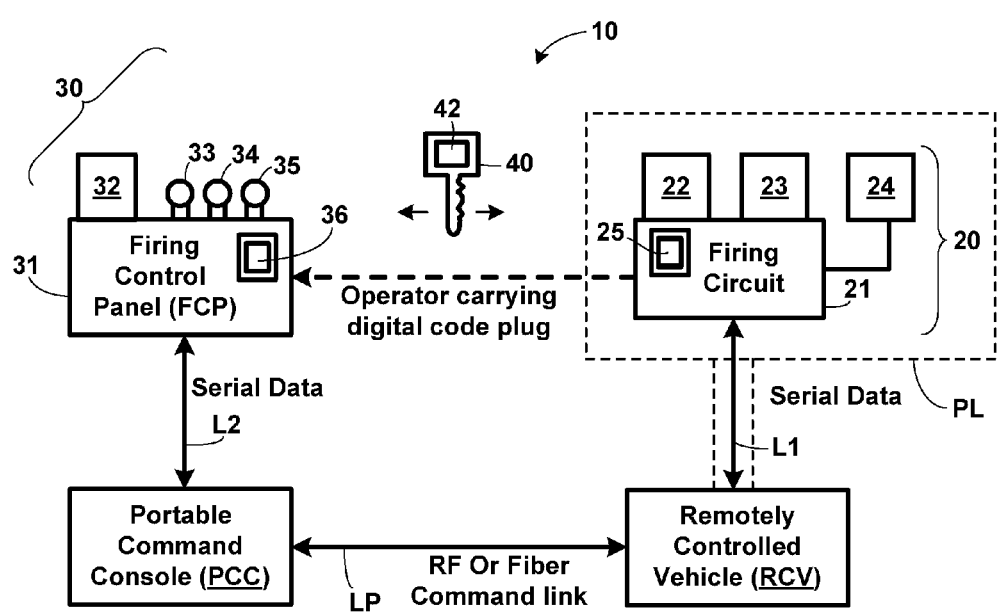
FIG. 4 is a block diagram of a remote digital firing system according to the present embodiment.

Referring now to the drawings wherein like reference numerals identify similar or corresponding elements throughout the several views, FIG. 4 illustrates a preferred embodiment of a remote digital firing system 10 according to the present invention. The firing system 10 is operative to allow weapon firing, e.g., ordnance disposal, in a safe and reliable manner, even using unreliable and insecure communication channels such as interconnected computers, radio and/or wire links, and/or optical fibers, through the use of one-time random session codes, rolling codes, and challenge-response protocols.

The remote digital firing system 10 comprises a firing circuit 20, a firing control panel 30, and a digital code plug 40. For the described embodiment, the firing circuit 20 and the firing control panel 30 are integrated in combination with secondary equipment as described below. The firing circuit 20 and the firing control panel 30 of the described embodiment are serially linked for communication by links L1, L2, and LP wherein L1 and L2 are internal links between the firing circuit 20 and the firing control panel 30 and the respective secondary equipment and LP is an external link between such secondary equipment, e.g., wireless, electrical, optical, or combinations thereof. The external link LP can pass through multiple computers, radio systems, optical tethers, and/or combinations thereof. Due to the particular features of the remote digital firing system 10 according to the present invention, the primary serial communication link LP can be shared with other applications, e.g., an insecure radio communications links for control a mobile robot, without risk that signals from such applications will adversely impact the operation of the firing system 10, e.g., inadvertent activation of the firing system 10.

The firing circuit 20 is typically integrated in combination with a remotely controlled vehicle RCV of the type manufactured by the iRobot Corporation, with the internal link L1 providing the communication path between the firing circuit 20 and the circuitry of the vehicle RCV. See, e.g., U.S. patent application Ser. No. 09/846,756, filed 1 May 2001, entitled METHOD AND SYSTEM FOR REMOTE CONTROL OF MOBILE ROBOT. The firing circuit 20 is communicatively coupled to an electrically-activated payload PL such as a detonator (or disrupter) and operative to actuate the payload PL when the firing circuit 20 is activated to effect weapon or ordnance disposal. For example, actuation of a payload PL such as a disrupter charge by a detonator causes high kinetic energy masses to separate the detonation mechanism from the primary explosive in a targeted ordnance device. For the described embodiment, the firing circuit 20 is mounted in a payload manipulator at end of a deployment mechanism of the vehicle RCV, which allows the payload PL to be manipulated into close proximity with the ordnance device while the vehicle RCV remains spatially separated therefrom.

The firing circuit 20, which is described in further detail below, includes a microcontroller 21, a modifiable, read-only memory module 22 such as an EEPROM or flash memory, an application module 23, a hardware random noise generator 24, and a set of indicator lights 25, e.g., LEDs. The microcontroller 21 is operative, using instruction sets stored in the application module 23, to implement and manage the functions of the firing circuit 20, including, but not necessarily limited to:

(1) Transmitting and receiving message traffic to/from the firing control panel 30 in accordance with a prescribed communication protocol.

(2) Automatically generating and storing a set of one-time random session variables, i.e., an encryption key, and command codes for a SAFE/DISARM operation, an ARM operation, and a FIRE operation, and a rolling code sequence any time the digital code plug 40 is integrated in communication combination with the firing circuit 20.

(3) Disabling the firing circuit 20 when the digital key plug 40 is inserted in communicative combination with the firing circuit 20 (software redundancy to the electronic disable provided by hardware configuration of the firing circuit 20).

(4) Comparing the SAFE/DISARM code session variable stored in the memory module 22 with the corresponding SAFE/DISARM code session variable received via message traffic from the firing control panel 30.

(5) Implementing a decryption algorithm to encode and decode message traffic to/from the firing control panel 30 as described below in further detail in the disclosure relating to the prescribed communication protocol.

(6) Automatically generating a Challenge message in response to a Request-for-Challenge message received from the firing control panel 30.

(7) Validating ARM and FIRE command messages received from the firing control panel 30 by comparing the ARM or FIRE code embodied in such command message with the ARM or FIRE code stored in the firing circuit 20.

(8) Selectively operating the firing circuit 20 in response to validated command messages generated by the firing control panel 30, such operations including SAFE/DISARM, ARM, and FIRE (activation) of the firing circuit 20 (see description below in connection with FIG. 6).

(9) Generating verification messages in response to validated SAFE/DISARM, ARM, and FIRE command messages from the firing control panel 30.

(10) Automatically safing/disarming the firing circuit 20 under predetermined conditions.

(11a) Automatically implementing hardware checks of the components comprising the firing circuit 20 after successful execution of a Fire command message.

(11b) Automatically disabling the remote digital firing system 10 if a hardware fault is detected; concomitantly set hardware fault indication.

(12) Disabling the firing circuit 20 in response to receipt of the omega rolling code sequence number from the firing control panel (see function (5) description for the firing control panel 30 below).

(13) Continually implementing a constant period loop, i.e., the master loop, to:
  (i) determine if the digital code plug 40 has been integrated in communicative combination with the firing circuit 20;
  (ii) parse incoming message characters;
  (iii) update condition of the status indicators;
  (iv) update internal counters;
  (v) check hardware status against the current state of the firing circuit 20 implemented via the instruction sets of the application module 23; and
  (vi) generate a time based entropy source for random number generation by counting rapidly while idle and waiting for the next iteration of the loop.

The foregoing functional capabilities ensure that no double bit error in the instruction sets of the application module 23, the memory module 24, or the program counter can cause accidental activation of the remote digital firing system 10. In some preferred embodiments, double bit error safety is accomplished in software by using state enumerators with large hamming distances, and using redundant global variables to restrict hardware access in combination with the state variables, where any inconsistency triggers an error state.

The memory module 22 is used to store the one-time random session variables for use by the firing circuit 20 during operation of the remote digital firing system 10. The application module 23 comprises the instruction sets used by the microcontroller 21 to implement the functions of the firing circuit 20 described above and the decryption algorithm utilized by the firing circuit 20 to decrypt Challenge and command messages received from the firing control panel 30. This decryption algorithm is also used by the firing circuit 20 to encrypt the corresponding verification messages transmitted to the firing control panel 30 in accordance with the prescribed communication protocol. Alternatively, these instruction sets and the decryption algorithm can be stored in the memory module 23. The instruction sets for the firing circuit 20 can be implemented as hardware, software, firmware, or combinations thereof.

Figure 5:
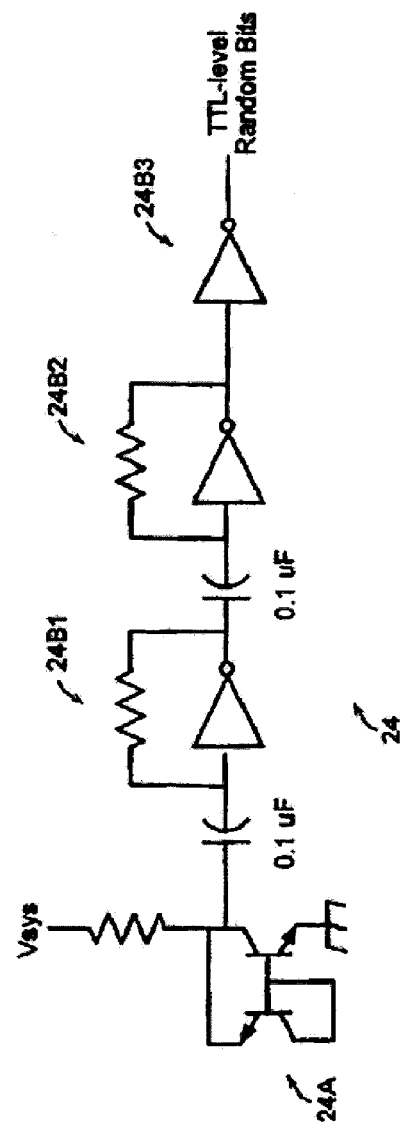
FIG. 5 is a schematic representation of the random noise generator's hardware.

FIG. 5 illustrates an embodiment of the hardware random noise generator 24 of the firing circuit 20 that is operative to produce random binary bits that comprise the one-time random session variables, i.e., the encryption key, the SAFE/DISARM code, the ARM code, and the FIRE code, that govern the operation of the firing system 10 according to the present invention. This hardware random noise generator 24 comprises a reverse-biased PN transistor junction 24A to produce amplified avalanche noise that is subsequently filtered through several logic gates 24B1, 24B2, 24B3. The circuit of FIG. 5 is not highly tuned and operates effectively over a wide range of part tolerances. One of skill in the art will recognize that any one of several hardware random noise generators known in the art could be used. Bias in the generated bit stream is eliminated by repetitive XOR sampling. The functionality of the circuit is verified by the microcontroller software by checking for all ones or all zeros in the output stream. While the firing circuit 20 of the present invention can utilize a pseudorandom software algorithm to generate random numbers for the encryption key and variable session codes, it should be appreciated that such a software algorithm can be subjected to predictive crypto analysis.

For the described embodiment, the encryption key comprises 128 randomly-generated bits, the SAFE/DISARM code comprises 32 randomly-generated bits, the ARM code comprises 32 randomly-generated bits, and the FIRE code comprises 32 randomly-generated bits. These key and code lengths are sufficient to deter brute force decryption attacks that may be anticipated to be successful within a reasonable amount of time. Alternatively, other bit lengths can be utilized for the key and codes and still be within the scope of the remote digital firing system 10 according to the present invention. The random noise generator 24 is only operative when the digital code plug 40 is integrated in communicative combination with the firing circuit 20.

Figure 26:
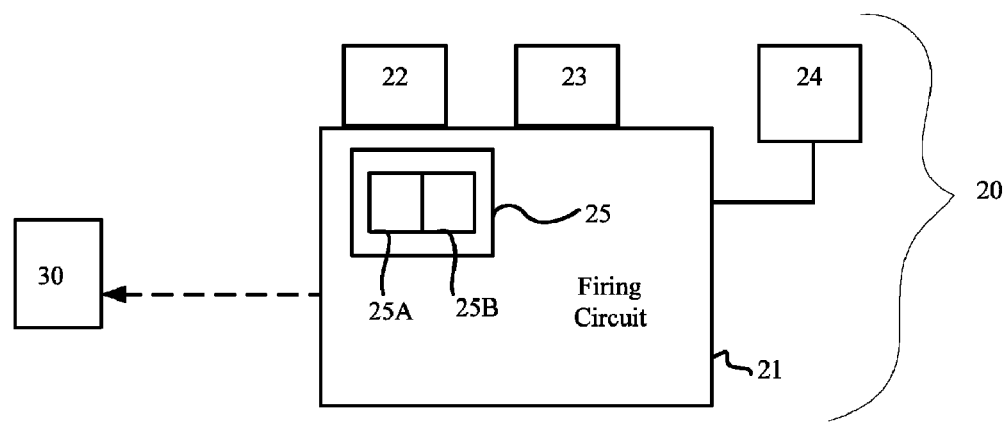
FIG. 26 is a schematic illustration of the firing circuit.

As illustrated in FIG. 26, the described embodiment of the firing circuit 20 includes two indicator lights 25, a red indicator light 25A and a green indicator light 25B, that provide visual indications of the status of the firing circuit 20 to the system operator. An illuminated green indicator light 25B indicates that the firing circuit 20 is in a disarmed (safe) state, a steadily illuminated red indicator light 25A indicates that the firing circuit 20 is armed (ready to fire). While a flashing illuminated red indicator light 25A indicates a malfunction associated with the firing circuit 20. The status indications provided by these indicator lights 25 are described below in further detail in conjunction with the description of a nominal operating method for the remote digital firing system 10 according to the present invention.

The firing control panel 30 is typically integrated in combination with a portable command console (PCC) or Operator Control Unit (OCU) for mobility, with the internal link L2 providing the communication path between the firing control panel 30 and the circuitry of the console PCC. The primary serial communications link LP described above provides the communication pathway between the portable command console PCC and the vehicle RCV.

The firing control panel 30 includes a microcontroller 31, an application module 32, a link test mechanism 33, an arming mechanism 34, a firing mechanism 35, and a set of indicator lights 36. The microcontroller 31 is operative, using instruction sets stored in the application module 32, to implement and manage the functions of the firing control panel 30, including, but not necessarily limited to:

(1) Transmitting and receiving message traffic to/from the firing circuit 20 in accordance with the prescribed communication protocol.

(2) Retrieving and processing the one-time random session variables and the rolling code sequence stored in the digital code plug 40 in connection with the generation of command messages.

(3) Automatically implementing a link test with the firing circuit 20 upon insertion of the digital key plug 40 in communicative combination with the firing control panel 30 (includes reading the SAFE/DISARM CODE, the encryption key, and the rolling code sequence from the digital key plug 40); link test will also be automatically implemented if any of the circumstances described in paragraphs (9) (iii)-(v) exist.

(4) Implementing the link test in response to actuation of the link-test mechanism 33 by a system operator.

(5) Transmitting the omega rolling code sequence (rolling code sequence number 255 for the described embodiment) when the digital code plug 40 is removed from communicative combination with the firing control panel 30 while simultaneously actuating the link-test mechanism 33 (see description of function (12) of the firing circuit 20 above).

(6) Erasing the stored contents (e.g., one-time random session variables and rolling code sequence) of the digital code plug 40 when the link-test mechanism 33 is actuated while simultaneously integrating the digital code plug 40 in communicative combination with the firing control panel 30;

(7) Implementing an encryption algorithm to encode and decode command message traffic to/from the firing circuit 20 as described below in further detail in the disclosure relating to the prescribed communication protocol.

(8) Automatically generating the Request-for-Challenge message and an ARM command message in response to manipulation of the arming mechanism 34 by an operator and transmitting such Request-for-Challenge and ARM command messages to the firing circuit 20 (the ARM code is read from the digital code plug 40 as a precursor to generation of the ARM command message).

(9a) Implementing an arming mechanism 34 check to determine if it has been moved to the armed position within a predetermined time interval, e.g., twenty (20) seconds for the described embodiment; and (9b) Automatically generating, if (9a) is true, the Request-for-Challenge message and a FIRE command message in response to manipulation of the firing mechanism 35 by an operator and transmitting such Request-for-Challenge and F<small>IRE</small> command messages to the firing circuit 20 (the F<small>IRE</small> code is read from the digital code plug 40 as a precursor to generation of the F<small>IRE</small> command message).

(10) Validating Challenge messages received from the firing circuit 20 in response to corresponding Request-for-Challenge messages issued by the firing control panel 30, which includes a step of verifying that the applicable mechanism, i.e., the arming mechanism 34 or the firing mechanism 35, is still in the actuated position.

(11) Generating system error messages if:
- (i) the firing mechanism 35 is actuated and the arming mechanism 33 is in the safe position;
- (ii) the firing mechanism 35 is actuated while the link-test mechanism 33 is actuated;
- (iii) the arming mechanism 34 is left in the armed position for more than the predetermined time interval (see paragraph (9a);
- (iv) the link-test mechanism 33 is actuated while the arming mechanism 34 is in the armed position; and
- (v) the link-test mechanism 33 is actuated while the firing mechanism 35 is actuated.

The application module 32 comprises the instruction sets used by the microcontroller 31 to implement the functions of the firing control panel 30 described above and the encryption algorithm utilized by the firing control panel 30 to encrypt Request-for-Challenge and command messages transmitted to the firing circuit 20 in accordance with the prescribed communication protocol. This encryption algorithm is also used by the firing control panel 30 to decrypt the corresponding 'encrypted' verification messages received from the firing circuit 20. The instruction sets for the firing control panel 30 can be implemented as hardware, software, firmware, or combinations thereof.

The link-test mechanism 33 is operative, in response to manipulation by an operator, to generate a signal that causes the microcontroller 31 to implement the instruction set for generating and transmitting the S<small>AFE</small>/D<small>ISARM</small> command message to the firing circuit 20. For the described embodiment, the link-test mechanism 33 is a push button. The arming mechanism 34 is operative, in response to manipulation by an operator, to generate a signal that causes the microcontroller 31 to implement the instruction sets for generating and transmitting the Request-for-Challenge and A<small>RM</small> command signals, respectively, to the firing circuit 20. For the described embodiment, the arming mechanism 34 is 90° rotary selector switch. The firing mechanism 35 is operative, in response to manipulation by an operator, to generate a signal that causes the microcontroller 31 to implement the instruction sets for generating and transmitting the Request-for-Challenge and F<small>IRE</small> command messages, respectively, to the firing circuit 20. For the described embodiment the firing mechanism 35 is a locking, transient toggle switch, i.e., the toggle must be pulled to disengage a lock mechanism before the switch can be actuated. Preferably both the arming and firing mechanisms 34, 35 are single pole, double throw type switches tied to two input lines so that for a switch manipulation to generate a signal, two input bits must be changed before the microcontroller 31 recognizes the new switch position as valid and implements the corresponding instruction sets.

Figure 25:
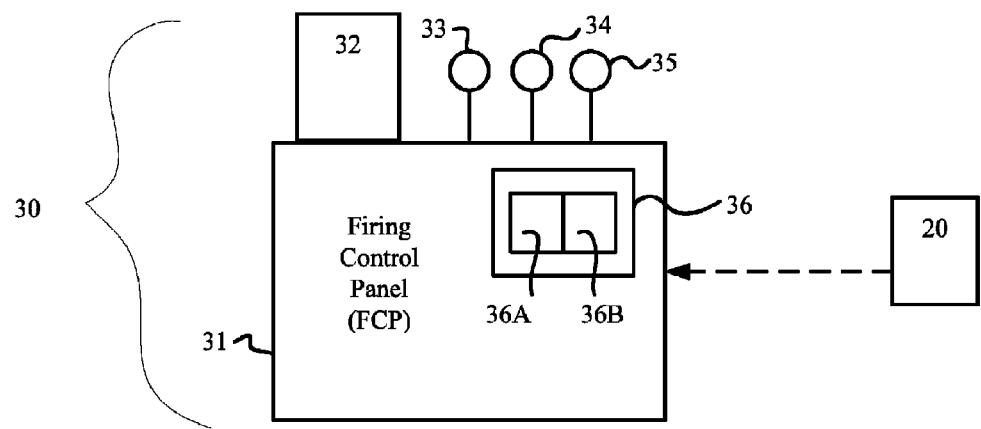
FIG. 25 is a schematic illustration of the firing control panel.

As shown in FIGS. 4 and 25, the described embodiment of the firing control panel 30 includes two indicator lights 36, a red indicator light 36A and a green indicator light 36B that provide visual indications of the status of the firing control panel 30. An illuminated green indicator light 36B indicates that the firing circuit 20 is in a disarmed (safe) state, a steadily-illuminated red indicator light 36A indicates that the firing control panel 30 is armed (ready to fire), and a flashing illuminated red indicator light 36A indicates a malfunction associated with the firing control panel 30. The status indications provided by these indicator lights 36 are described below in further detail in conjunction with the description of a nominal operating sequence of the remote digital firing system 10 according to the present invention.

The digital code plug 40 provides the means for securely transferring the one-time random session variables and the rolling code sequence generated by the firing circuit 20 to the firing control panel 30 and for temporarily storing such session variables and the rolling code sequence for use by the firing control panel 30 during operation of the remote digital firing system 10. The digital code plug 40 is a mechanism or device that is physically and functionally temporarily integrated in communicative combination with the firing circuit 20 and the fire control panel 30. For the described embodiment, the portable control console PCC physically receives the digital code plug 40 (e.g., via a digital key socket), while the vehicle RCV physically receives the digital code plug 40 (e.g., via a digital key socket). The firing circuit 20 and/or the firing control panel 30 may directly physically receive the digital code plug 40. The digital code plug 40 includes a memory module 42, e.g., ROM, EEPROM, flash memory, for storing the one-time random session variables and the rolling code sequence.

For the described embodiment, the digital code plug 40 is a Dallas DS2433-Z01 4K EEPROM that uses a proprietary interface for reading and writing. The EEPROM is encased in a waterproof metal key assembly, which provides a complete electrical shield when this digital code plug 40 is integrated in communicative combination with the firing circuit 20. The metal key assembly is encased in a plastic case to facilitate handling and to improve the physical robustness of the digital code plug 40. Other mechanisms that include a digital storage capability can be used in conjunction with the remote digital firing system 10 to implement the functionality provided by the digital code plug 40 described herein—e.g., a smart card.

When the digital code plug 40 is integrated in communicative combination with the firing circuit 20, the hardware random noise generator 24 is activated by the microcontroller 21 to generate (in combination with a time based entropy source) the random binary bits that form the encryption key, the S<small>AFE</small>/D<small>ISARM</small> code, the A<small>RM</small> code, and the F<small>IRE</small> code comprising the one-time random session variables, and the rolling code sequence is initialized to zero. The microcontroller 21 is operative to simultaneously write these one-time random session variables and the rolling code sequence into the memory module 42 of the digital code plug 40 and the memory module 23 of the firing circuit 20.

The remote digital firing system 10 according to the present invention utilizes a prescribed communication protocol to ensure the operational integrity and security of the firing system 10, i.e., eliminating or substantially minimizing the likelihood of operation of the firing system 10 as a result of spurious message traffic or electrical signals generated by outside sources or the firing system 10 itself. This prescribed communication protocol includes four different message types, i.e., status messages, request—challenge messages, command messages, and verification messages, predefined message characters or symbols, a predetermined message data block format, and a singular symmetric encryption/decryption scheme for all request—challenge, command, and verification message traffic as described below.

(a) Use of a message-originator character or symbol to identify the message traffic initiator, i.e., as either the firing circuit 20 or the firing control panel 30. For the described embodiment, the symbol "@" is used to identify the firing circuit 20 as the message originator and the symbol "$" is used to identify the firing control panel 30 as the message originator. This message-originator character/symbol is always the first element of any message and is transmitted as clear text.

(b) Use of a predefined status character or symbol to identify operations involving the digital code plug 40. For the described embodiment, the character "K" identifies the integration of the digital code plug 40 in communicative combination with the firing circuit 20 or the firing control panel 30, and the character/symbol "k" identifies the removal of the digital code plug 40 from communicative combination with the firing circuit 20 or the firing control panel 30. These two symbols can be detected by the RCV or PCC, as applicable, and used to disable or enable vehicle functions, such as disabling the drive motors of the RCV while the key is inserted to prevent inadvertent motion. The status character/symbol is always the last element of a status message and is transmitted as clear text. For the described embodiment, which includes an identifier for a plurality of target systems (as discussed below), this predefined character/symbol is the third (and last) element of a status message.

(c) Generation of an automatic status message in conjunction with the use of the digital code plug 40 as described in paragraph (b), i.e., whenever the digital code plug 40 is integrated in or removed from communicative combination with the firing circuit 20 or the firing control panel 30. For the described embodiment, the status message consists of three elements (see Table II).

(d) A method of addressing messages to multiple firing circuits 20n (where n is an integer identifying individual firing circuits) from a single firing control panel 30, such that each message originating at the firing control panel 30 contains the address of the intended firing circuit 20n and each message originating at a firing circuit 20n contains its unique address. In this implementation, the address is a single hexadecimal character, allowing up to 16 devices, but one skilled in the art can easily expand the address space.

(e) A method of selecting the desired weapon, i.e., firing circuit 20n, by means of a rotary selector switch.

(f) The digital code plug 40 also contains the name of the weapon whose codes it contains. When using multiple firing circuits 20n, the name of the weapon selected by the user can be displayed on an LCD to clearly indicate which weapon has been selected.

(g) Whenever the selected weapon is changed with the rotary switch, the name of the newly selected weapon is transmitted over the serial link preceded by the address of the selected weapon and the "N" character (i. E. $0NICECAP) so the selected weapon can be displayed on the OCU. A link-test message is automatically generated and transmitted to the weapon selected via the rotary switch by means of the firing control panel 30.

(h) Generation of an automatic link-test message upon integration of the digital code plug 40 in communicative combination with the firing control panel 30. This link-test message is also generated any time the link-test mechanism 33 is actuated. This message is also automatically generated as a result of the detection of an operator error caused by improper activation sequence of the switches (see paragraph (11) description of this function of the firing control panel 30). For the described embodiment, the link-test message comprises the S<small>AFE</small>/D<small>ISARM</small> command message described in further detail in paragraphs (i), (j), (k), and (m).

(i) Use of a predefined character or symbol to identify the command messages of the prescribed communication protocol, i.e., the S<small>AFE</small>/D<small>ISARM</small> command message, the A<small>RM</small> command message, and the F<small>IRE</small> command message, the corresponding verification messages associated with each of these command messages, and the request-challenge messages. For the described embodiment, the command messages utilize the character "S" to identify the S<small>AFE</small>/D<small>ISARM</small> command message, the character "A" to identify the A<small>RM</small> command message, and the character "F" to identify the F<small>IRE</small> message. For the verification messages, the described embodiment utilizes the character "V", in conjunction with the corresponding command message character/symbol, to identify verification messages, which indicates that the corresponding action has been executed by the firing circuit 20, i.e., safing or disarming of the firing circuit 20, arming of the circuit 20, or activating (firing) the firing circuit 20. The described embodiment uses the characters "R" and "C" to identify Request-for-Challenge and Challenge messages, respectively. The message-type character/symbol is always the last unencrypted element for any of the foregoing message types.

(j) Use of predefined, constant data block formats for the all request—challenge, command, and verification messages exchanged between the firing circuit 20 and the firing control panel 30. For the described embodiment, the data block format comprises 64 (sixty-four) bits for the request-challenge and command messages and 16 (sixteen) bits for the verification messages (all in hexadecimal format). One skilled in the art will appreciate that data block formats of other bit lengths can be used without departing from the scope of the remote digital firing system 10 of the present invention. The specific data block format for each of the various message types of the prescribed communication protocol are illustrated in Table I wherein the terminology "random number" indicates a variable required in the message validation process and the terminology "unspecified" indicates a variable that functions as a block filler, i.e., not used in the message validation process.

TABLE I

| MESSAGE TYPE | DATA BLOCK FORMAT |
|---|---|
| M1. Request for Challenge | 32 bits (unspecified)<br>16 bits (random number)<br>16 bits (unspecified) |
| M2. Challenge | 16 bits (random number challenge)<br>16 bits (unspecified)<br>16 bits (random number - from Request Msg)<br>16 bits (unspecified) |
| M3. SAFE/ DISARM Command | 32 bits (SAFE/DISARM code - read from digital code plug 40)<br>8 bits (rolling code sequence - read from digital code plug 40)<br>16 bits (random challenge number - from Challenge Msg)<br>8 bits (unspecified) |
| M4. SAFE/ DISARM Verification | 16 bits (random challenge number - from SAFE/DISARM Command Msg) |
| M5. ARM Command | 32 bits (ARM code - read from digital code plug 40)<br>16 bits (random challenge number - from Challenge Msg)<br>16 bits (unspecified) |
| M6. ARM Verification | 16 bits (random challenge number - from ARM Command Msg) |
| M7. FIRE Command | 32 bits (FIRE code - read from digital code plug 40)<br>16 bits (random challenge number - from Challenge Msg)<br>16 bits (unspecified) |

TABLE I-continued

| MESSAGE TYPE | DATA BLOCK FORMAT |
|---|---|
| M8. FIRE Verification | 16 bits (random challenge number - from FIRE Command Msg) |

(k) As depicted in Table I, the data block of the Safe/Disarm command message M3 includes a rolling code sequence of 8 (eight) bits. As initially stored in both the memory module 23 of the firing circuit 20 and the digital code plug 40, the rolling code sequence is a string of 0s (zeros). When the digital code plug 40 is integrated in communicative combination with the firing control panel 30, the microcontroller 31 is operative to read the rolling code sequence stored in the memory module 42 of the digital code plug 40, e.g., a string of 0s (zeros), and generate the SAFE/DISARM command message that includes this rolling code sequence. The microcontroller 31 is then operative to increment the rolling code sequence, e.g., by 1 (one), and store the incremented rolling code sequence, e.g., 00000001, in the memory module 42 of the digital code plug 40. When this SAFE/DISARM command message is received by the firing circuit 20, the microcontroller 21 compares the value of the rolling code sequence embedded in the SAFE/DISARM command message with the value of the rolling code sequence stored in the memory module 23. If the received rolling code sequence is greater than or equal to the stored rolling code sequence, then the received rolling code sequence of the SAFE/DISARM command message is accepted by the firing circuit 20 as valid. If the SAFE/DISARM command message M3 is accepted as valid by the firing circuit 20 (see paragraph (m)), the microcontroller 21 increments, e.g., by 1 (one), the rolling code sequence stored in the memory module 23. This validation procedure for the rolling code sequence is performed in conjunction with each transmission and reception of the link-test message (SAFE/DISARM command message M3), whether due to removal of and re-integration of the digital code plug 40 in communicative combination with the firing control panel 30, actuation of the link-test mechanism 33 by a system operator, or generation of the SAFE/DISARM command message as a result of a detected system error.

(l) Use of an automatic request—challenge message protocol between the firing circuit 20 and the firing control panel 30 prior to initiation of the ARM or FIRE command messages M5 or M7 by the firing control panel 30. Prior to initiating either the ARM Command or the FIRE Command, the firing control panel 30 automatically formats, encrypts, and transmits the Request-for-Challenge message M1 to the firing circuit 20 as a result of the actuation of the arming mechanism 34 or the firing mechanism 35, as applicable. In response to a Request-for-Challenge message M1, the firing circuit 20 is operative to format, 'encrypt' and transmit the Challenge message M2 to the firing control panel 30. Upon receipt of the Challenge message M2, the firing control panel 30 is automatically operative to 'decrypt' the Challenge message M2 (to access the random challenge number), to read the applicable ARM or FIRE code from the digital code plug 40, and to format, encrypt, and transmit the applicable command message to the firing circuit 20.

(m) Implementation of a validation protocol by the firing circuit 20 in connection with the SAFE/DISARM, ARM, and FIRE command messages M3, M5, or M7. This validation protocol comprises a comparison of the session variable, i.e., SAFE/DISARM code, ARM code or FIRE code, as applicable, embodied in the decrypted message data block with the corresponding session variable stored in the memory module 23 of the firing circuit 20. In addition, for the ARM and FIRE command messages M5, M7, the firing circuit 20 is further operative to compare the random number challenge embodied in the command message M5 or M7 with the random number challenge generated by the firing circuit 20 and incorporated in the preceding Challenge message M2 issued by the firing circuit 20.

(n) Use of validity windows in conjunction with: (i) receipt of the Challenge message M2 in response to the Request for Challenge message M1; and (ii) receipt of an ARM or FIRE command message M5 or M7 subsequent to transmission of the Challenge message M2 wherein such validity windows define established time limits for acceptance of such messages. The firing control panel 30 is responsive only to a Challenge message M2 received within an established validity window referenced from transmission of the Request-for-Challenge message M1. In a similar manner, the firing circuit 20 accepts an Arm or Fire command message M5 or M7 from the firing control panel 30 only if such command is received within an established validity window referenced from transmission of the Challenge message M2. For the described embodiment, the established validity window is two seconds for both the request—challenge protocol and reception of the command message. The remote digital firing system 10 may use different time limits for the validity windows for message receipt constraints or a time value other than two seconds for either or both of the message receipt constraints described above, for example.

(o) Encryption of the data blocks of all request—challenge protocol, command, and verification message traffic between the firing circuit 20 and the fire control panel 30. The firing control panel 30 includes an algorithm for encrypting the data blocks of the Request-for-Challenge messages and the SAFE/DISARM, ARM, and FIRE command messages generated by the firing control panel 30 for transmission to the firing circuit 20. The firing circuit 20 includes an algorithm for decrypting the data blocks of the Request-for-Challenge messages and the SAFE/DISARM, ARM, and FIRE command messages received from the firing control panel 30. The firing circuit 20, however, does not include an encryption algorithm; nor does the firing control panel 30 include a decryption algorithm. However, inasmuch as remote digital firing system 10 of the present invention employs a symmetric cryptographic scheme, the decryption algorithm of the firing circuit 20 is utilized to 'encrypt' the cleartext data blocks of the Challenge and verification messages M1, M4, M6, M8 generated by the firing circuit 20. In a similar manner, the encryption algorithm of the firing control panel 30 is utilized to 'decrypt' the 'encrypted' data blocks of the Challenge and verification messages M1, M4, M6, M8 received from the firing circuit 20.

The singular encryption/decryption scheme for the remote digital firing system 10 of the present invention described in the preceding paragraph provides several tangible benefits. Since each microcontroller 21, 31 only utilizes one algorithm to perform both the encryption and decryption functions, the algorithm code stored in the respective memory module 23, 32 is significantly reduced. And since the firing control panel 30 includes only the encryption algorithm, encrypted command codes in the firing control panel 30 cannot be reconstructed since the decryption algorithm does not exist at the firing control panel 30. This guarantees that once the digital code plug 40 is removed from communicative combination with the firing control panel 30, the requisite responses to Challenge messages M2 cannot be generated at the firing control panel 30, i.e., the ARM Command message M5 or the FIRE command message M7.

In light of use of one-time random session variables and the limited number of messages that are subject to encryption under the prescribed communication protocol for the remote digital firing system 10 according to the present invention, the encryption algorithm for the firing system 10 need not possess a high degree of cryptographic security and need not be computationally intensive. Accordingly, the encryption algorithm implemented in the firing system 10 can be a relatively compact and low-overhead algorithm that enhances the computational speed of the remote digital firing system 10 of the present invention. The described embodiment of the firing system 10 utilizes the XTEA algorithm, which is an extension of the Tiny Encryption Algorithm.

(p) Responding to invalid command messages. An invalid command message is one wherein: (i) the cleartext string of the command message does not include the required characters/symbols—see paragraphs (a) and (i); or (ii) the session code embodied in the data block of the command message does not match the corresponding session code stored in the memory module 22 of the firing circuit 20. The firing circuit 20 is operative to ignore any invalid command message; in addition, for a type (ii) invalid message, the firing circuit 20 will automatically transmit a predefined character/symbol to the firing control panel 30 to indicate use of the wrong digital code plug 40.

In addition to the foregoing, the prescribed communication protocol for the remote digital firing system 10 according to the present invention can also include a predetermined character/symbol following the message-initiator identification character/symbol (see paragraph (a)), i.e., the second character/symbol of any message, that is used to identify up to sixteen different target systems where each vehicle RCV, firing circuit 20 combination comprises a target system. The embodiment described herein uses the "0" symbol as the target system identifier since the description provided herein is in terms of a single target system. This element is transmitted as clear text.

Table II illustrates the characteristics of the prescribed communication protocol for the remote digital firing system 10 according to the present invention as described above. Underlined segments of the message format identify the message types, i.e., Request-for-Challenge and Challenge messages, SAFE/DISARM, ARM, and FIRE command messages, verification messages. Italicized portions of the message format identify ciphertext (encrypted data blocks in hexadecimal format).

TABLE II

| ACTION | MSG ID | MESSAGE FORMAT | DESCRIPTION |
|---|---|---|---|
| ❶ Integration of digital code plug 40 in communicative combination with the firing circuit 20 | | @0K | Status Message - see paragraphs (a), (b), and (c) |
| ❷ Removal of the digital code plug 40 from communicative combination with the firing circuit 20 | | @0k | Status Message - see paragraphs (a), (b), and (c) |
| ❸ Integration of digital code plug 40 in communicative combination with the firing control panel 30 | | $0K | See paragraphs (a), (b), and (c) |
| ❹ Removal of the digital code plug 40 from communicative combination with the digital firing circuit 20 | | $0k | See paragraphs (a), (b), and (c) |
| ❺ Integration of digital code plug 40 in communicative combination with the firing control panel 30 (or actuation of the link-test mechanism 33 or deactuation of the arming mechanism 34) | M3 | $0_S_FEDCBA9876543210 | See paragraphs (i), (j), (k), and (m) |
| Validation of the SAFE/DISARM command message M3 | M4 | @0_VS_FEDC | See paragraphs (i), (j), (k), and (m) |
| ❻ Actuation of the arming mechanism 34 | M1 | $0_R_FEDCBA9876543210 | See paragraphs (i), (j), (l), (m), and (o) |
| Response to a Request-for-Challenge message M1 | M2 | @0_C_FEDCBA9876543210 | See paragraphs (i), (j), (l), (m), (n), and (o) |
| Validation of the Challenge message M2 - automatic transmittal of the ARM command message | M5 | $0_A_FEDCBA9876543210 | See paragraphs (i), (j), (m), (n), and (o) |
| Validation of the ARM command message M5 - firing circuit 20 transitioned to the armed state | M6 | @0_VA_FEDC | See paragraphs (i), (j), (n), and (o) |
| ❼ Actuation of the firing mechanism 35 | M1 | $0_R_FEDCBA9876543210 | See paragraphs (i), (j), (l), (m), and (o) |
| Response to a Request-for-Challenge message M1 | M2 | @0_C_FEDCBA9876543210 | See paragraphs (i), (j), (l), (m), (n), and (o) |

TABLE II-continued

| ACTION | MSG ID | MESSAGE FORMAT | DESCRIPTION |
|---|---|---|---|
| Validation of the Challenge message M2 - automatic transmittal of the FIRE command message | M7 | $0F̲FEDCBA9876543210 | See paragraphs (i), (j), (m), (n), and (o) |
| Validation of the FIRE command message M7 - firing circuit 20 activated (fired) | M8 | @0V̲FFEDC | See paragraphs (i), (j), (n), and (o) |

Firing Circuit

Figure 6:
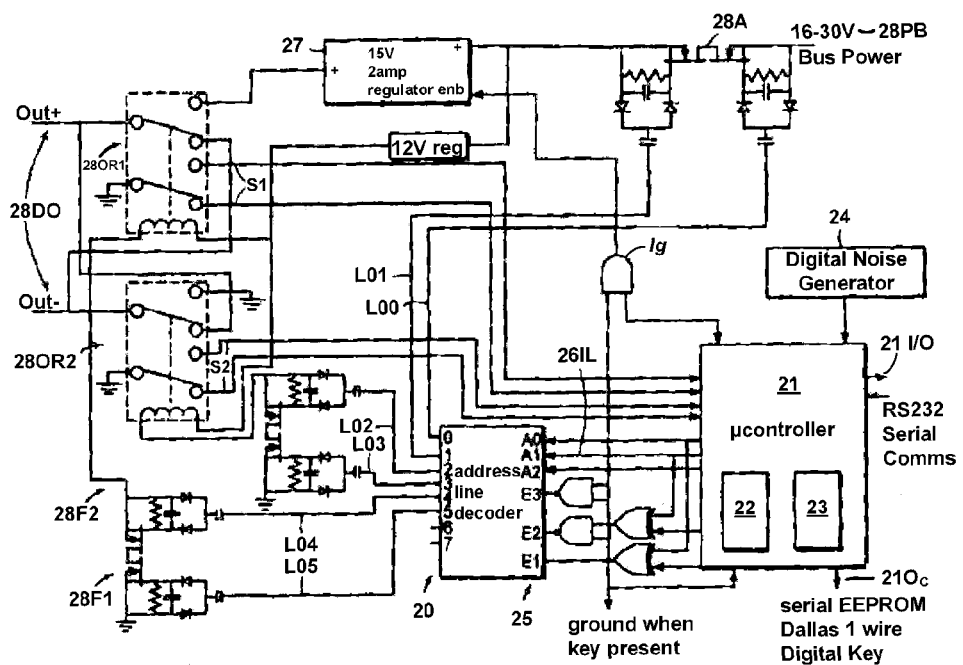
FIG. 6 is a preferred embodiment of a schematic of the firing circuit.

FIG. 6 illustrates a preferred embodiment of a schematic of the firing circuit 20 for the remote digital firing system 10 according to the present invention. The firing circuit 20 includes, in addition to the microcontroller 21, the modifiable, read-only memory module 22, the application module 23, and the hardware random noise generator 24 described above, a conventional input/output interface 21I/O, e.g., a 9600 baud RS232 link, for communications with the firing control panel 30 (via serial link L2, the portable control console PCC, the external link LP, vehicle RCV, and serial link L1 for the described embodiment), a proprietary Dallas 1-wire interface $21O_{40}$ for writing the one-time random encryption key and session codes to the digital code key 40 when the digital code plug 40 is integrated in communicative combination with the firing circuit 20, an address line decoder chip 26, an output regulator 27, a power bus 28PB, an arming stage 28A, first and second firing stages 28F1, 28F2, first and second output relays 28OR1, 28OR2, and dual output lines 28DO.

The decoder 26 includes input lines 26IL (address and enable) from the microcontroller 21 and output lines L00-L05 connected to the arming stage 28A (lines L00, L01), the first firing stage 28F1 (lines L02, L03) and the second firing stage 28F2 (lines L04, L05). The decoder 26 is operative, in response to a signal transmitted by the microcontroller 21, to selectively enable one of these output lines for transmission of a narrow band pulsed signal. The decoder 26 depicted in FIG. 6 is a 3-to-8 line decoder such that the microcontroller 21 can only access one branch of any stage 28A, 28F1, or 28F2 at a time, thereby substantially reducing the potential for randomly accessing these stages 28A, 28F1, or 28F2. To further negate the possibility of random access, the three address input lines and two of the enable lines of the 3-to-8 line decoder 26 are crossed with XOR gates, requiring two other output ports of the microcontroller 21 to be coordinated before any output line of the 3-to-8 line decoder 26 can be enabled.

The microcontroller 21 is operative, in response to the ARM command message, to transmit two sequential signals (3-bit address, enable) to the 3-to-8 line decoder 26, which is operative in response to such signals to transmit narrow band pulsed signals on the sequentially enabled output lines L00 and L01 to enable the arming stage 28A. In a similar manner, the microcontroller 21 is operative in response to the FIRE command message to sequentially transmit six sequential signals (3-bit address, enable) to the 3-to-8 line decoder 26, which is operative in response to such signals to transmit narrow band pulsed signals on the sequentially enabled output lines L00-L05 to enable the first and second firing stages 28F1, 28F2 as well as the arming stage 28A. The microcontroller 21 is also operative, in response to the Safe/Disarm command message, to transmit a signal (enable) to disable all output lines L00-L05 of the 3-to-8 line decoder 26, thereby disabling the arming stage 28A and the firing stages 28F1, 28F2, and de-energizing the output relays 28OR1, 28OR2.

The output regulator 27 is electrically connected to one side of the arming stage 28A and to one terminal of the first output relay 28OR1. The output regulator 27 is operative in response to an enable signal from the microcontroller 21, to produce an output of no more than 15 volts and no more than 2 amps for approximately 300 msec (actual output voltage and current depends on the output load).

The arming stage 28A and first and second firing stages 28F1, 28F2 are operative in enabled combination to complete the electrical circuit between the power bus 28PB and the dual output lines 28D0 of the firing circuit 20. Enabling of the arming stage 28A completes the electrical circuit between the power bus 28PB and the output regulator 27. Enabling the first and second firing circuits 28F1, 28F2 energizes the first and second output relays 28OR1, 28OR2, respectively, to complete the electrical circuit between the output regulator 27 and the dual output lines 28DO.

Figure 6A:
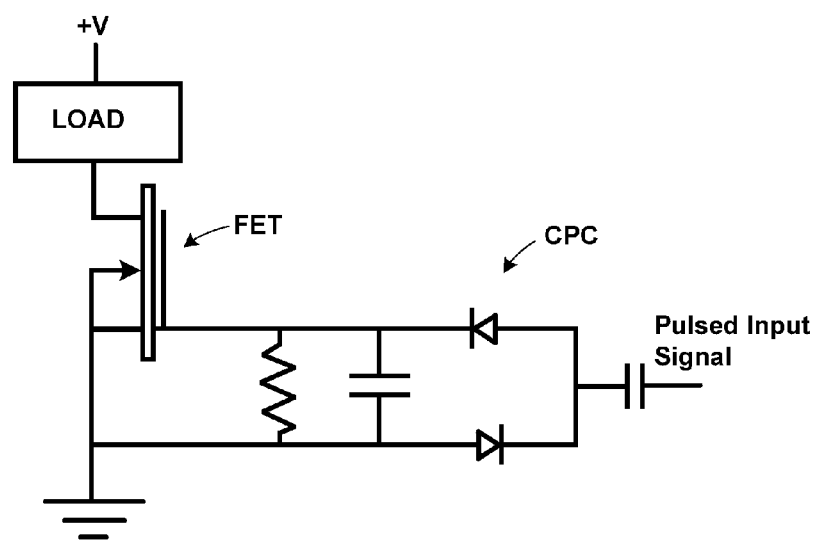
FIG. 6a is a schematic representation of the pumped capacitor field effect transistor driver used in the firing circuit.

The arming stage 28A and the first and second firing stage 28F1, 28F2 of the described embodiment each comprise a pair of serialized field effect transistors (FETs), with the operation of each FET being regulated by a dedicated capacitive pumping subcircuit (see FIG. 6A which illustrates an FET enabled by a capacitive pumping subcircuit CPC). The FET pair of each stage 28A, 28F1, 28F2 are of different types, i.e., an N type and a P type, each FET type having a different failure mode to increase the reliability of the arming and firing subcircuits 28A, 28F1, 28F2. The dedicated capacitive pumping subcircuits of the arming stage 28A and firing stage 28F1, 28F2 are coupled to (via output lines L00-L05, respectively) and operate only in response to narrow band pulsed signals from the decoder chip 26, which effectively eliminates the possibility of any spurious signals enabling any of the stages 28A, 28F1, 28F2.

The output relays 28OR1, 28OR2 of the described embodiment are operative, when energized, to complete the circuit between the output regulator 27 and the dual output lines 28DO. For the described embodiment, the output relays 28OR1, 28OR2 are from the NAIS TX series, rated for 2 amps switching at 30 volts. The output relays 28OR1, 28OR2 have a balanced mechanism that moves about an axis parallel to the firing circuit 20 PC board and are highly resistant to shock effects (75G malfunction rating). The output relays 28OR1, 28OR2 are mounted at different orientations relative to one another so that a single shock event is unlikely to trigger both output relays 28OR1, 28OR2. The rated life of such relays is approximately 100,000 cycles at 2 amps switching, but since the output relays 28OR1, 28OR2 are not used to switch current, their operational life should be significantly greater.

The dual output lines 28DO of the first and second output relays 28OR1, 28OR2 are shorted together until both output relays 28OR1, 28OR2 are closed (enabled). This configuration allows a system operator to verify the functionality of the firing circuit 20 before attaching a munition, and keeps the dual output lines 28D0 in a shorted state to eliminate any adverse effects on the firing circuit 20 in the event of a failure of one of the first and second output relays 28OR1, 28OR2.

In addition to the foregoing features, the firing circuit 20 depicted in FIG. 6 also includes signal lines s1, s2 that provide unambiguous arm relay position feedback for the output relays 28OR1, 28OR2 to the microcontroller 21. Further, the logic gates associated with the address line decoder 26, and a logic gate Ig, are operative when the digital code plug 40 is integrated in communicative combination with the firing circuit 20, to disable the output regulator 27 and the address line decoder 26, thereby electronically disabling the output relays 28OR1, 28OR2 and the arming stage 28A since none of the dedicated capacitive subcircuits can receive the narrow band pulsed signals that activate the FETs (see discussion above in connection with the paragraph (3) function of the microcontroller 21).

The normal operational sequence of the firing circuit 20 described above is as follows. In response to a validated ARM command message, the arming subcircuit 28 is enabled to complete the electrical circuit between the output regulator 27 and the power bus 28PB. In response to a validated, timely FIRE command message, the firing stages 28F1, 28F2 are enabled, which energizes the output relays 28OR1, 28OR2 to complete the electrical circuit between the output regulator 27 and the dual output lines 28D0.

After the output relays 28OR1, 28OR2 are energized, the microcontroller 21 transmits an enable signal to the output regulator 27, which allows current to flow through the circuit path provided by the dual output lines 28OD. This sequencing ensures that the output relays 28OR1, 28OR2 are not subjected to arcing during energization, i.e., the soft switch effect. The foregoing sequence is reversed when the dual output lines 28OD are disabled to eliminate arcing when the output relays 28OR1, 28OR2 are de-energized.

Operating Method

Figure 7:
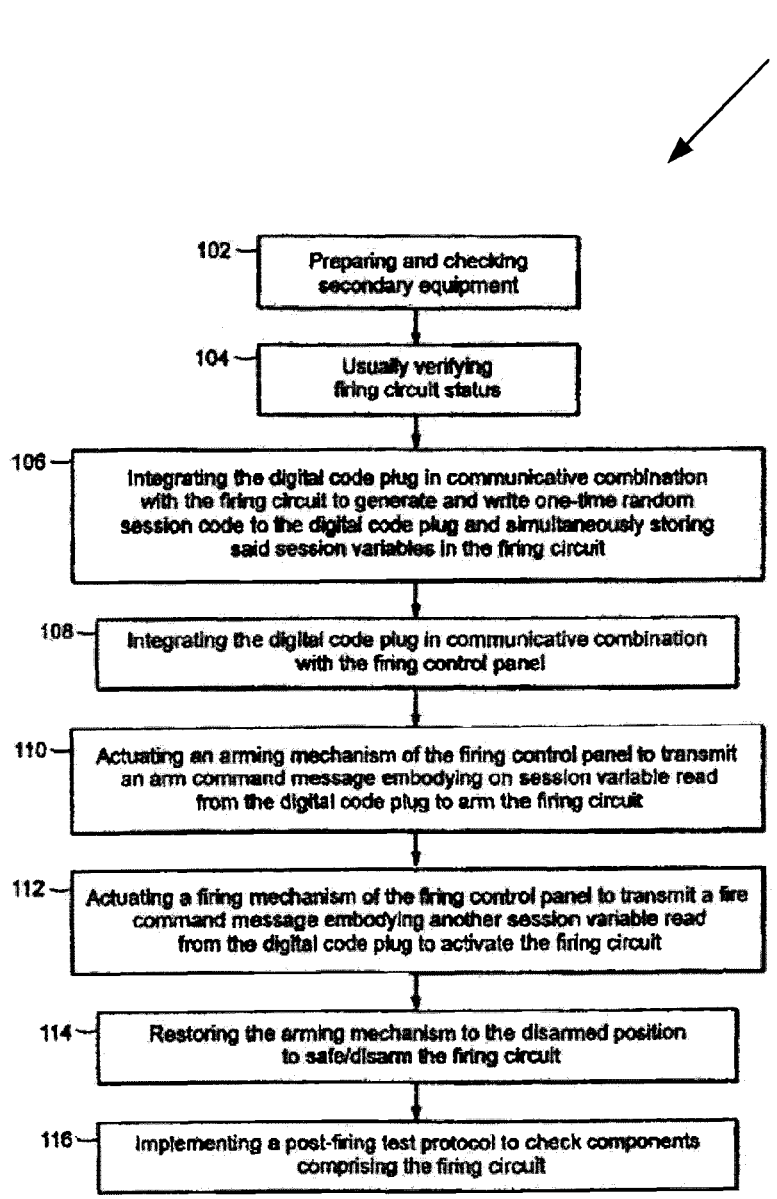
FIG. 7 is a flow diagram illustrating an operating method for the remote digital firing system.

Shown in FIG. 7, FIG. 23, and FIG. 24 are further illustrations of a nominal operating method 100 for the described embodiment of the remote digital firing system 10 according to the present invention. A first step 102 is implemented to prepare and check the secondary equipment for the mission. For example, the primary serial communications link LP between the vehicle RCV and the portable control console PCC is activated and tested, the deployment mechanism of the vehicle RCV is moved to the payload loading position (payload manipulator is clear of the vehicle RCV and accessible to a system operator), the vehicle RCV brakes are set.

Next, in a step 104 the system operator verifies the status of the firing circuit 20 by a visual examination of the indicator lights 25 of the firing circuit 20. At this juncture, the green indicator light 25B should be illuminated, indicating that the firing circuit 20 is in the disarmed (safe) state. A flashing red indicator light 25A at this step indicates the presence of a system fault and that the remote digital firing system 10 is inoperable. For the described embodiment, 'flashing' denotes a 50% duty cycle at 4 Hz.

In step 106, the digital code plug 40 is integrated in communicative combination with the firing circuit 20. The green indicator light 25B will temporarily cycle off and then illuminate steadily to indicate successful integration of the digital code plug 40 with the firing circuit 20. In response to this action, the firing circuit 20 is automatically operative to generate the key-inserted status message—see first row of Table II and paragraphs (a)-(c) of the prescribed communication protocol. A flickering red indicator light 25A at this step 106 indicates a bad digital code plug 40 or a poor connection. For the described embodiment, 'flickering' denotes a 12% duty cycle at 4 Hz. Encountering a flickering red indicator light 25A at this step 106 causes the method 100 to be exited.

Two functions are accomplished in step 106. First, the digital code plug 40 electronically disables the firing circuit 20, thereby precluding inadvertent or intentional operation of the firing circuit 20 (the relevant instruction sets of the firing circuit 20 provide a backup capability that precludes inadvertent or intentional operation of the firing circuit at this step). Second, a set of one-time random session variables and the rolling code sequence are automatically written to the digital code plug 40 and simultaneously to the memory module 22 of the firing circuit.

As part of step 106, the system operator attaches the mission payload PL to the payload manipulator of the vehicle RCV. Once the mission payload PL attachment process is completed, the system operator completes step 106 by removing the digital code plug 40 from communicative combination with the firing circuit 20. In response to this action, the firing circuit 20 is automatically operative to generate the key-removed status message—see second row of Table II and paragraphs (a)-(c) of the prescribed communication protocol.

In step 108, the digital code plug 40 is integrated in communicative combination with the firing control panel 30. This action causes the firing control panel 30 to: (i) generate the key-inserted status message—see third row of Table II and paragraphs (a)-(c) of the prescribed communication protocol in a substep 108A; and implement the link test, i.e., generate the SAFE/DISARM command message M3, with the firing circuit 20—see row three of Table II and paragraphs (a), (d), (i), (j), (k), (m) and (o) of the prescribed communication protocol—to verify communications integrity between the firing control panel 30 and the firing circuit 20 in a substep 108B. The firing circuit 20 is operative, in response to the SAFE/DISARM command message M3, to implement the validation protocol with respect to such command message M3—see paragraphs (k), (m) and o) of the prescribed communication protocol in a substep 108C. If the SAFE/DISARM command message M3 is validated, the firing circuit 20 is operative to: (1) verify that the firing circuit 20 is in the disarmed (safed) state; and to automatically generate the verification message M4—see row four of Table II and paragraphs (a), (i), (j), and (o) of the prescribed communication protocol in a substep 108D. If the SAFE/DISARM command message M3 is not validated, the remote digital firing system 10 returns to the end of step 106 (a new digital code plug 40 must be inserted) or prior to step 108A (the system operator must actuate the link-test mechanism 33 to generate another SAFE/DISARM command message M3—see paragraph (p) of the prescribed communication protocol.

At this point, the vehicle RCV is driven to the area of operations and the mission payload PL is positioned using the deployment mechanism and/or the payload manipulator of the vehicle RCV. Once the mission payload PL has been properly positioned, the mission payload PL can be activated by performing steps 110 and 112 as described below.

In step 110, the system operator actuates the arming mechanism 34 of the firing control panel 30 to arm the firing circuit 20. Arming of the firing circuit 20 requires the implementation of several substeps as follows. In substep 110A, the firing control panel 30 is automatically operative, in response to actuation of the arming mechanism 34, to generate and transmit a Request for Challenge message M1—see row seven of Table II and paragraphs (a), (f), (j), (l), and (o) of the prescribed communication protocol—to the firing circuit 20. In substep 110B the firing circuit 20 is automatically operative, in response to message M1, to generate and transmit a Challenge message M2 to the firing control panel 30—see row eight of Table II and paragraphs (a), (i), (j), (l), and (o) of the prescribed communication protocol—to the firing control panel 30.

In response to the Challenge message M2, the firing control panel 30 is operative in substep 110C to verify panel status and compliance with the prescribed communication protocol constraints. More specifically, the firing control panel 30 is operative to: (i) verify that the arming mechanism 34 is still in the armed position; and (ii) ensure that the Challenge message M2 was received within the established validity window—see paragraph (n) of the prescribed communication protocol. In step 110D the firing control panel 30 is operative to automatically generate and transmit the ARM command message M5—see row nine of Table II and paragraphs (a), (i), (j), (l), and (o) of the prescribed communication protocol—to the firing circuit 20. Upon receipt of the ARM command message M5, the firing circuit is operative in substep 110E to: (i) ensure the ARM command message M5 was received within the established validity window—see paragraph (n) of the prescribed communication protocol; and (ii) implement the validation protocol with respect the ARM command message M5—see paragraph (m) of the prescribed communication protocol. If the ARM command message M5 was received within the established validity window and valid, the firing circuit 20 is armed in substep 110F and the firing circuit 20 automatically transmits a verification message M6—see row ten of Table II and paragraphs (a), (i), (j), and (o)—to the firing control panel 30. Finally in substep 110G, the firing circuit 20 and the firing control panel 30 are operative to extinguish the green indicator lights 25B, 36B, respectively, and to illuminate the red indicator lights 25A, 36A, respectively, to provide visual indications that the firing circuit 20 is in the armed state.

In step 112, the system operator actuates the firing mechanism 35 of the firing control panel 30 to activate (fire) the firing circuit 20 to fire the remote mission payload PL. Firing of the firing circuit 20 requires the implementation of several substeps as follows. In substep 112A, the firing control panel 30 is automatically operative, in response to actuation of the firing mechanism 35, to generate and transmit a Request for Challenge message M1—see row eleven of Table II and paragraphs (a), (i), (j), (l), and (o) of the prescribed communication protocol—to the firing circuit 20. In step 112B the firing circuit 20 is automatically operative, in response to message M1, to generate and transmit a Challenge message M2 to the firing control panel 30—see row twelve of Table II and paragraphs (a), (i), (j), (l), and (o) of the prescribed communication protocol—to the firing control panel 30.

In response to the Challenge message M2, the firing control panel 30 is operative in step 112C to verify panel status and compliance with the prescribed communication protocol constraints. More specifically, the firing control panel 30 is operative to: (i) verify that the firing mechanism 35 is still in the activated position; and (ii) ensure that the Challenge message M2 was received within the established validity window—see paragraph (n) of the prescribed communication protocol. In step 112D the firing control panel 30 is operative to automatically generate and transmit the FIRE command message M7—see row thirteen of Table II and paragraphs (a), (i), (j), (l), and (o) of the prescribed communication protocol—to the firing circuit 20. Upon receipt of the FIRE command message M7, the firing circuit is operative in step 112E to: (i) ensure the FIRE command message M7 was received within the established validity window—see paragraph (n) of the prescribed communication protocol; and (ii) implement the validation protocol with respect the received FIRE command message M7—see paragraph (m) of the prescribed communication protocol. If the FIRE command message M7 was received within the established validity window and valid, the firing circuit 20 is activated (fired) in step 112F and the firing circuit 20 automatically transmits a verification message M14—see row fourteen of Table II and paragraphs (a), (i), (j), and (o)—to the firing control panel 30. As discussed above in connection with specifics described for the firing circuit 20 depicted in FIG. 6 the firing circuit 20 is activated in a "soft switch" fashion, i.e., the output relays 28OR1, 28OR2 are enabled prior to the enablement of the output regulator 27 to preclude arcing of the output relays 28OR1, 28OR2. In step 112G, the firing control panel 30 is operative, in response to the verification message M14, to illuminate the red indicator light 36A on the firing control panel 30 in a flashing mode to alert the system operator to restore the arming mechanism 34 to the disarmed (safed) position.

In step 114 the arming mechanism 34 is manipulated to restore the arming mechanism 34 to the disarmed (safed) position. The firing control panel 30 is operative, in response to restoration of the arming mechanism 34 to the disarmed (safed) position, to generate and transmit a generate the SAFE/DISARM command message M3, to the firing circuit 20—see row five of Table II and paragraphs (a), (h), (i), (j), (k), (m) and (o) of the prescribed communication protocol. Receipt of the SAFE/DISARM command message M3 causes the firing circuit 20 to disable the firing circuit 20 and to transmit the verification message M4—see row six of Table II and paragraphs (a), (i), (j), and (o) of the prescribed communication protocol—to the firing control panel 30. Upon receipt of the verification message M4, the firing control panel 30 is operative to extinguish the flashing red indicator light 36A and steadily illuminate the green indicator light 36B to indicate that the firing circuit 20 is disarmed.

Finally, in step 116 the firing circuit 20 is operative to implement a post-firing test protocol to ensure the continued operability of the components comprising the firing circuit 20 described above in connection with FIG. 6.

For the described embodiment wherein the firing circuit 20 is integrated in combination with the vehicle RCV and the firing control panel 30 is integrated in combination with the portable control console PCC, the vehicle RCV and the portable control console PCC each include a microprocessor that is an element of the corresponding serial link L1 or L2 for the remote digital firing circuit 10. These microprocessors, accordingly, function as serial pass throughs for all message traffic between the firing control panel 30 and the firing circuit 20. In view of this characteristic of the microprocessors of the vehicle RCV and the portable control console PCC, these microprocessors can be functionally configured, e.g., by software, firmware, hardware, or combinations thereof, to be operative, under specified conditions, to inhibit the transmission of ARM and FIRE command messages from the firing control panel 30 to the firing circuit 20.

Figure 8:
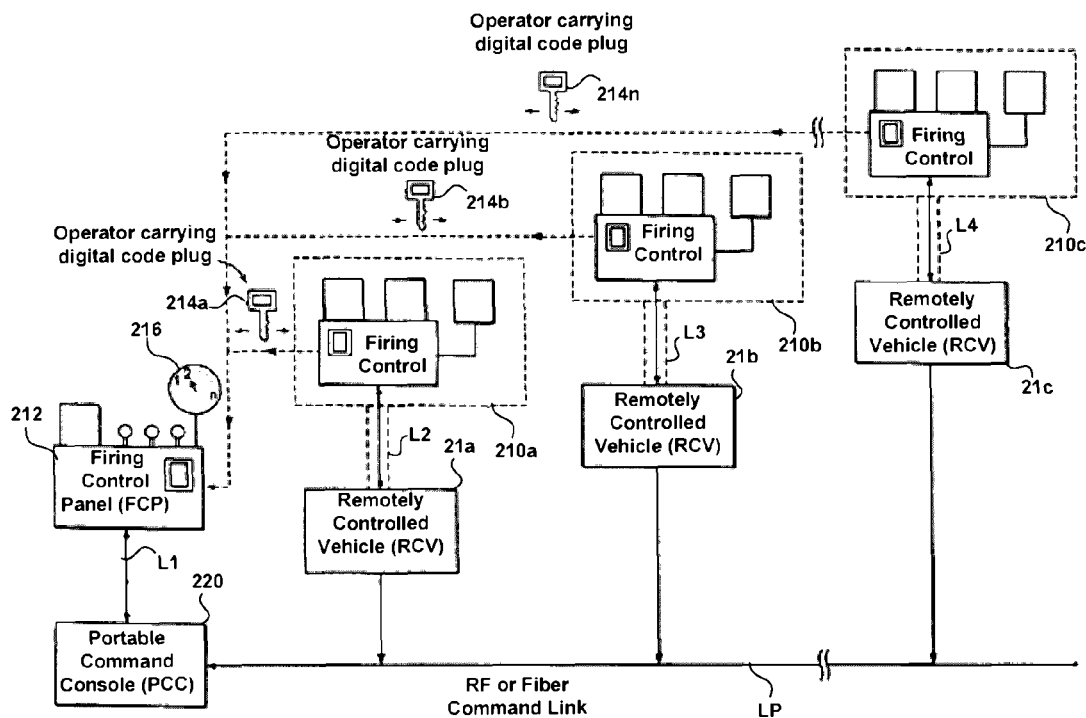
FIG. 8 is a block diagram of an alternative embodiment of the remote digital firing system where the robotic platform includes three firing control circuits that correspond to multiple digital keys that are inserted into multiple firing control panels included on a single operator control unit.

Referring to FIG. 8, and in another aspect, a remote digital firing system 200 is designed to allow the control of multiple firing circuits 210a-210n. The remote digital firing system 200 comprises firing circuits 210a-210n, a firing control panel 212, and digital code plugs 214a-214n. In one embodiment, each digital code plug 214 carries one-time random session variables for a single firing circuit 210 to firing control panel 214.

Similar to the previously described embodiment, each firing circuit 210 and the firing control panel 212 are integrated in combination with secondary equipment. Each firing circuits 210 and the firing control panel 212 are serially linked for communication by links L1-Ln and LP. L1-Ln are internal links between the firing circuits and the firing control panel 30 and the respective secondary equipment and LP is an external link between such secondary equipment. The external link LP can pass through multiple computers, radio systems, optical tethers, and/or combinations thereof. As with other embodiments described herein, the primary serial communication link LP can be shared with other applications, e.g., an insecure radio communications links for control a mobile robot, without risk that signals from such applications will adversely impact the operation of the firing system 200.

The firing control panel 212 includes a weapon selector switch 216 for selecting which firing circuit 210 will be controlled. In one embodiment, firing control panel includes a display showing the name of the selected weapon. This helps a user unambiguously know which weapon and firing circuit are selected for operation by control panel 212. The display also may show informational messages, as described herein.

In one example, system 200 is designed to allow the control of up to 16 different firing circuits, identified with a hexadecimal digit from "0" to "9" and "a" through "f". But those skilled in the art will understand that control of more firing circuits is possible using system 200 as described in more detail, below.

All messages that originate from firing circuit 210 start with the "@" character as a mark. A hexadecimal routing digit that identifies the originating firing circuit follows the mark character. Non-routed messages, such as informational messages sent to the local host (e.g., remotely controlled vehicle 218) use "L" as the routing identifier. The message terminates with the <0x0a> line feed character and will not exceed 40 characters in length.

All messages that originate from the firing control panel 212 start with the "$" character. A hexadecimal routing digit that identifies which firing circuit the message is intended for follows this mark character. Non-routed messages, such as informational messages sent to the local host (e.g., portable command console 220) use "L" as the routing identifier. The message is terminated with the <0x0a> line feed character and will not exceed 40 characters in length. As described in above embodiments, encryption is performed with the XTEA algorithm, which is an extension of the Tiny Encryption Algorithm. Firing control panel 212 contains the algorithm for encrypting. Firing circuits 210 contain the algorithm for decrypting. Neither circuit contains the opposite routine. However, since encryption is symmetric, a message can be "encrypted" by giving the original clear text message to the decryption routine, which will generate a scrambled set of bits which can be descrambled with the encryption routine. While this makes for confusing descriptions, it offers several benefits. Code size is reduced since each microcontroller needs only one half of the algorithms. When a code is read from digital code plug 214 directly into an encryption buffer, once scrambled it cannot be reconstructed since the decryption algorithm does not exist on that processor. This guarantees that once digital code plug 214 is removed, appropriate challenge responses cannot be generated.

Commands from Control Panel to Firing Circuit

Examples of commands from control panel 212 to firing circuits 210 are shown in Table III and described below.

TABLE III

Commands from Control Panel to Firing Circuit

| Safe (disarm) command | 8 bit protocol version (4) |
| | 8 bit command character ("S") |
| | 8 bit packet sequence lower byte (random on plug insertion) |

TABLE III-continued

Commands from Control Panel to Firing Circuit

| | 8 bit packet sequence upper byte (zeroed on plug insertion) |
| | 32 bit safe code ("SAFE") |
| Status Request (Heartbeat) Command | 8 bit protocol version (4) |
| | 8 bit command character ("H") |
| | 16 bit packet sequence number |
| | 16 bit heartbeat code ("HB") |
| | 16 bit random pad |
| Arm Command | 8 bit protocol version (4) |
| | 8 bit command character ("A") |
| | 16 bit command challenge (from most recent status) |
| | 32 bit Arm code read from code plug |
| Fire Command | 8 bit protocol version (4) |
| | 8 bit command character ("F") |
| | 16 bit command challenge (from most recent status) |
| | 32 bit Fire code read from code plug |

Safe (Disarm) Command

A Safe (disarm) command is formed by first creating a 64 bit data block as shown in Table III. The packet sequence is then incremented and preserved in volatile RAM. The packet sequence number is a 16 bit integer that is assigned a random value for 0 to 255 whenever a code plug is inserted or when power to the firing control panel is cycled. The 64 bit data block is then encrypted, and a message is transmitted in the form:

a. $0xxxxxxxxxxxxxxxx<0x0a> where "$" is a mark character which starts all commands sent from the firing control panel to the firing circuit, "0" is the target system identifier. The remaining sixteen characters are the encrypted 64 bit block in hexadecimal format, two characters per byte, lowest order byte first.

Firing circuit 210 receives the Safe command and decrypts the 64 bit data block. The firing circuit 210 then verifies the protocol version number, the command character, and the 32 bit safe code (which is the string "SAFE"). The sequence number is preserved for formulating a response. The firing circuit 210 will respond to the Safe command with a Status Response packet, described below.

Status Request (Heartbeat) Command

Periodically, at a random interval between 1 second and 5 seconds, the Firing Control Panel 212 will generate a heartbeat status request to confirm the system status. The Status Request command is formed by first creating a 64 bit data block shown in Table III The packet sequence is then incremented and preserved in volatile RAM. The 64 bit data block is then encrypted, and a message is transmitted in the form:

a. $0xxxxxxxxxxxxxxxx<0x0a> where "$" is a mark character which starts all commands sent from the firing control panel to the firing circuit, "0" is the target system identifier. The remaining sixteen characters are the encrypted 64 bit block in hexadecimal format, two characters per byte, lowest order byte first. The firing circuit 210 responds to the Heartbeat Status request with the Status Response described below.

The 16 bit random pad is used to limit the amount of known text in the packets to frustrate cryptanalysis. The random time interval between heartbeat requests is intended to help mask activity from traffic analysis, so that a non-periodic event can not be transparently perceived as an "arm" or "fire" activity.

Arm Command

When switch 216 is moved to the "Arm" position, an arm command is composed by first creating a 64 bit data block shown in Table III. This data block is then encrypted, and a message is transmitted of the form:

a. $0xxxxxxxxxxxxxxxx<0x0a> where "$" is a mark character, "0" is the target system identifier. The remaining sixteen characters are the encrypted 64 bit block in hexadecimal format.

The firing circuit 210 decrypts the command and verifies all 64 bits of the decrypted data packet. The command challenge must match either the most recently sent challenge or the second most recently sent challenge in a status packet. The arm code is verified against the copy stored in the firing circuit 210 when the code plug 214 was in plugged into firing circuit 210. If all the data is verified, firing circuit 210 is transitioned to the armed state and a status response packet is sent. The status response packet is formed using the most recent packet sequence number from a status request or safe command, since the arm command does not contain an updated packet sequence number.

Fire Command

When the fire switch is depressed after the arm switch, a fire command is composed by first creating a 64 bit data block shown in Table III. This data block is then encrypted, and a message is transmitted of the form:

a. $0xxxxxxxxxxxxxxxx<0x0a> where "$" is a mark character, "0" is the target system identifier. The remaining sixteen characters are the encrypted 64 bit block in hexadecimal format.

The firing circuit 210 decrypts the command and verifies all 64 bits of the decrypted data packet. The command challenge must match either the most recently sent challenge or the second most recently sent challenge in a status packet. The fire code is verified against the copy stored in firing circuit 210. If all the data is verified, the circuit outputs are energized and a status response packet is sent when the firing pulse completes. The status response packet is formed using the most recent packet sequence number form a status request or safe command, since the arm command does not contain an updated packet sequence number.

Responses from Firing Circuit to Control Panel

Examples of responses from firing circuits 210 to control panel 212 are shown in Table IV and described below.

TABLE IV

Responses from Firing Circuit to Control Panel

| | |
|---|---|
| Status (heartbeat) Response | 8 bit protocol version (4)<br>8 bit status character ("S" safe, "A" armed, "s" safe error, "e" fatal error)<br>16 bit count of the number of times the system has been fired since manufacture<br>16 bit packet sequence number (from the last command)<br>16 bit randomly generated command challenge |
| Information Message | 8 bit protocol version (4)<br>8 bit status character ("I")<br>8 bit release number (minor version)<br>8 bit version number (major version)<br>8 bit error code path record (zero if no error)<br>8 bit error master mode record<br>16 bit error test record (identifies which HW components are suspect) |

Status (Heartbeat) Response

If a Safe command or Status Request is verified, a status response is generated by first creating a 64 bit data block as shown in Table IV. The 64 bit data block is then encrypted (by decrypting), and a message is transmitted in the form:

a. @0xxxxxxxxxxxxxxxx<0x0a> where "@" is a mark character which starts all commands sent from the firing circuit 210 to the firing control panel 212, "0" is the originating system identifier. The remaining sixteen characters are the encrypted 64 bit block in hexadecimal format, two characters per byte, lowest order byte first.

When this status block is received by the firing control panel 212, it is decrypted (by encrypting) and the version and sequence numbers are verified, then red and green LEDs on the firing control panel 212 are illuminated to confirm that the link is sound and to reflect the status of firing circuit 210. Otherwise a red LED flashes indicating a failed communication link. The command challenge is preserved to form arm and fire commands as needed.

Information Message

In response to a Safe command, the firing circuit 210 responds with first a Status Response and then an Information Message. An Information Message is generated by first creating a 64 bit data block as shown in Table IV. The 64 bit data block is then encrypted (by decrypting, see below), and a message is transmitted in the form:

a. @0xxxxxxxxxxxxxxxx<0x0a> where "@" is a mark character which starts all commands sent from the firing circuit 210 to the firing control panel 212, "0" is the originating system identifier. The remaining sixteen characters are the encrypted 64 bit block in hexadecimal format, two characters per byte, lowest order byte first. When the firing control panel 212 receives an information message, it decodes it and generates a parsable local message to display to the user or record in a log.

Local Messages from Firing Circuit

The following are examples of local messages from firing circuit 210 to its host, for example remotely controlled vehicle 218.

Code Plug Insertion Message

When the digital code plug 214 is inserted into the firing circuit 210, the unit signals the remotely controlled vehicle 218 that a code plug has been inserted by transmitting the string:

a. @LK<0x0a> where "@" is a mark character which starts all strings from the firing circuit 210, "L" is the target system identifier (indicating a non-routed local message), and "K" implies a code plug insertion. The remotely controlled vehicle 218 can use this knowledge to prevent motor motion while the code plug 214 is inserted.

Then the following information is written into the code plug: an encryption key (128 bits randomly generated); an Arm code (32 bits randomly generated); a Fire code (32 bits randomly generated); and a Weapon name (8 bytes, e.g., "HEAD_0"). This data is also preserved in EEPROM on the firing circuit 210 with the exception of the weapon name.

Code Plug Removal Message

When the digital code plug 214 is removed from the firing circuit 210, the unit signals by transmitting the string:

a. @Lk<0x0a> where "@" is a mark character which starts all strings from the firing circuit 210, "L" is the target system identifier (indicating a non-routed local message), lower case "k" implies a code plug removal.

Informational Message

The firing circuit 210 on remotely controlled vehicle 218 will produce a message similar to the "Remote Informational message" from the firing control panel 212 after any disarm sequence. This message is of the form:

a. @LIVaa.bb,c,k,dddd,eeee,ffff<0x0a> where "$" is a mark character, "L" indicates that this is a local message not to be transmitted to a firing output, and the "V"

indicates the type of informational string. The "aa.bb" designate the major and minor version numbers of the firmware (in hexadecimal) on a firing output circuit on the remotely controlled vehicle 218, the "c" is the system state ("S" for safe, lower case if in error mode, "A" for armed or firing), the "k" will be lower case if no digital code plug is inserted in the local system, or upper case "K" if a digital code plug is inserted in the local system, the "dddd" is the number of times (in hexadecimal) the circuit has been fired since manufacture, the "eeee" indicates which mode or code path lead to an error event (in hexadecimal, zero if no error), and the "ffff" is a hexadecimal string whose bits indicate which hardware tests caused the error condition. The below description of remote informational messages from firing control panel 212 goes into further detail.

The firing circuit 210 will also generate this message if queried with the string:

a. $0?

where "$" is a mark character, "0" targets the system in question, and "?" indicates a status query. A terminal <0x0a> is optional. In response to this command, the firing circuit 210 will produce the previously described Informational Message string, as well as an error debugging message string described below.

Error Debugging Message

The Error Debugging Message can be used to debug hardware problems. It is of the form:

a. @L1Eaaaa,bbbb,cccc,dddd,eeee<0x0a> where "@" is a mark character, "L" indicates that this is a local message not to be transmitted to a firing output, and the "E" indicates the type of informational string. "aaaa" is a hexadecimal string whose bits indicate which hardware tests caused the error condition. "bbbb" is the hexadecimal data on the A and B ports of the PIC microcontroller at the time of the error, "cccc" is the number of times the error condition has been cleared from this firing circuit since manufacture. "dddd" is the current code plug signature, and "eeee" is a random system identification number generated the first time a code plug 214 is inserted that is used to track error reports.

Local Messages from Firing Control Panel

The following are examples of local messages from firing control panel 212 to its host, for example portable command console 220.

Code Plug Insertion Message

When the code plug 214 is inserted into the firing control panel 212, the unit signals that a code plug has been inserted by transmitting the string:

a. $LK<0x0a> where "$" is a mark character which starts all strings from the firing control panel 212, "L" is the selected system identifier (indicating a non-routed local message), "K" implies a code plug insertion.

Alternative Code Plug Insertion Message

When the code plug 214 is inserted the firing control panel 212 may also print out the string:

a. $LKssss<0x0a> where "$" is a mark character which starts all strings from the firing control panel 212, "L" is the selected system identifier (indicating a non-routed local message), "K" implies a code plug insertion, and "ssss" is the 16 bit session signature in hexadecimal. This session signature may be used to assert authority over the vehicle, for example.

Weapon Selection Message

If the firing control panel 212 is equipped with a weapon selector switch 216 and an LCD display, the unit will display the name of the selected weapon, helping the user unambiguously know which weapon has been selected. A local message is formed with the string:

a. $L0Nnnnnnnnn<0x0a> where "$" is a mark character which starts all strings from the firing control panel 212, "L" indicates a non-routable message for local use, "0" is the selected system identifier, "N" indicates a name string follows, and "nnnnnnnn" is the weapon name string. This string is transmitted whenever the code plug 214 is inserted, after the Code Plug Insertion Message.

Remote Informational Message

The firing control panel 212 decrypts the Information Message packet and generates a local message to reveal the status of the remote firing circuit 210. This message is of the form:

a. $LI0Vaa.bb,c,k,dddd,eeee,ffff<0x0a> where "$" is a mark character, "L" indicates that this is a local message not to be transmitted to a firing output, "0" indicates which firing circuit 210 is being described, and the "V" indicates the type of informational string. The "aa.bb" designate the major and minor version numbers of the firmware on the firing circuit 210 (in hexadecimal), the "c" is the system state ("S" for safe, lower case if in error mode, "A" for armed or firing), the "k" will be lower case if no key is inserted in the local system, or upper case "K" if a key is inserted in the local system, the "dddd" is the number of times the circuit has been fired since manufacture (in hexadecimal), the "eeee" indicates which mode or code path lead to an error event (in hexadecimal, zero if no error), and the "ffff" is a hexadecimal string whose bits indicate which hardware tests caused the error condition. They have no meaning if there is no error indicated in the "eeee" portion of the string. These bits are defined in Table VI:

TABLE VI

Error Message Bits

| | |
|---|---|
| 0 | Arm FET Stage 0 test ("Arm0 test") |
| 1 | Arm FET Stage 1 test ("Arm1 test") |
| 2 | Positive Relay FET test ("FETposRly") |
| 3 | Negative Relay FET test ("FETnegRly") |
| 4 | Plug disable check ("SYS_EN") |
| 5 | Random number generator failure ("RNumGen") |
| 6-11 | Unused ("Undefined") |
| 12 | Positive relay normally closed sense ("RlyPosNC") |
| 13 | Negative relay normally closed sense ("RlyNegNC") |
| 14 | Positive relay normally open sense ("RlyPosNO") |
| 15 | Negative relay normally open sense ("RlyNegNO") |

The portable command console 220 may display this information to the operator to assist in the decision whether to continue operations at risk when a system hardware error is detected.

Local Informational Message

The firing control panel 212 will generate a local information message when requested by its host, portable command console 220 for example, with a command of the form:

a. @0?

where "@" is a mark character, "?" indicates a query command. The firing control panel 212 generates a local message to reveal its the status. This message is of the form:

b. $LiVaa.bb,c,k,dddd,eeee<0x0a> where "$" is a mark character, "L" indicates that this is a local message not to be transmitted to a firing output, and the "V" indicates the type of informational string. The "aa.bb" designate the major and minor version numbers of the firmware on the firing control panel 212 (in hexadecimal), the "c" is the system, the "k" will be lower case if no key is inserted in the local system, or upper case "K" if a key is inserted in the local system, the "dddd" is the number of times the control panel has been used to initiate a firing sequence since manufacture (in hexadecimal), and the "eeee" is the power cycle count for the firing control panel (in hexadecimal).

Figure 9:
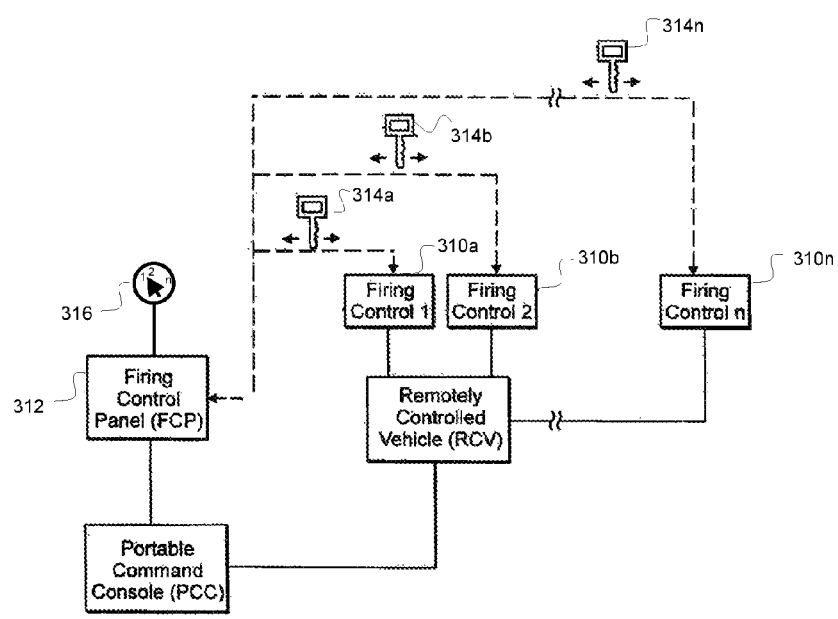
FIG. 9 is a block diagram of an alternative embodiment of the remote digital firing system where the firing control panel is configured to accept multiple digital keys corresponding to multiple firing control circuits included in multiple robotic platforms.

Referring to FIG. 9, and in another aspect, a remote digital firing system 300 is designed to control multiple firing circuits 310a-310n attached to a single remotely controlled vehicle 318. Each digital code plug 214 carries one-time random session variables for a single firing circuit 210 to firing control panel 214.

Figure 10:
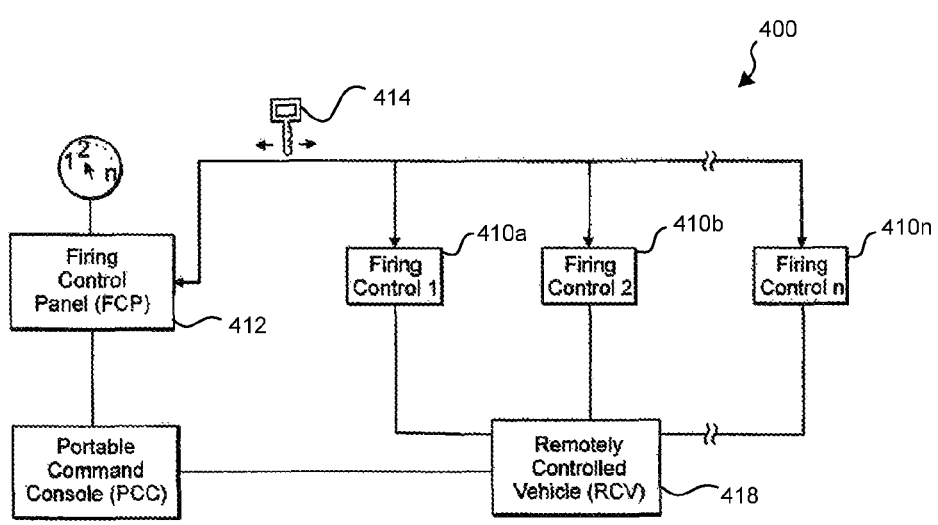
FIG. 10 is a block diagram of an alternative embodiment of the remote digital firing system where the firing control panel is configured to accept a single key corresponding to multiple firing control circuits included in a single robotic platform.
Figure 11:
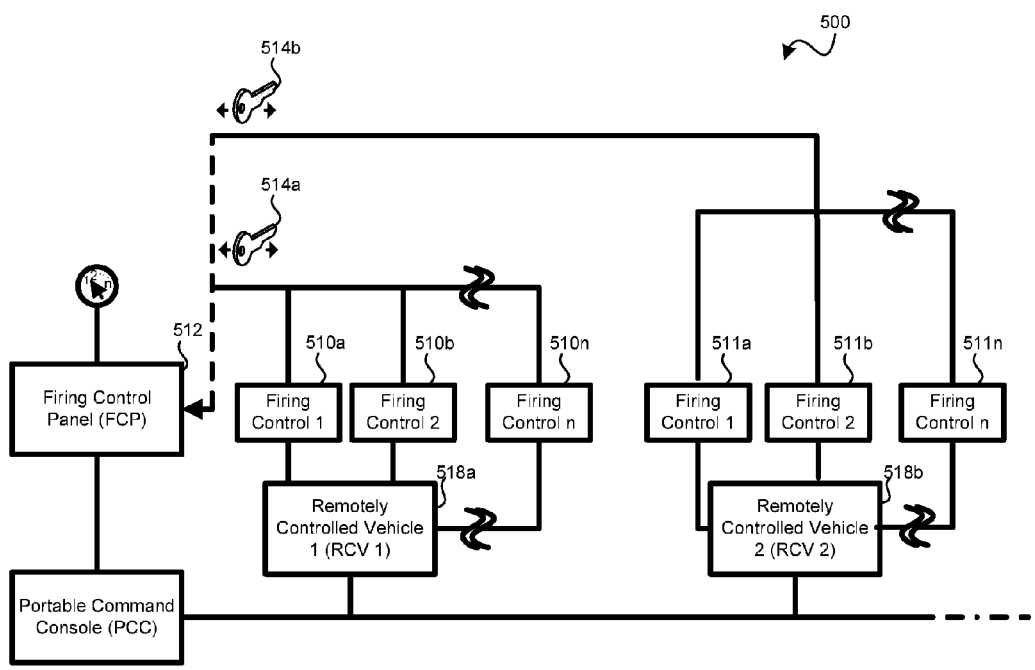
FIG. 11 is a block diagram of an alternative embodiment of the remote digital firing system where the firing control panel is configured to accept multiple keys corresponding to multiple robotic platforms, where each platform includes multiple firing control circuits.

Referring to FIGS. 10 and 11, remote digital firing system 400 uses a single digital code plug 412 for storing one-time random session variables for each firing circuit 410, reducing the number of digital code plugs to one per remote controlled vehicle 418. Remote digital firing system 500 has two remotely controlled vehicles 518a and 518b having firing control circuits 510a-510n and 511a-511n mounted thereto, respectively. Digital code plug 514a carries one time session variables for firing control circuits 510 and digital code plug 514b carries one time session variables for firing control circuits 511. A single firing control panel 512 with the appropriate digital code plug operates each firing control circuit.

Figure 12:
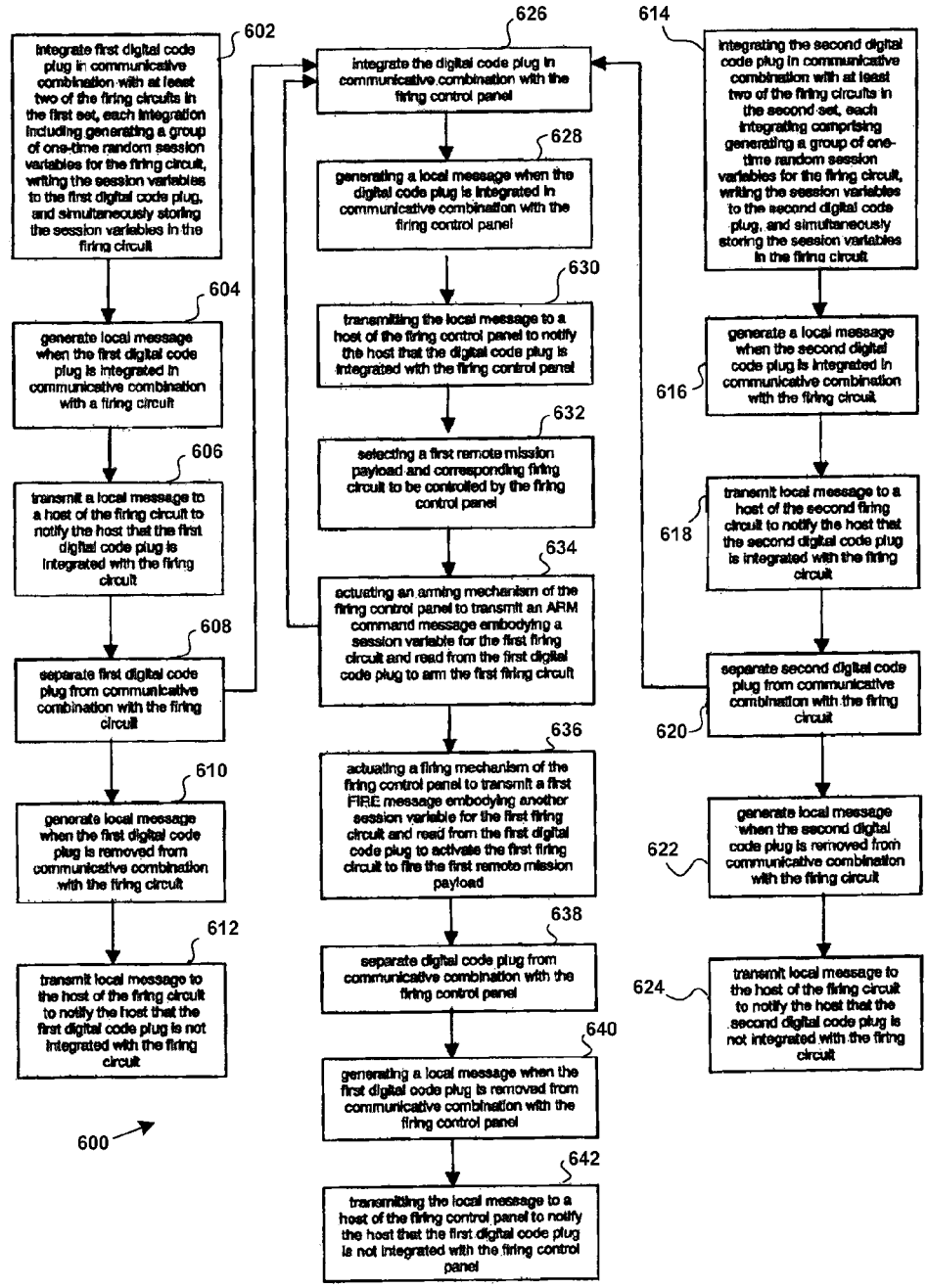
FIG. 12 is a flow diagram illustrating an operating method for the remote digital firing system.

Referring to FIG. 12, and in another aspect, a method 600 of operating a remote digital firing system is shown. A first digital code plug is integrated at 602 in communicative combination with at least two of a first set of firing circuits. Each integration involves generating a group of one-time random session variables for the firing circuit, writing the session variables to the first digital code plug, and simultaneously storing the session variables in the firing circuit.

A local message is generated at 604 when the first digital code plug is integrated in communicative combination with a firing circuit and transmitted at 606 to the firing circuit's host to notify it that the first digital code plug is integrated with the firing circuit. The first digital code plug is then separated at 608 from communicative combination with the firing circuit. At that time a local message is generated at 610 and transmitted at 612 to the host to notify it that the first digital code plug is no longer integrated.

A second digital code plug is integrated at 614 in communicative combination with at least two of a second set of firing circuits. The second set is mounted to a different host (e.g., a remotely controlled vehicle) than the first set. Each integration includes generating a group of one-time random session variables for the firing circuit, writing the session variables to the second digital code plug, and simultaneously storing the session variables in the firing circuit.

A local message is generated at 616 when the second digital code plug is integrated in communicative combination with a firing circuit and transmitted at 618 to the firing circuit's host to notify it that the second digital code plug is integrated with the firing circuit. The second digital code plug is then separated at 620 from communicative combination with the firing circuit. At that time a local message is generated at 622 and transmitted at 624 to the host to notify it that the second digital code plug is no longer integrated.

The first digital code plug is integrated at 626 in communicative combination with the firing control panel. A local message is generated at 628 and transmitted at 630 to the firing control panel's host to notify the host that the first digital code plug has been integrated.

A user selects at 632 a first remote mission payload and corresponding first firing circuit to be controlled by the firing control panel. The user actuates an arming mechanism of the firing control panel at 634 to transmit an ARM command message embodying a session variable for the first firing circuit and read from the first digital code plug to arm the first firing circuit. The user then actuates a firing mechanism of the firing control panel at 636 to transmit a first FIRE message embodying another session variable for the first firing circuit and read from the first digital code plug to activate the first firing circuit to fire the first remote mission payload.

The user then separates the first digital code plug from the control panel at 638, which results in generation 640 and transmission 642 of a local message to the firing control panel's host to notify the host that the first digital code plug has been integrated. The method is then repeated with the second digital code plug, starting at 626.

Figure 13:
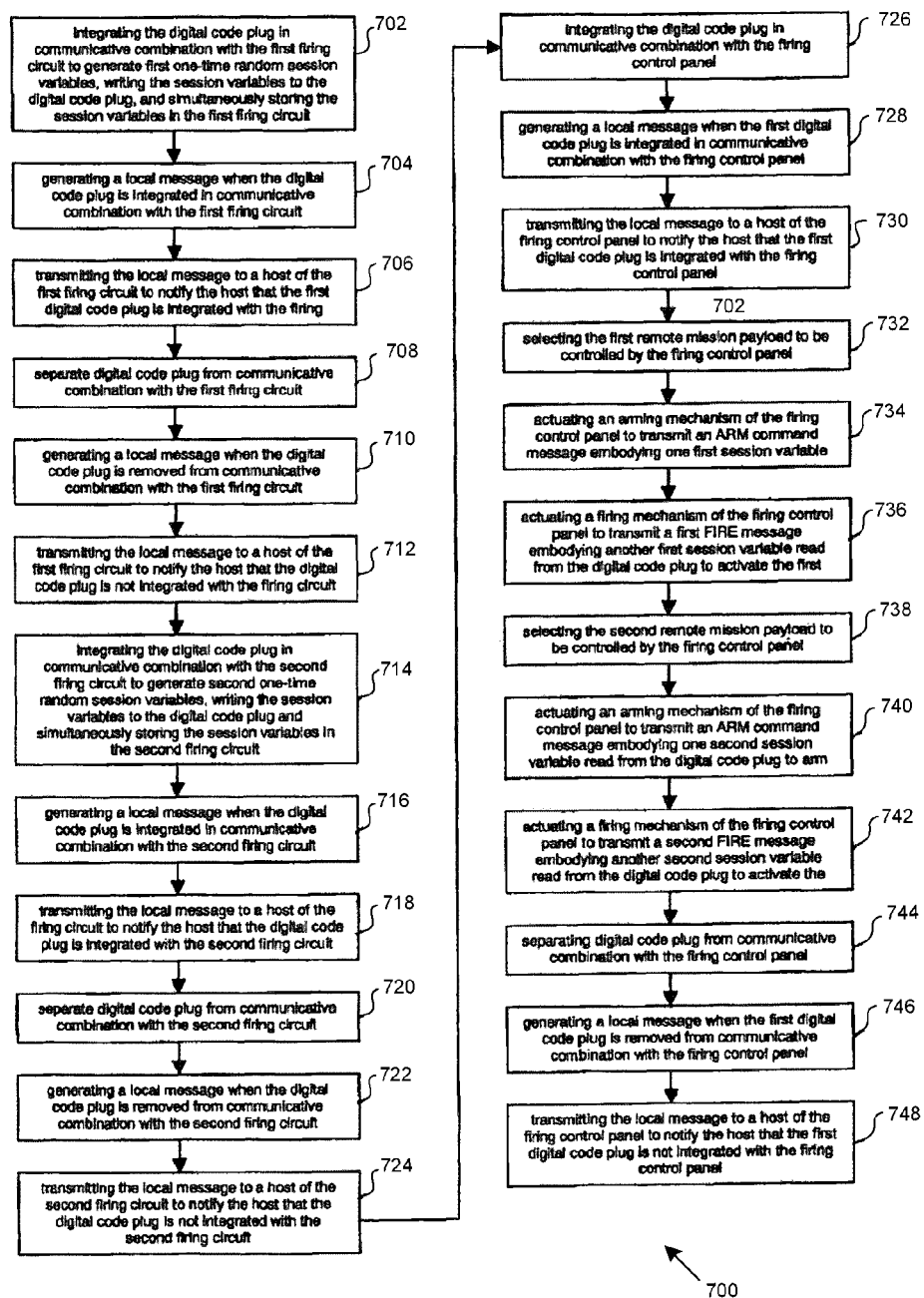
FIG. 13 is a flow diagram illustrating an operating method for the remote digital firing system.

Referring to FIG. 13, and in another aspect, a method 700 of operating a remote digital firing system is shown. The digital code plug is integrated at 702 in communicative combination with a first firing circuit to generate first one-time random session variables, which are written to the digital code plug and stored in the first firing circuit. A local message is generated at 704 and transmitted at 706 to a host to notify it that the digital code plug is integrated with the firing circuit. The digital code plug is separated at 708 from the first firing circuit, generating at 710 and transmitting at 712 a local message to the host of the first firing circuit to notify the host that the digital code plug is not integrated with the firing circuit.

The digital code plug is integrated at 714 in communicative combination with the second firing circuit to generate second one-time random session variables, writing the session variables to the digital code plug and simultaneously storing the session variables in the second firing circuit. A local message is generated at 716 and transmitted at 718 to the host of the second firing circuit to notify the host that the digital code plug is integrated with the second firing circuit. The digital code plug is separated at 720 from the second firing circuit, generating at 722 and transmitting at 724 a local message to the host of the second firing circuit that the digital code plug is not integrated with the second firing circuit.

The digital code plug is integrated at 726 in communicative combination with the firing control panel. A local message is generated at 728 and transmitted at 730 to the host of the firing control panel to notify the host that the digital code plug is integrated with the second firing circuit.

A user selects at 732 the first remote mission payload to be controlled by the firing control panel. An arming mechanism is actuated at 734 to transmit an ARM command message embodying one first session variable read from the digital code plug to arm the first firing circuit. The user actuates at 736 a firing mechanism to transmit a first FIRE message embodying another first session variable read from the digital code plug to activate the first firing circuit to fire the first remote mission payload.

A user selects at 738 a second remote mission payload to be controlled by the firing control panel. An arming mechanism is actuated at 740 to transmit an ARM command message embodying one second session variable read from the digital code plug to arm the second firing circuit. The user actuates at 742 a firing mechanism to transmit a second FIRE message embodying another second session variable read from the digital code plug to activate the second firing circuit to fire the second remote mission payload.

The digital code plug is then separated from the firing control panel at 744, whereby a local message is generated at 746 and transmitted at 748 to a host of the firing control panel to notify the host that the digital code plug is no longer integrated with the firing control panel.

Figure 14:
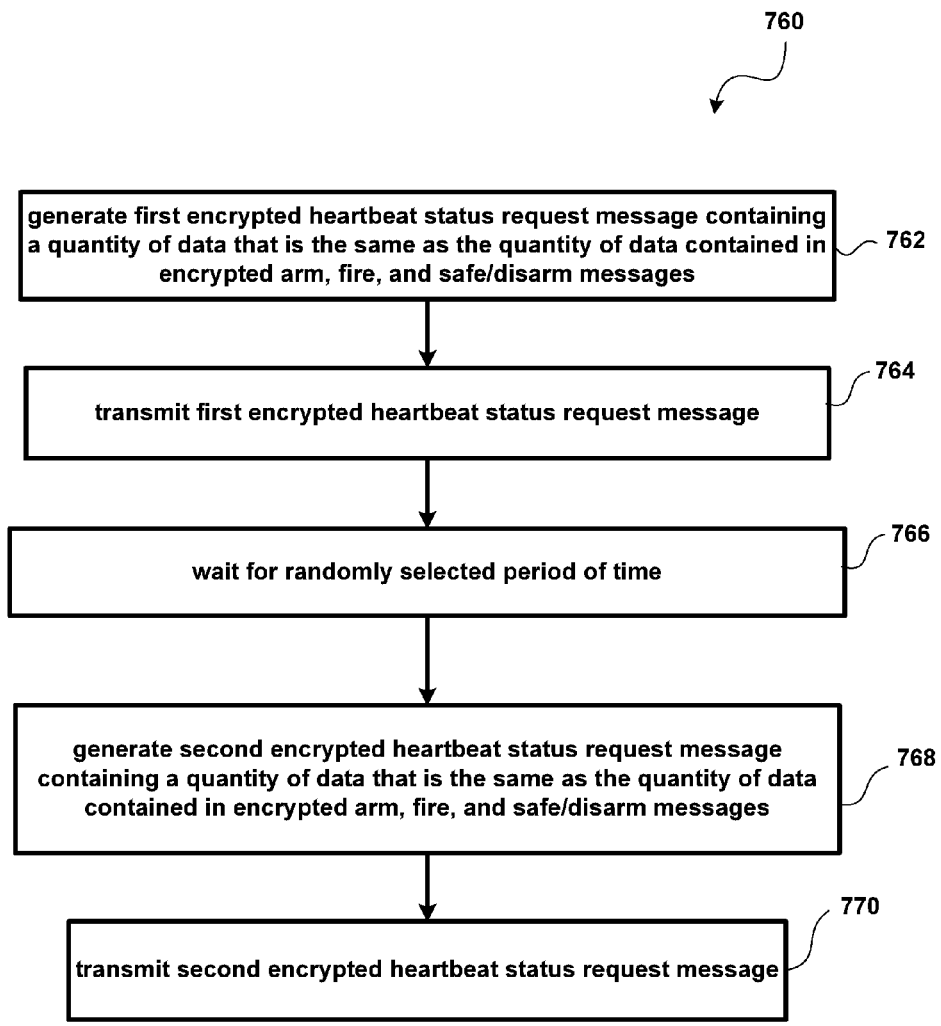
FIG. 14 is a flow diagram illustrating an operating method for the remote digital firing system.

Referring to FIG. 14 and in another aspect, a method 760 for hiding the intent of an operator of a remote digital firing system for firing a remote mission payload is shown. A first encrypted heartbeat status request message is generated at 762 containing a quantity of data that is the same as the quantity of data contained in encrypted arm, fire, and safe/disarm messages. The first encrypted heartbeat status request message is transmitted at 764. After a randomly selected period of time (766), a second encrypted heartbeat status request message is generated at 768, also containing a quantity of data that is the same as the quantity of data contained in encrypted arm, fire, and safe/disarm messages, and transmitted at 770. By waiting a randomly selected period of time between status request messages, other transmissions, such as communication of ARM or FIRE messages will not stand out as aperiodic in relation to the heartbeat status request messages.

Figure 15:
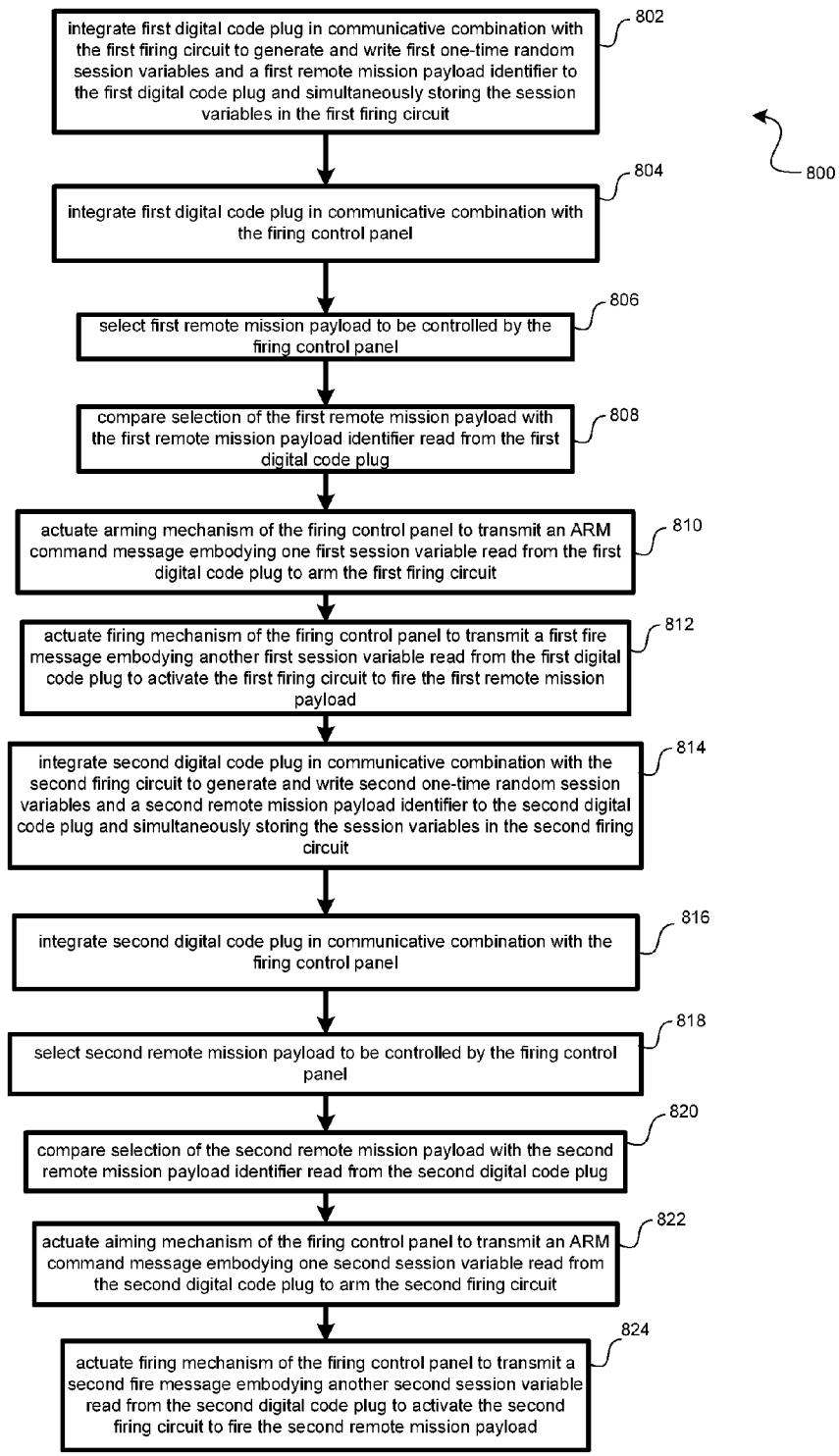
FIG. 15 is a flow diagram illustrating an operating method for the remote digital firing system.

Referring to FIG. 15 and in another aspect, a method of a method 800 of operating a remote digital firing system that includes first and second firing circuits, first and second digital code plugs, and a firing control panel to fire first and second remote mission payloads communicatively coupled to the first and second firing circuits, is shown.

The first digital code plug is integrated at 802 in communicative combination with the first firing circuit to generate and write first one-time random session variables and a first remote mission payload identifier to the first digital code plug and simultaneously storing the session variables in the first firing circuit. The first digital code plug is integrated at 804 in communicative combination with the firing control panel and the first remote mission payload to be controlled by the firing control panel is selected at 806. The selection of the first remote mission payload is compared at 808 with the first remote mission payload identifier read from the first digital code plug. An arming mechanism is actuated at 810 to transmit an ARM command message embodying one first session variable read from the first digital code plug to arm the first firing circuit. A firing mechanism is actuated at 812 to transmit a first FIRE command message embodying another first session variable read from the first digital code plug to activate the first firing circuit to fire the first remote mission payload.

The second digital code plug is integrated at 816 in communicative combination with the second firing circuit to generate and write second one-time random session variables and a second remote mission payload identifier to the second digital code plug and simultaneously storing the session variables in the second firing circuit. The second digital code plug is integrated in communicative combination with the firing control panel and the second remote mission payload to be controlled by the firing control panel is selected at 818. The selection of the second remote mission payload is compared at 820 with the second remote mission payload identifier read from the second digital code plug to verify that the correct payload has been selected. An arming mechanism is actuated at 822 to transmit an ARM command message embodying one second session variable read from the second digital code plug to arm the second firing circuit. A firing mechanism is actuated at 824 to transmit a second FIRE command message embodying another second session variable read from the second digital code plug to activate the second firing circuit to fire the second remote mission payload.

Figure 16:
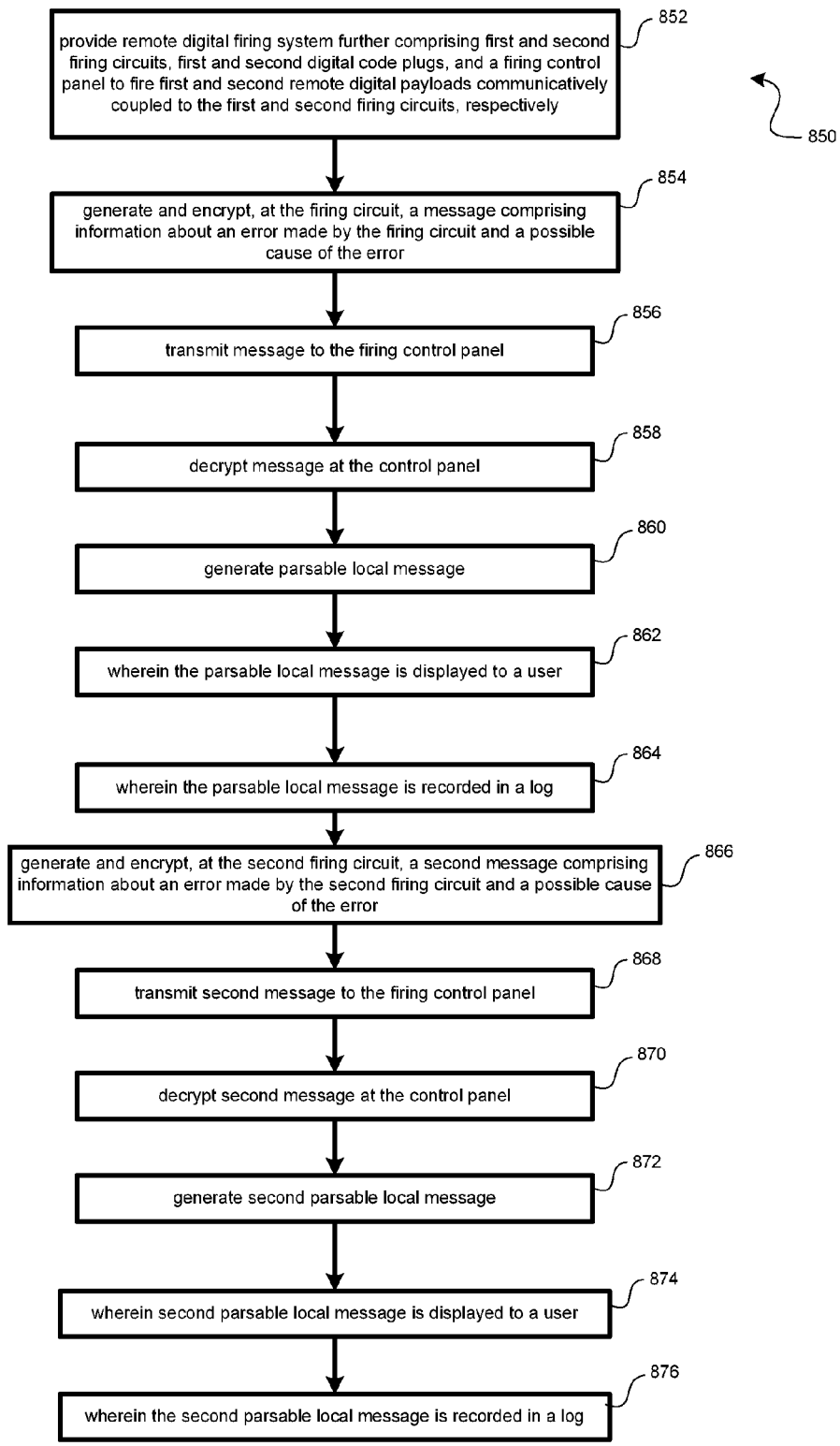
FIG. 16 is a flow diagram illustrating an operating method for the remote digital firing system.

Referring to FIG. 16 and in another aspect, a method 850 of diagnosing a remote digital firing system remotely and securely, without revealing to an observer that the status of the system is shown. A remote digital firing system is provided at 852, including a firing circuit, a digital code plug, and a firing control panel to fire a remote mission payload communicatively coupled to the firing circuit. At 854, a message comprising information about an error made by the firing circuit and a possible cause of the error is generated and encrypted at the firing circuit and transmitted at 856 to the firing control panel. The message is decrypted 858 at the control panel. A parsable local message is generated at 860 and displayed to a user at 862 and recorded in a log at 864. The process is repeated for the second firing circuit at 866-876. The operator of the remote digital firing system doesn't have to be present at the firing circuits to diagnose problems.

A variety of modification and variations of the present invention are possible in light of the above teachings. It is therefore to be understood that, within the scope of the appended claims, the present invention may be practiced other than as specifically described herein.

Mechanically Triggered Weapon

Figure 17A:
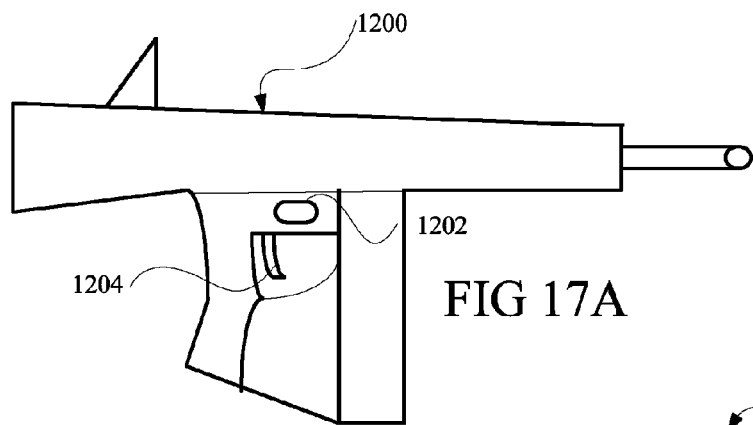
FIGS. 17A through 17B are schematic illustrations of a preferred mechanically triggered weapon.
Figure 17D:
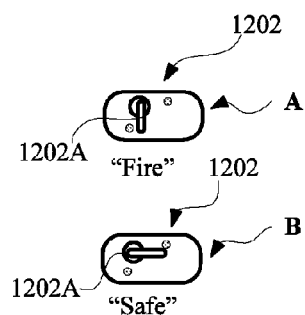
FIG. 17D is a schematic illustration of a safety lever included on a mechanically triggered weapon.
Figure 17B:
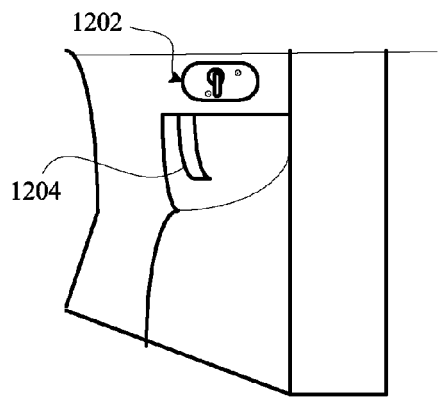

A weaponized robotic platform 1000 may be created by removably securing a mechanically triggered weapon 1200 to the robotic platform 1010. An example of a weaponized robotic platform 1000 includes a platform 1010 fitted with a M82 0.50 caliber sniper rifle (e.g., the M95 distributed by Barrett Firearms Co.). The weapon 1200 is schematically illustrated in FIGS. 17A and 17B. While the weaponized mobile robotic platform 1000 according to the present invention is described below in terms of a 0.50 caliber rifle having a safety selector switch 1202 and a trigger 1204 as the mechanically triggered weapon 1200 that is secured and integrated with the robotic platform 1010 to create the weaponized robotic platform 1000, alternative versions may include different mechanically triggered weapons. Examples of such alternative semi-automatic weapons include: the AA12 Assault shotgun, the MI014 combat shotgun, and any other mechanically triggered weapon that fires a projectile suitable for disrupting an improvised explosive device (IED), or an explosive ordinance device (EOD). While IED and EOD missions sometimes use specific EOD/IED "disrupters" that fire large shotgun rounds including water or clay, two types of ordinary weapons that may be used in lieu of the "disrupter" including: very large caliber, semi-automatic sniper or anti-material rifles (e.g. 0.50 caliber rifles), and semi-automatic "combat" or "assault" shotguns.

Alternatively, the weaponized robotic platform 1000 may include a weapon intended for delivering non-lethal or incapacitating force. In accordance with one example embodiment, the weapon may include a rifle or shotgun combined with another non-lethal projectile cartridge, such as a tethered electrical discharge dart (see, for example, U.S. pre-grant patent application publications 2007/0097592 published May 3, 2007, and 2006/0027127 published Feb. 9, 2006, as well as U.S. Pat. No. 4,253,132 issued in 1981, each of which is incorporated herein by reference in its entirety). In another embodiment, a semiautomatic 12-gauge shotgun is detachably mounted to the robotic platform 1010, where the chamber of the shotgun contains a shotgun cartridge which, when struck by the firing pin of the shotgun, discharges a projectile for delivering non-lethal force (the projectile may be accelerated out the barrel of the weapon using a traditional percussion-primed powder charge and sabot, for example, or using a compressed gas propellant, inter alia). As a non-limiting example, the shotgun ammunition may propel an untethered fin-stabilized projectile that delivers a non-lethal, incapacitating pulsed electrical current upon striking a target. As a further alternative, the weaponized robotic platform 1000 may be armed with a gas-cartridge based weapon, such as a commercially available pistol-shaped electrical shock weapon, which ejects tethered electrode darts toward a target in order to apply incapacitating electrical current, using compressed carbon dioxide or nitrogen propellant cartridges to discharge the tethered electrode darts. As discussed herein, when the pistol and/or the 12-gauge shotgun includes a safety mechanism and trigger, either or both may be used as weapons that are sequenced (i.e., disengaging the safety mechanism, firing by actuating the trigger, and then re-engaging the safety mechanism) using the firing circuit and sequencers described in the present embodiments.

Referring again to FIGS. 17A and 17B, the example weapon 1200 has a dual-position safety selector switch 1202. The weapon 1200 is then in a state of either a "safe" or "fire" condition, depending on the position of the safety lever 1202A. Altering the position of the safety selector switch 1202 is accomplished by pushing the safety lever 1202A upwardly to place the rifle in a "safe" condition, and by pushing the safety lever 1202A downwardly to place the rifle in a "fire" condition. These positions are illustrated in FIG. 17D where configuration A illustrates the safety lever 1202A of the safety selector switch 1202 in a "fire" position and configuration B illustrates the safety lever 1202A of the safety selector switch 1202 in a "safe" position.

Also illustrated in FIG. 17B is the trigger 1204 of the trigger mechanism, which is displaced rearwardly from a "neutral" position to a "fire" position to fire the weapon 1200 when the safety selector switch 202 is in the "fire" position. Upon release of the trigger 1204, the trigger mechanism is operative to bias the trigger 204 back to the "neutral" position. For example, the AA12 shotgun, which has two different firing modes, where the firing mode is dependent upon the length of time that the trigger is maintained in the "fire" position. For this mechanically triggered weapon, when the trigger is displaced rearwardly to the "fire" position and immediately released, the AA12 shotgun fires a single round, while a second firing mode occurs when the trigger is displaced rearwardly to the "fire" position and momentarily maintained in the "firing" position such that the AA12 shotgun fires a multiple-round burst (the number of rounds comprising the burst being dependant upon the length of time the trigger is held in the "fire" position).

Mounting Assembly

Figure 29A:
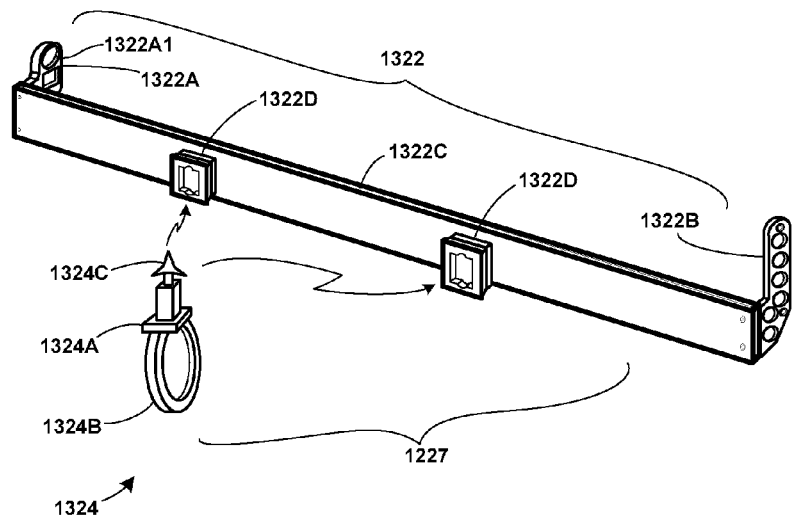
FIG. 29A illustrates an exemplary embodiment of a mounting assembly according to the present invention for removably securing the mechanically triggered weapon in integrated combination with a mobile robotic platform.

FIG. 29A illustrates an exemplary embodiment of a mounting assembly 1227 for removably securing the mechanically triggered weapon 1200 in integrated combination with the platform 1010 to create the weaponized platform 1000. The mounting assembly 1227 comprises a mounting framework 1322 that includes a barrel guide 1322A, a back plate 1322B, a mounting bar 22C, a plurality of spaced-apart retainers 1322D (only two for the illustrated embodiment), and a concomitant plurality of spaced-apart fasteners 1324 (one for each of the spaced-apart retainers 1322D).

The mounting framework 1322 structurally supports and secures the weapon 1200 to the platform 1010. The barrel guide 1322A includes an aperture 1322A1 that is sized to slidingly receive and retain the barrel of the weapon 1200. The back plate 1322B is sized to be removably affixed to the butt of the weapon 1200 stock by conventional means such as screws or bolts (not shown).

The mounting bar 1322C is secured at its ends to the barrel guide 1322A and the back plate 1322B, respectively, to provide a structural interface between the barrel guide 1322A and the back plate 1322B. The mounting bar 1322C is sized to accommodate the length and external envelope of the weapon 1200. Affixed to the broad surface of the mounting bar 1322C (opposite the broad surface thereof adjacent the weapon 1200) are spaced-apart retainers 1322D that receive and retain fasteners 1324. For the illustrated embodiment, the retainers 1322D are clamp receptacles, and fasteners 1324 are adjustable clamps.

Figure 29B:
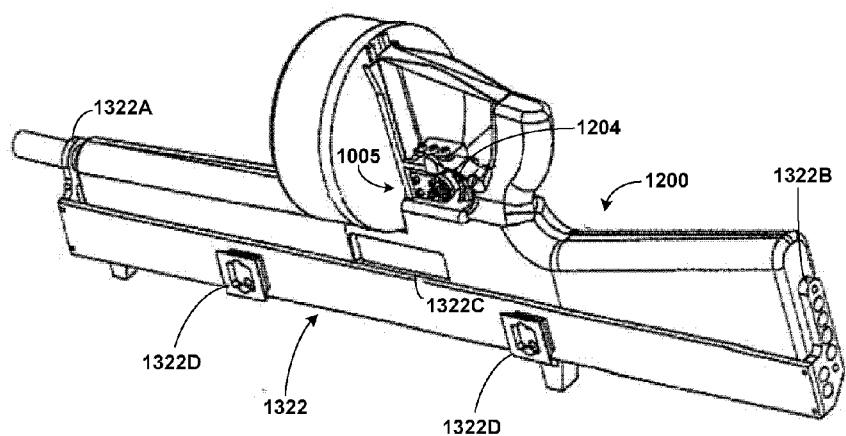
FIG. 29B illustrates the mounting framework of the mounting assembly depicted in FIG. 29A in combination with a mechanically triggered weapon.

FIG. 29B illustrates the mounting framework 1322 depicted in FIG. 29A in integrated combination with the weapon 1200. It will be noticed that the weapon 1200 is mounted upside down in the mounting framework 1322. This particular mounting arrangement allows ready access to the dual-position safety selector switch 1202 of the weapon described above for removably securing the safety control assembly 1003 of the present invention in operative combination therewith as described below in further detail.

The fasteners 1324 are sized to: (1) be securely integrated in combination with the mounting bar 1322C of the mounting framework 1322; and (2) removably secure the mounting framework 1322 in integrated combination with the robotic platform 1010 to create the weaponized robotic platform 1000. Each fastener 1324 of the described embodiment, i.e., an adjustable clamp, includes a fastener head 1324A that integrates the fasteners 1324 in combination with the mounting bar 1322C, a clamp strap 1324B that is operative to mechanically engage the mounting framework 1322 with the robotic platform 1010, and an adjustment handle 1324C that is operative to define/control the degree of physical engagement between the adjustable clamp 1324 and the robotic platform 1010.

With respect to the exemplary embodiment of the mounting assembly 1227 depicted in FIG. 29A, the fasteners 1324 and the mounting framework 1322 form a unitary structure that defines the embodiment of the mounting assembly 1227 of the present invention depicted in FIG. 29A. The clamp strap 1324B has a first end thereof fixedly secured in combination with the clamp head 1324A and a second end adjustably secured in combination with the clamp head 1324A. The clamp strap 1324B is sized to encircle a structural member of the robotic platform 1010.

For the described embodiment, the adjustable clamps 1324 encircle the terminal arm 1012C of the manipulator system 1012. This mounting arrangement allows the sensor assembly 1054, i.e., the vision and targeting system 1016 and/or the sighting camera 1221, to be used to "bore sight" the weapon 1200 of the weaponized robotic platform 1000 for firing at a target in the mission environment.

The adjustment handle 1324C is disposed in operative combination with the clamp head 1324A and the second end of the clamp strap 1324B. The adjustment handle 1324C is movable (in a first direction) to resize (tighten) the clamp strap 1324B encircling the terminal arm 1012C to removably secure the mounting assembly 1227 (and the retained weapon 1200) in integrated combination with robotic platform 1010 to form the weaponized robotic platform 1000. The adjustment handle 1324C is further movable (in a second direction) to resize (loosen) the clamp strap 1324B to facilitate removal of the mounting assembly 1227 (and the retained weapon 1200) from the weaponized robotic platform 1000.

The elements of the mounting framework 1322 and fasteners 1324, i.e., the mounting assembly 1227, described in the preceding paragraphs are fabricated from any conventional material, e.g., stainless steel, which provides the requisite structural strength and integrity and resistance to any corrosive effects of the mission environment, that is consistent with the operating parameters required by the mounting assembly 1227.

While the above is a preferred embodiment of the invention, alternative embodiments can include a mounting assembly 1227 that mounts different mechanically triggered weapons 1200. These alternative embodiments could also include a mounting assembly 1227 that mounts a mechanically triggered weapon on alternative robotic platforms. These versions may include alternative retainers 1322D that include a plurality of holes bored through the mounting bar 1322C, or the mounting framework 1322 could be cast or machined as a single structural form that includes bored retainers 1322D. One skilled in the are will also appreciate is also within the scope of the present invention to eliminate the retainers 1322D as a functional element of the mounting assembly 1227 where the fasteners 1324 are directly secured to the mounting bar 1322C, e.g., by welding.

Safety Control Assembly

Figure 17C:
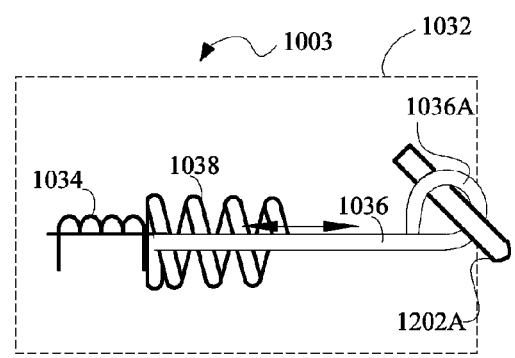
FIG. 17C is a schematic illustration of the safety control assembly.

An exemplary embodiment of a safety control assembly 1003 according to the present invention for 'unsafing' and 'safing' a mechanically triggered weapon 1200 is exemplarily illustrated in FIG. 17C. The safety control assembly 1003 is sized to be removably secured in integrated combination with the mechanically triggered weapon 1200 so that the safety control assembly 1003 mechanically engages the safety switch in the "safe" position (see FIG. 17D). The safety selector switch 1202 defaults to the "safe position," and so also initializes to a "safe position."

The safety control assembly 1003 is further operative, in response to actuation to activation by a start signal generated by the sequencing circuit 1008 which is generated in response to the internal command signal 1002, to mechanically displace the safety lever 1202A to the "fire" position (from the "safe" position) and to maintain the safety lever 1202A in the "fire" position during the pulse life of the start signal. Preferably, the safety control assembly 1003 is further operative, upon cessation of the start signal, to impart a counterforce to the safety lever 1202A that causes the safety lever 1202A to return to the "safe" position.

Figure 19:
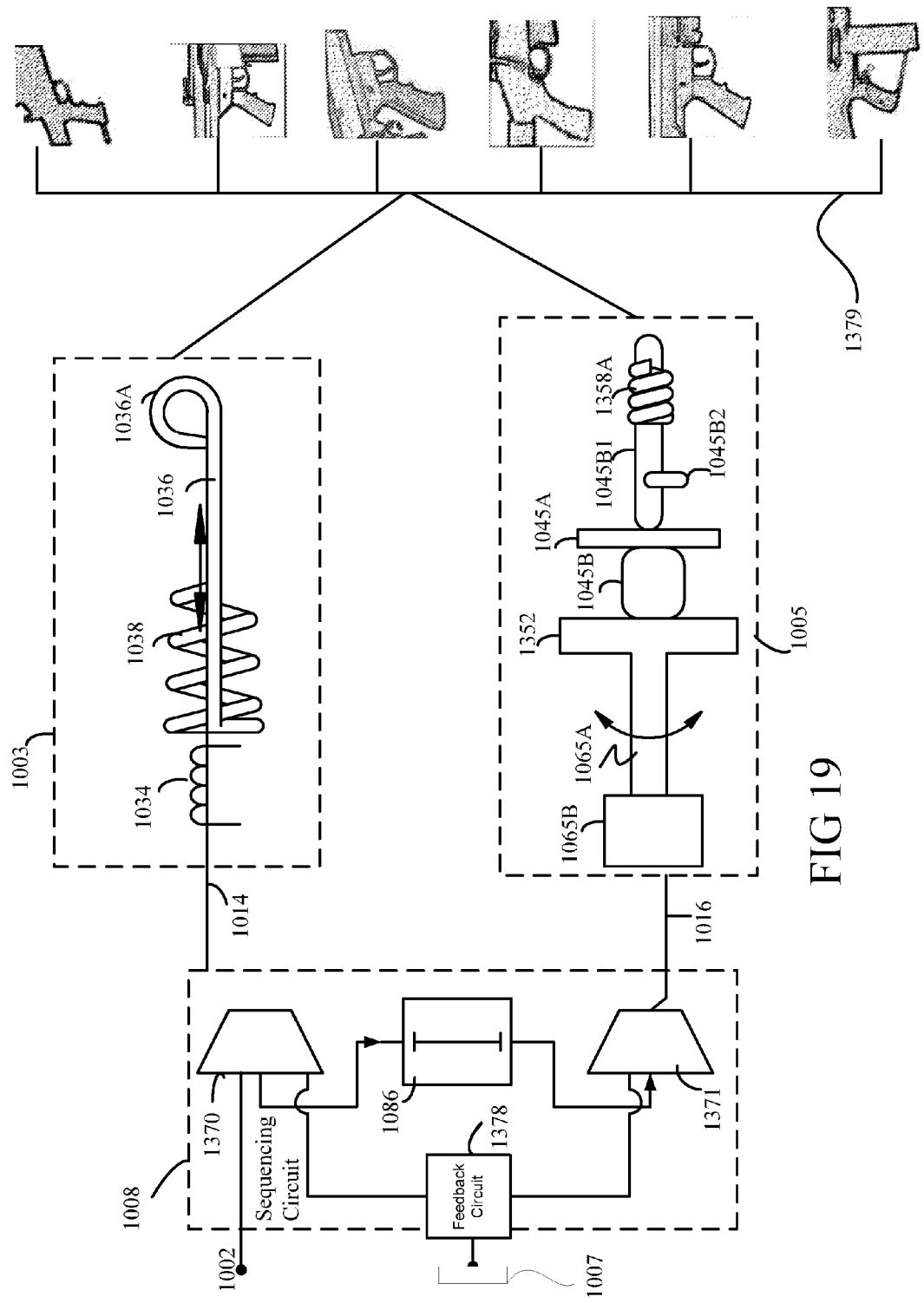
FIG. 19 is a schematic illustration of the safety control assembly and the trigger control assembly connected to the sequencing circuit and the mechanically triggered weapon to form the sequencer.

Illustrated in FIG. 17C and FIG. 19 are exemplary embodiments of the safety control assembly 10003. Included within this version of the safety control assembly 1003 is a mounting container 1032, a solenoid 1034, a support shaft 1036, a spring 1038, and an electrical connector 1014. The mounting container 1032 is sized to house the solenoid 1034, a portion of the support shaft 1036, the spring 1038, and to provide outlets (not shown) for the support shaft 1036 and the electrical connector 1014 to project outwardly from the mounting container 1032. The mounting container 1032 has an external configuration that allows it to be removably integrated in combination with the stock of the weapon 1200 adjacent the dual-position safety selector switch 1202.

The solenoid 1034 operates substantially similar to a solenoid valve in that the included solenoid 1034 receives a signal from the firing circuit 20 via the electrical connector 1014, and mobilizes the connected support shaft 1036 to provide the motive power necessary to move the safety lever 1202A into the "fire" position. The solenoid preferably includes a coil of electromagnetic, inductive material (not shown) wrapped around a slug (not shown) such that the slug is activated to move laterally along a plane parallel to the length of the coil according to a magnetic field generated from the received electrical signal. When the firing circuit 20 generates a signal that is passed to the solenoid 1034 from the sequencing circuit 1008, the electrical pulse causes a magnetic field to form on an end of the coil such that the slug moves from its start position in a direction opposite from the direction from which the signal was received and a direction towards the safety lever 1202A. As the slug moves forward, a force is applied to the support shaft 1036 that causes the support shaft 1036 to move from its start position forward in the same direction as the slug's direction of movement. Movement of the support shaft 1036 further causes a force to be applied to the spring 1038 connected to the support shaft 1036 in the same direction as the slug's direction of movement. The slug remains in a forward position for the duration of the signal. When the sequencing circuit 1008 terminates the signal, the magnetic field ceases to exist which causes the slug to move into its start position. Movement of the slug into its start position further causes the support shaft 1036 to move into its start position, which further releases the force applied to the spring 1038 and causes the spring 1038 to move back into its start position. While it is preferred that a solenoid 1034 be used to provide the force, other mobilizing devices such as a motor may be used to provide force to the support shaft 1036.

The support shaft 1036 extends through one of the outlets of the mounting container 1032 to provide the mechanical connection between the solenoid 1034 and the safety lever 1202A. Preferably the support shaft 1036 includes a rod, but can also include a dowel, bar, beam, or other support structure that can be used in conjunction with a solenoid to mobilize a member 1036A connected to the safety lever 1202A. Installed on an end of the support shaft 1036 opposite from the end of the support shaft 1036 connected to the solenoid 1034, is a member connected to the safety lever 1202A. The member 1036A is a mechanical connector that engages the safety lever 1202A, and provides a force to the safety lever 1202A is the same direction as the force applied by the solenoid 1034, to push or pull the safety switch. Preferably the member 1036A is shaped like a hook, but alternatively can have any one of the following shapes: toroid, hook, ring-shaped, or like the eye of a needle, or any other shape able to move the safety lever 202A between the "safe" and "fire" positions. Upon receiving the start signal, the solenoid 1034 is mobilized to impart a first translational movement to the support shaft 1036 to displace the safety lever 1202A to the "fire" position. While current is supplied to the solenoid 1034, the solenoid 1034 is operative to maintain the safety lever 1202A in the "fire" position.

The spring 1038 is connected to the support shaft 1036, and stores a counterforce when the spring 1038 receives a force from the support shaft 1036. The stored counterforce in the spring 1038 remains as such for the duration of the signal sent from the firing circuit 20. When the signal ceases and the solenoid translates back into its start position, the store counterforce causes the spring 1038 to exert a force on the support shaft 1036 that further exerts a force on the safety lever 1202A to return the safety lever 1202A to the "safe" position. Spring 1038 can include any one of a coil, rubber, or tension spring.

The electrical connector 1014 provides the electrical connection between the solenoid 1034 and the sequencing circuit 1008, and preferably includes a connection wire 1014, but could include any other type of electrical connection able to relay electrical signals. Electrical current generated by the sequencing circuit 1008, in response to the internal command signal 1002, is conducted through the connection wire 1014 to energize the solenoid 1034, which causes the weapon 1200 to enter one of either a "safe" or "unsafe" condition.

Trigger Control Assembly

An exemplary embodiment of a trigger control assembly 1005 according to the present invention for firing a weapon 1200 is exemplarily illustrated in the front, side, top and end views of FIGS. 18A-18D. The trigger control assembly 1005 is sized to be removably secured in integrated combination with the mechanically triggered weapon 1200 so that the trigger control assembly 1005 mechanically engages the trigger 1204 thereof in its "neutral" position.

The trigger control assembly 1005 is further operative, in response to actuation by the sequencing circuit 1008 via a second start signal generated in response to the internal command signal 1002, to mechanically displace the trigger 1204 rearwardly to the "fire" position wherein the trigger mechanism of the weapon 1200 is activated, causing the weapon 1200 to fire a single round. The trigger control assembly 1005 is also operative to generate and store a biasing force during the mechanical displacement of the trigger 1204. When deactivated (as described below in further detail), the trigger control assembly 1005 is further operative to exert a stored biasing force to return the trigger 1204 to its "neutral" position.

The illustrated embodiment of the trigger control assembly 1005 comprises a trigger block 1352, a trigger interface 1045, a drive shaft and motor 1065, and a spring assembly 1358. The trigger block 1352 is sized to provide structure for removably securing the other elements of the trigger control assembly 1005 in operative combination with the external trigger assembly of the mechanically triggered weapon 1200. The trigger interface 1045 is mechanically engaged in combination with the trigger block 1352 with fasteners, wherein fasteners include bolts or other connector able to mechanically secure the trigger block 1352 to the trigger interface 1045. The trigger interface 1045 further mechanically engages the trigger 1204 in the "neutral" position. The drive shaft and motor 1065 are disposed in operative combination with the trigger block 1352 to provide motive power to the trigger interface 1045.

The trigger interface 1045, which is operative to mechanically displace the trigger 1204 from the "neutral" position to the "fire" position, comprises a trigger cam stop 1045A and a trigger cam 1045B. The trigger cam stop 1045A provides the mechanical engagement of the trigger interface 1045 with the trigger block 1352 using bolts. A plurality of stop holes 1045A1, which are formed through the arcuate peripheral portion of the trigger cam stop 1045A, are used to define the limits of travel of the trigger 1204 of any particular weapon 1200, i.e., the "neutral" and "fire" positions of the trigger 1204 of the weapon 1200. First and second stop bolts 1045A2 are disposed in mechanical combination with the applicable stop holes 1045A1 to mechanically define the limits of travel of the trigger 1204 of the mechanically triggered weapon 1200, as exemplarily illustrated in FIG. 18A.

The trigger cam 1045B is disposed in rotatable combination with the trigger cam stop 1045A such that the trigger cam 1045B mechanically engages the trigger 1204 of the mechanically triggered weapon 1200 in the "neutral" position. The trigger cam 1045B is sized so that a rotation thereof in a first direction causes the mechanical displacement of the trigger 1204 from the "neutral" position to the "fire" position and rotation thereof in the opposite direction allows the trigger 1204 to return to the "neutral" position from the "fire" position.

A trigger camshaft 1045B1 is affixed to one end of the trigger cam 1045B to extend through the trigger cam stop 1045A. A travel limit member 1045B2 extends outwardly from the trigger camshaft 1045B1 and is sized to mechanically engage the first and second stop bolts 1045A2, as applicable. Rotation of the trigger cam 1045B causes a concomitant rotation of the trigger camshaft 1045B1 wherein the travel limit member 1045B2 will mechanically engage either the first or second stop bolts 1045A2, depending upon the direction of rotation of the trigger cam 1045B, to mechanically define the limits of travel of the trigger 1204. This feature of the trigger control assembly 1005 prevents the trigger 1204 from being displaced beyond the "fire" or "neutral" positions, which may adversely affect the subsequent operation of the trigger mechanism of the mechanically triggered weapon 1200.

The motor and drive shaft assembly 1065 includes a drive shaft 1065A and motor 1065B, but can alternatively include a solenoid or other mechanism for driving, mobilizing or rotating an attached actuator. The motor and drive shaft assembly 1065 is operative to provide the motive power needed to mechanically displace the trigger 1204 from the "neutral" position to the "fire" position, The drive shaft 1065A, which is disposed in rotatable combination with the trigger block 1352, has one end thereof affixed to the trigger cam 1045B and the other end thereof in operative combination with the motor 1065B. The motor 1065B is operative, in response to the second start signal, to provide the motive power to rotate the drive shaft 1065A, and concomitantly the trigger cam 1045B, in the first direction, which causes the mechanical displacement of the trigger 1204 from the "neutral" position to the "fire" position. Upon deactivation by the sequencing circuit 1008 as described below in further detail, the motor 1065B is operatively disengaged from the drive shaft 1065A so that the drive shaft 1065A, and concomitantly the trigger cam 1045B, can rotate in the opposite direction, thereby allowing the trigger 1204 to return to the "neutral" position from the "fire" position.

The motor 1065B for the trigger control assembly 1005 can be any conventional electrical motor that provides sufficient motive power to mechanically displace the trigger 1204 from the "neutral" position to the "fire" position. Conventional weapons require an applied force in the range of 2-8 lbs to mechanically displace the trigger 1204 from the "neutral" position to the "fire" position.

Figure 18A:
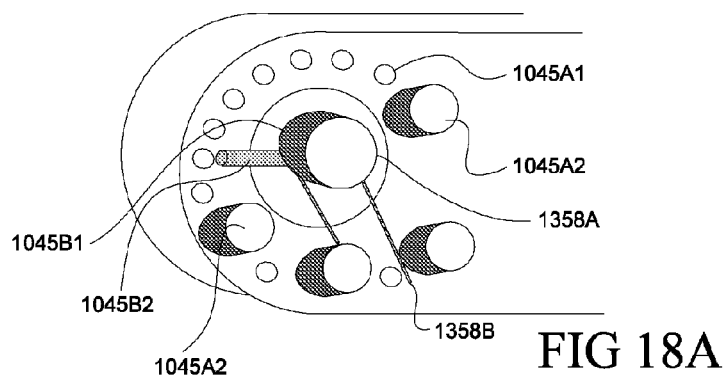
FIGS. 18A through 18D are schematic illustrations of the trigger control assembly.
Figure 18B:
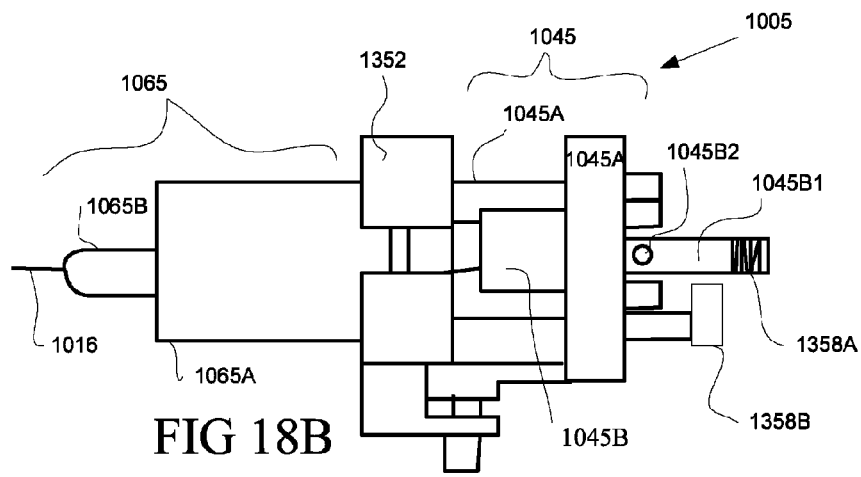
Figure 18D:
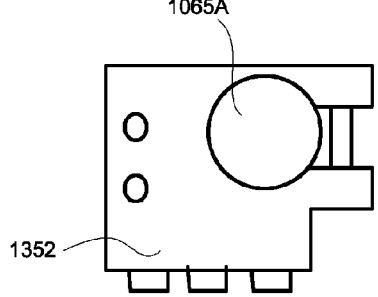
Figure 18C:
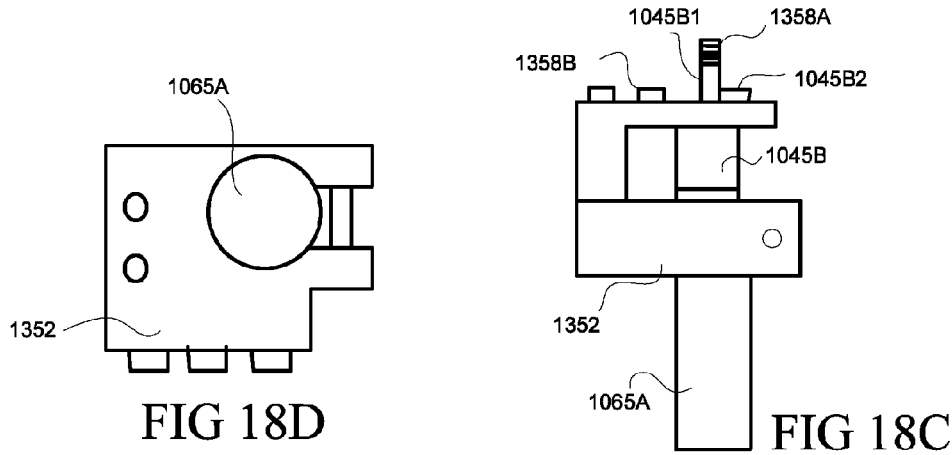

The spring 1358 assembly is operative to provide the biasing force to return the trigger 1204 from "fire" position to the "neutral" position when the trigger control assembly 1005 is deactivated. For the exemplary embodiment illustrated in FIGS. 18A-18D, the spring assembly 1358 comprises a spring 1358A and a spaced apart pair of biasing stops 1358B (only one is shown in FIG. 18A the other can be seen in FIG. 18B). The spring 1358A is affixed to the trigger camshaft 1045B1 so that the free ends of the spring 1358A mechanically engage the pair of spaced apart biasing stops 1358B.

Rotation of the trigger cam 1045B in the first direction causes a concomitant rotation of the of the trigger camshaft 1045B1 until the travel limit member 1045B2 mechanically engages the stop bolt 1045A2 that mechanically defines the "fire" position of the trigger 1204. The rotation of the trigger camshaft 1045B1 in the first direction causes a biasing force to be stored in the spring 1358A (due to the mechanical engagement of the ends 1358A1 of the spring 1358A with the biasing stops 1358B which causes the spring 1358A to be compressed). When the motor 1065B is operatively disengaged from the drive shaft 1065A, the biasing force stored in the spring 1358A is operative to cause the rotation of the trigger camshaft 1045B1, and concomitantly the trigger cam 1045B, in the opposite direction until the travel limit member 1045B2 mechanically engages the stop bolt 1045A2 that mechanically defines the "neutral" position of the trigger 1204.

The electrical connector 1016 provides the electrical connection between the motor and drive shaft assembly 1065 and the sequencing circuit 1008, and preferably includes a connection wire 1016 or other connector able to relay electrical signals. Electrical current generated by the sequencing circuit 1008, in response to the internal command signal 1002, is conducted through the connection wire 1016 to energize the motor and drive shaft assembly 1065, which causes the trigger 1204 to be mechanically displaced to the "fire" position as described in the preceding paragraphs.

Sequencing Circuit, Safety Control Assembly, and Trigger Control Assembly System Illustrated in FIG. 19 is the exemplary system of the sequencing circuit 1008, the safety control assembly 1003 and the trigger control assembly 1005. Included within the sequencing circuit 1008 is a feedback circuit 1378 for monitoring the operation of the safety control assembly 1003 and the trigger control assembly 1005; and for providing an electrical default safe protocol for the trigger control assembly 1005. The default safe protocol includes a circuit with a clock that tracks the amount of time lapsed since the safety control assembly 1003 "unsafed" the weapon 1200. When the time lapsed exceeds a predetermined threshold time value, the circuit interrupts the internal command signal 1002 so that the safety control assembly 1003 returns the safety lever 1202A to a "safe" position. Preferably, the feedback circuit 1378 is connected via an electrical wire to the weapon controller circuit 1063, such that the weapon controller circuit 1063 is able to relay status information to the microprocessor 1050 included on the robotic platform 1010. Further included in the circuit are a safety signal generator 1370 and a trigger signal generator 1371, where each of the safety signal generator 1370 and the trigger signal generator 1371 are comprised of circuits able to generate start signals to be relayed to the safety control assembly 1003 and the trigger control assembly 1005, respectively, via electrical connections. Installed between the safety signal generator 1370 and the trigger signal generator 1371 is a delay time circuit 1086 which implements a time lag after the safety signal generator 1370 relays a first start signal to the safety control assembly 1003 via an electrical connection 1014 and before the trigger signal generator 1371 relays a second start signal via an electrical connection 1016 to the trigger control assembly 1005.

The safety control assembly 1003 as displayed in FIG. 19 includes a solenoid 1034 connected to the sequencing circuit 1008 via an electrical connector 1014. The solenoid 1034 is further connected to a rod 1036 with a hooked member 1036A attached to the rod's 1036 distal end. The spring 1038 is wrapped around the end of the rod 1036 opposite the hooked member 1036A to provide a counterforce that causes the safety lever 1202A to return to the "safe" position when the signal to the solenoid 1034 is removed and the solenoid 1034 returns to its start position.

The trigger control assembly 1005 as displayed in FIG. 19 includes a motor 1065B that is electrically connected to the sequencing circuit 1008 via a wire 1016. The motor 1065B is connected to a drive shaft 1065A that is further connected to a trigger block 1352 on which a trigger cam 1045B and trigger cam stop 1045A is installed. Further connected to the trigger cam stop 1045A is a trigger cam shaft 1045B1 which includes a spring 1358A to provide a biasing force and an additional actuator or spindle 1045B2. When the trigger control assembly 1005 is deactivated, the spring 1358A provides a biasing force that causes the spindle 1045B2 to move in an opposite direction such that the trigger 1204 is returned to the neutral position.

Further referring to FIG. 19, both the trigger control assembly 1005 and the safety control assembly 1003 are installed in combination with the mechanically triggered weapon 1200. In particular, the safety control assembly 1003 and trigger control assembly 1005 are installed in interactive combination with the dual position safety selector switch 1202 and the trigger 1204 of the mechanically triggered weapon 1200. While the preferred embodiment of the invention refers to the weapon's trigger 1204 and safety selector switch 1204, other triggers and safety selector mechanisms installed on other mechanically triggered weapons 1200 are also compatible with both the mechanical and electrical constraints of the trigger control assembly 1005 and the safety control assembly 1003.

Figure 20:
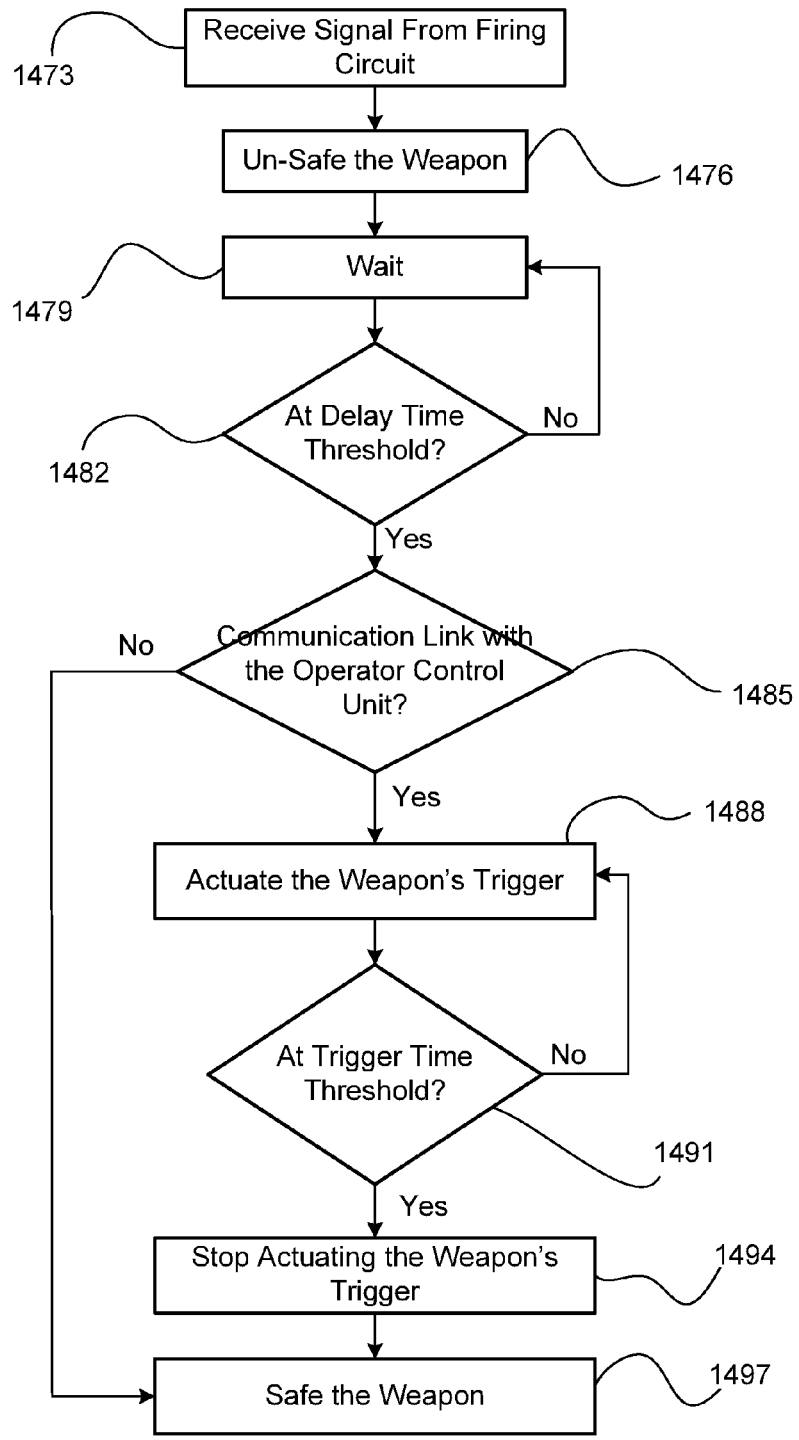
FIG. 20 is a flow diagram of the steps taken by the sequencer to fire the mechanically triggered weapon.

FIG. 20 displays a flowchart of the firing protocol by which the weaponized mobile robotic platform 1000 inputs a signal and uses such signal to unsafe the mechanically triggered weapon 1200 and further actuate the weapon's trigger 1204. The command from the operator control unit 1100 is received by the firing circuit 20 and transmitted 1473 to the sequencer 1030. Once the signal is received by the sequencer 1030, the signal is relayed to the safety control assembly 1003 which responds by arming 1476 the mechanically triggered weapon 1200. After arming the weapon 1200, there is a waiting period 1479 which lasts a time period 1482 equal to that of the period defined by the delay circuit 1086 of the sequencing circuit 1008. Once the wait time period equals that of the time period defined by the delay circuit 1086, the weapon's trigger 1204 is actuated 1488. Actuation of the trigger 1204 lasts for a period of time 1491 equal to that of the time period defined by the firing period circuit 1088. The trigger 1204 is then released 1494 once the requisite time threshold defined by the firing period circuit 1088 is reached. Immediately upon cessation of trigger 1204 actuation 1494, the mechanically triggered weapon 1200 is "safed" 1497.

Weapon Controller

Figure 21A:
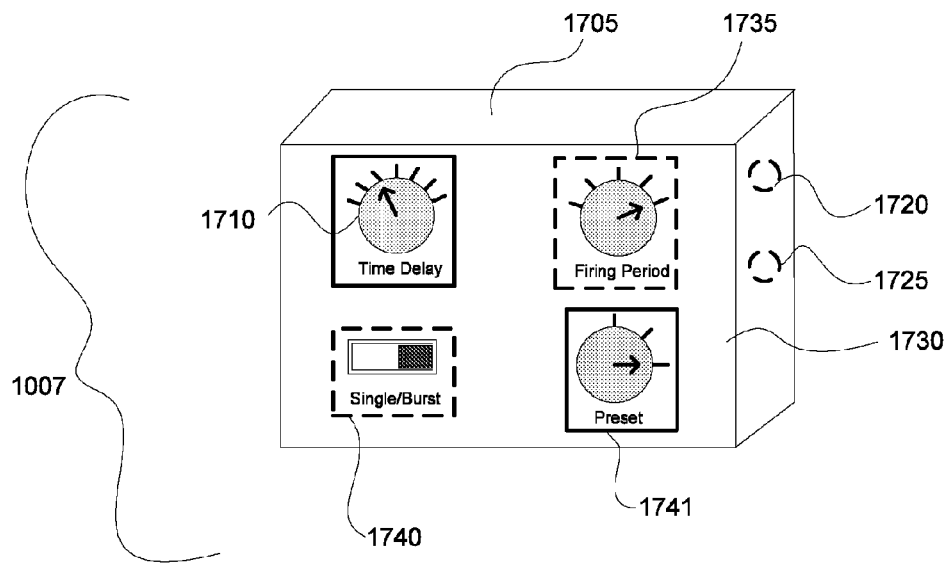
FIG. 21A is a schematic illustration of the weapon controller.

FIG. 21A depicts an exemplary embodiment of a weapon controller 1007 that combines with a mechanically triggered weapon 1200 and includes a housing 1705, a safety output port 1725, a trigger output port 1720, a time lag selector 1710, and a preset selector 1741. Alternative versions may include a weapon controller 1007 with a firing period selector 1735, and/or a single or burst mode selector 1740 for those mechanically triggered weapons that fire in a single shot or burst mode, where such a mode is chosen by actuating an additional switch, button or lever included on the weapon. Preferably, the weapon controller interface 1730 will include the housing 1705, the time lag selector 1710, the preset selector 1741, the firing period selector 1735, and the single or burst mode selector 1740. The weapon controller circuit 1063 is included within the weapon controller 1007 and is further connected to the sequencing circuit 1008 such that the electrical wires that connect the sequencing circuit 1008 to the safety control assembly 1003 and the trigger control assembly 1005 may run from the interior of the weapon controller 1007 through plug connectors installed in the wall of the weapon controller 1007. These plug connectors are the safety output port 1725, and the trigger output port 1720. Wires connecting the safety control assembly 1003 to the sequencing circuit 1008 pass through the safety output port 1725 to establish the connection between the assembly 1003 and the circuit 1008, while wires connecting the trigger control assembly 1005 to the sequencing circuit 1008 pass through the trigger output port 1720 to establish the connection between the assembly 1005 and the circuit 1008.

Each of the components installed within the housing 1705 are electrically connected to the sequencing circuit 1008. The weapon controller 1007, which is integrated in mechanical combination with the weaponized robotic platform 1000 and in electrical combination with the sequencing circuit 1008 and the central control system 1020 thereof, provides an interface 1730 whereby an operator can, in alternative embodiments, pre-select the parameters that control the actuation and operation of the trigger control assembly 1005 (pre-select being used in the sense that the parameters are selected before the weaponized mobile robotic platform 1000 is dispatched into its mission environment).

The preferred weapon controller 1007 configuration is operative to provide electrical connections able to couple the firing circuit 20 to the sequencing circuit 1008 via an electrical connection 1056 between the weapon controller circuit 1063 and the microprocessor 1050 included in the robotic platform. Parameters selected by the user using actuators included on the weapon controller's user interface 1730 are transmitted to the sequencing circuit 1008 via the weapon controller circuit 1063 which is further connected in part to the microcontroller 1090 included in the sequencing circuit 1008. Selectors included on the controller's interface 1730 are preferably multi-bit selectors. Both the time lag selector 1710 and the firing period selector 1735 are preferably multi-bit selectors or potentiometers. More specifically, they are four bit DIP switches. The preset selector 1741 and the single or burst mode selector 1740 are preferably two bit selectors, or two position DIP switches. Alternatively, any one of the selectors can include a multi-bit DIP switch, a potentiometer, or other selection device.

Actuation of the time lag selector 1710 alters the characteristics of the time delay circuit 1086. The time delay circuit 1086 includes circuit components able to adjust the length of the time lag according to the setting of the time lag selector 1710. This is accomplished almost instantaneously as the time delay circuit 1086 is electrically connected to the time lag selector 1710 via a wire. For example, if the time lag selector 1710 is turned to a position indicating that the time lag should be 2 seconds, the time delay circuit 1086 employs the circuit components necessary to create a time lag of 2 seconds between the time when the safety control assembly 1003 "unsafes" the weapon 1200 and the time when the trigger control assembly 1005 actuates the trigger 1204.

The firing period selector 1735 is connected to a firing period circuit 1088 via a wire, and alters the characteristics of the firing period circuit 1088. The length of time which the weapon's trigger 1204 is held down is controlled by circuit components included in the firing period circuit 1088. Altering the position of the firing period selector 1735, changes the firing period and so changes the amount of time the firing period circuit 1088 dictates that the trigger 1204 should be depressed. For example, if the firing period selector 1735 is set to a firing period of 100 milliseconds, then the firing circuit 1088 will dictate that the trigger 1204 should remain actuated for a period equivalent to 100 milliseconds. A firing period selector 1735 is particularly advantageous when a mechanically triggered weapon 1200 such as the AA12 is integrated with the platform 1010 and the sequencer 1030. The AA12 is provided such that the burst mode is triggered by depressing the trigger 1204 for a longer period of time. Thus, altering the firing period to a time commensurate with that required to fire the AA12 in a burst mode can be accomplished by altering the firing period dictated by the firing circuit 1088 via the firing period selector 1735.

The single or burst mode selector 1740 is further connected to the sequencing circuit 1008 and is operable to control the firing mode of the weapon 1200, while the preset selector 1741 is connected to the sequencing circuit 1008 and is operable to control the firing mode of the weapon 1200. Weapons 1200 installed on the robotic platform 1010 can differ as to the method required to fire them in different firing modes. The single or burst mode selector 1740 can be used to choose the firing mode for those weapons 1200 that require a two position switch to choose the firing mode. The preset selector 1741 can be included to alter the firing mode according to the type of weapon 1200 installed on the platform 1010. For example, the sequencing circuit 1008 and weapon controller circuit 1063 can be preset with different firing modes that correspond to different weapons 1200. The preset selector 1741 can then be used to choose a firing mode based on the weapon 1200 installed.

Preferably the weapon controller circuit 1063 interfaces with the sequencing circuit 1008 such that the weapon controller circuit 1063 is substantially integrated into the sequencer 1030. Alternative versions of the embodiment may include an embodiment where the weapon controller circuit 1063 is fully integrated into the sequencing circuit 1008. Still other embodiments may include a firing circuit 20 where the weapon controller circuit 1063 and the sequencing circuit 1008 are fully integrated into the firing circuit 20. In such an embodiment, the selectors included on the weapon controller 1007 may interface with the firing circuit 20 in lieu of the weapon controller circuit 1063 and the sequencing circuit 1008.

The housing 1705 of the weapon controller mechanism 1007 is sized to contain the embodiment of the sequencing circuit 1008, the weapon controller circuit 1063 and the weapon controller interface 1730. The housing 1705 is further sized to be affixed in mechanical combination with the weaponized robotic platform 1000 using fasteners, where fasteners includes bolts, screws, clamps, Velcro. Additionally, the housing 1705 is connected electrically with the enclosed circuitry via an electrical connection such as a wire, or serial connection. The housing 1705 is fabricated from a rugged material, where such material is relatively impervious to water, dust, and external contaminants and immune to mechanical shocks.

Sequencing Circuit

Figure 21B:
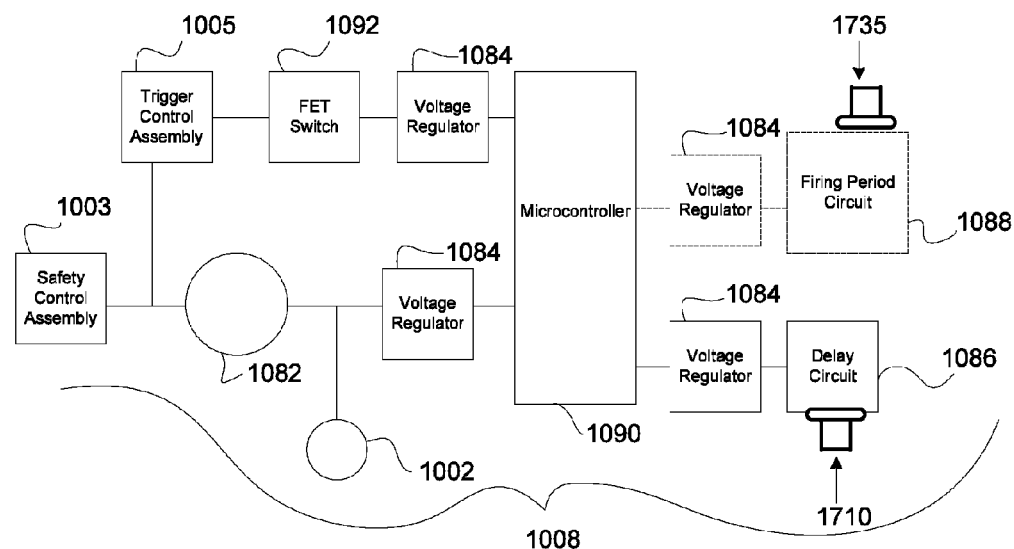
FIG. 21B is a block diagram of the sequencing circuit.

Illustrated in FIG. 21B is the preferred embodiment of the sequencing circuit 1008 to be included in the sequencer 1030. The sequencing circuit 1008, when activated in response to the internal command signal 1002 input, is first operative to actuate the safety control assembly 1003 as described above. When actuated, the safety control assembly 1003 mechanically displaces the safety lever 1202A of the dual-position safety selector switch 1202 of the mechanically actuated weapon 1200 to a position that corresponds to placing the mechanically triggered weapon 1200 in an armed state. The sequencing circuit 1008 is further operative to maintain the safety lever 1202A in the "fire" position for a time period substantially equivalent to the pulse width of the internal command signal 1002 input.

The sequencing circuit 1008 is further operative to actuate and operate the trigger control assembly 1005 according to the parameters predetermined by the operator via the weapon controller 1007. Included within these parameters is the preselected delay time lag DT that occurs between the point in time when the safety control assembly 1003 arms the weapon 1200 and the point in time when the trigger control assembly 1005 actuates the trigger 1204 to discharge the weapon. The operator controls the predetermined time period that characterizes the delay time lag by actuating the time-delay selector 1710 included on the weapon controller 1007. A pre-selected time lag is advantageous because such a delay time period ensures that the safety control assembly 1003 has completely disengaged the dual-position safety selector switch 1202, i.e., mechanically displaced the safety lever 1202A to the "fire" position, before the actuation of the trigger control assembly 1005.

Alternative versions of the sequencing circuit 1008 may further define a firing period for the pre-selected firing mode for the mechanically triggered weapon 1200, based upon an operator input via the firing-mode selector 1740. The defined firing period for the pre-selected firing mode is the period of time during which the trigger 1204 must be maintained in the "fire" position to fire a single round or "N" rounds according to the standard operation of the weapon 1200. The sequencing circuit 1008 is also operative to maintain the trigger 1204 in the "fire" position during the defined firing period.

The defined firing period for firing any particular weapon 1200 is a function of the standard operating characteristics of a particular weapon 1200 and may be either variable or fixed. Firing period generally refers to the period of time that the trigger 1204 is mechanically held in the "fire" position. This time includes the time required for the mechanical components of the trigger mechanism to displace the firing pin to strike the primer of a chambered round, the time required for the round to detonate, the time required for operation of the receiver to eject the expended round and the time required for operation of the receiver to chamber another round. The defined firing period for any particular weapon 1200 is determinable from empirical observation or its technical specifications (rate of fire).

The defined firing period for a multiple round burst, however, may be either a constant or a variable, depending upon the configuration of the weapon controller mechanism 1007 and the technical specifications of the weapon 1200. For an embodiment of the weapon controller mechanism 1007 that does not include the burst selector 1740, the multiple-round burst option can consists of a predetermined number N of rounds, e.g., three rounds, or can be controlled by setting the firing period selector 1735 to a period of time commensurate with a time period that causes the weapon 1200 to fire a multiple round burst.

For an alternative embodiment of the weapon controller mechanism 1007 that includes the burst selector 1740, the sequencing circuit 1008 may further define the number N of rounds comprising the pre-selected multiple-round burst option. In this configuration, the defined firing period is a variable that depends on the number N of rounds pre-selected by an operator via the preset selector 1741. In such an embodiment, the preset selector 1741 can define the number N of rounds rather than the firing mode of various weapon types.

The sequencing circuit 1008 is operative to be deactivated upon termination of the start signal 1002. Preferably, the configuration of the sequencing circuit 1008, when deactivated, causes the safety control assembly 1003 to be concomitantly deactivated. In such a preferred embodiment, as exemplarily illustrated in FIG. 17C, the safety control assembly 1003 is operative, upon deactivation of the sequencing circuit 1008, to exert its stored biasing force to return the safety lever 1202A of the dual-position safety mechanism to the "safe" position as described above.

The trigger control assembly 1005 is deactivated independently of the termination of the second start signal, which deactivates the sequencing circuit 1008 (and concomitantly, the safety control assembly 1003). Preferably, the trigger control assembly 1005 is deactivated prior to the deactivation of the sequencing circuit 1008 (and the safety control assembly 1003). Such a deactivation schedule prevents operating conflicts between the safety control assembly 1003 and the trigger control assembly 1005 that could damage the mechanically triggered weapon 1200. That is, it is not considered prudent to be disarming the mechanically triggered weapon 1200 via operation of the safety control assembly 1003 while the mechanically triggered weapon 1200 is still discharging or otherwise operating in a pre-selected firing mode, i.e., 'firing', under the control of the trigger control assembly 1005.

With reference to FIG. 21B, the preferred version of the sequencing circuit is characterized by a microcontroller 1090 connected to the firing period circuit 1088 and the delay circuit 1086. These connections are made via a wire and must further include a voltage regulator installed between the firing period circuit 1088 and the delay circuit 1086 to limit the voltage applied to such circuits. Also connected to the microcontroller 1090 is a FET switch 1092 and a current regulator, both of which are further connected to the trigger control assembly 1005 and the safety control assembly 1003, respectively.

For the weaponized robotic platform 1000 described above that embodies a weapon firing circuit as an element of the onboard intelligence and motion control system 1020, the internal command signal pulse 1002 is a nominal 24V DC pulse having a nominal pulse width of 2.7 seconds that is current limited to 2.6 amps. This internal command signal pulse 1002 originates from the output of the firing circuit 20, and can be characterized as a single electrical pulse. Once outputted from the firing circuit 20 and relayed to the sequencing circuit 1008, the internal command signal 1002 is then coupled to the current regulator 1082, which is electrically interfaced with the safety control assembly 1003 and the trigger control assembly 1005 by means of the electrical connectors 1014, 1016, respectively.

The current regulator 1082 is operative to individually limit the current flowing through the electrical connectors 1014, 1016 respectively, to approximately 0.6 amps each. This current limit can be adjusted by changing the value of the drop resistors associated with the current regulator 1082. The combined currents flowing through the electrical connectors 1014, 1016 should not be greater than approximately 2.2 amps, to provide a comfortable margin of safety with respect to the current limiter of the weapon firing circuit of the onboard intelligence and motion control system 1020 of the weaponized robotic platform 1000. Each of the current regulators 1082 illustrated FIG. 21B comprise a pair of linear regulators, where one regulator is electrically coupled to the safety control assembly 1003 and the other one is electrically coupled to the trigger control assembly 1005.

A voltage regulator 1084 is interfaced between the internal command signal 1002 and the micro controller 1090 and operative to limit the voltage applied to the delay-time circuit 1086, the firing-period circuit 1088, the micro controller 1090, and the FET switch 1092. The voltage regulator 1084 illustrated in the exemplary embodiment of the sequencing circuit 1008 shown in FIG. 21 comprises a model 78L05 voltage regulator that is operative to limit the voltage applied to the delay-time selector 1086, the firing-period selector 1088, the micro controller 1090, and the FET switch 1092 to 5V DC.

The delay-time circuit 1086, which is interfaced with the time-delay selector 1710 of the weapon controller mechanism 1007, is operative to define in time units the pre-selected delay time DT for the sequencing circuit 1008 by the active components and/or elements coupled to by means of the time-delay selector 1710. The pre-selected delay time DT is the lapse in time implemented by the sequencing circuit 1008 between the actuation of the safety control assembly 1003 and the subsequent actuation of the trigger control assembly 1005. To facilitate a more complete understanding of the pre-selected delay time DT feature of the sequencing circuit 1008, reference is made to the operating state—timeline graph illustrated in FIGS. 22A and 22B.

Figure 22A:
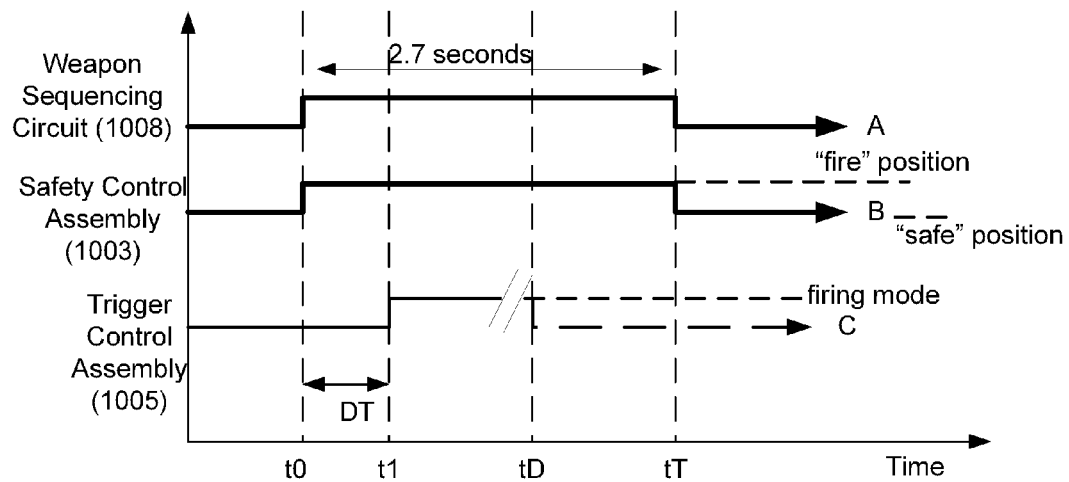
FIGS. 22A through 22B are graphs that display the time delay in relation to actuation of the safety control assembly and actuation of the trigger control assembly.

FIG. 22A depicts the operating state of the embodiments of the sequencing circuit 1008, the safety control assembly 1003, and the trigger control assembly 1005, respectively, versus time in response to actuation of the sequencing circuit 1008 by the internal command signal 1002 input (where t0 and tT indicate the leading and trailing edges thereof, respectively). Timeline A represents the effect of the internal command signal 1002 upon the operating state of the sequencing circuit 1008. At time t0 the leading edge of the signal 1002 is coupled into to the sequencing circuit 1008, causing the activation thereof. When activated, the sequencing circuit 1008 is operative to concomitantly actuate the safety control assembly 1003. While a de minimus lag may exist between the actuation of the sequencing circuit 1008 and the actuation of the safety control assembly 1003, this has been disregarded herein for the purpose of simplifying the present description.

Timeline B of FIG. 22A represents the operating state of the safety control assembly 1003. At time t0, the sequencing circuit 1008 is operative to activate the safety control assembly 1003. Operation of the safety control assembly 1003 causes the safety lever 1202 of the dual-position safety selector switch 1202 of the weapon 1200 to be mechanically displaced to the "fire" position at approximately t0 as illustrated in FIG. 22A (there is a small time lag between the activation of the safety control assembly 1003 and displacement of the safety lever 1202A to the "fire" position due to the inertia of mechanical elements, but this small time lag has been ignored to simplify the present description). The safety lever 1202A is maintained in the "fire" position over the pulse width, i.e., t0→tT, of the internal command signal pulse 1002 input, due to the continued operation of the safety control assembly 1003.

At time tT the trailing edge of the internal command signal pulse 1002 is coupled into the sequencing circuit 1008, i.e., the internal command signal pulse 1002 is terminated, which deactivates the sequencing circuit 1008. Deactivation of the sequencing circuit 1008 causes the safety control assembly 1003 to be concomitantly deactivated at time tT. Upon deactivation, the safety control assembly 1003 exerts its stored counterforce to return the safety lever 1202A of the dual-position safety selector switch 1202 to the "safe" position. Therefore, subsequent to time tT the weapon 1200 is in a disarmed condition, and is not ready to and cannot be fired except in response to another internal command signal 1002.

The delay-time circuit 1086 illustrated in FIG. 21B is preferably a four position DIP switch connected to the microcontroller 1090. When the DIP switch is moved to an "on" position, the DIP switch grounds the internal pull-ups creating a logic zero. In accordance with this preferred operation, the "on" position of the DIP switch creates a logic zero and the "off" position of the DIP switch creates a logic one. Additional toggle switches included on the DIP switch are manipulated by the time-delay selector 1710 installed in the weapon controller mechanism 1007. Manipulation of these toggle switches results in selection of a delay time for the sequencing circuit 1008.

Referring again to FIG. 22A, timeline C illustrates the effect of the pre-selected delay time lag DT upon the activation of the trigger control assembly 1005 in relation to the activation of the sequencing circuit 1008. As described above, the sequencing circuit 1008 is activated at time t0, or once the weapon firing circuit 20 has transmitted the internal command signal pulse 1002 to the sequencing circuit 1008. The pre-selected delay time DT defined in the sequencing circuit 1008 delays the activation of the trigger control assembly 1005 until time t1, where time t1 equals the pre-selected delay time DT pre-selected by the operator via the time delay selector 1710.

Notice that timeline C is depicted as incomplete in FIG. 22A where tD illustrates a representative deactivation time for the trigger control assembly 1005. This is because, in some alternative embodiments, the deactivation of the trigger control assembly 1005 by the operation the sequencing circuit 1008 is independent of internal command signal pulse 1002, as described hereinabove. Rather, operation of the sequencing circuit 1008 to deactivate the trigger control assembly 1005 is governed by the setting of the firing-mode selector 1740. Such setting(s) concomitantly define(s) the configuration and operation of the firing-period circuit 1088 included in the sequencing circuit 1008. Accordingly, in alternative embodiments, the deactivation time tD of the trigger control assembly 1005 has a variable value defined by operator inputs via the firing-mode selector 1740, and the burst selector 1735, if applicable. Preferable embodiments include a deactivation time that is instantaneous and occurs after the trigger is actuated.

The firing-period circuit 1088 is interfaced with the firing-mode selector 1740 and is operative to define the time span of the firing period for the pre-selected firing mode for the mechanically triggered weapon 1200 by the active components and/or elements coupled to by means of the firing-mode selector 1735. The firing period is synonymous with the operating period of the trigger control assembly 1005, i.e., the period of time during which the trigger 1204 is mechanically displaced and maintained in the "fire" position. Concomitantly, the end of the firing period determines the deactivation time tD for the trigger control assembly 1005. That is, at the end of the firing period, the trigger control assembly 1005 is automatically deactivated by operation of the sequencing circuit 1008, which causes the trigger control assembly 1005 to exert its stored counterforce to return the trigger 1204 to the "neutral" position.

Figure 22B:
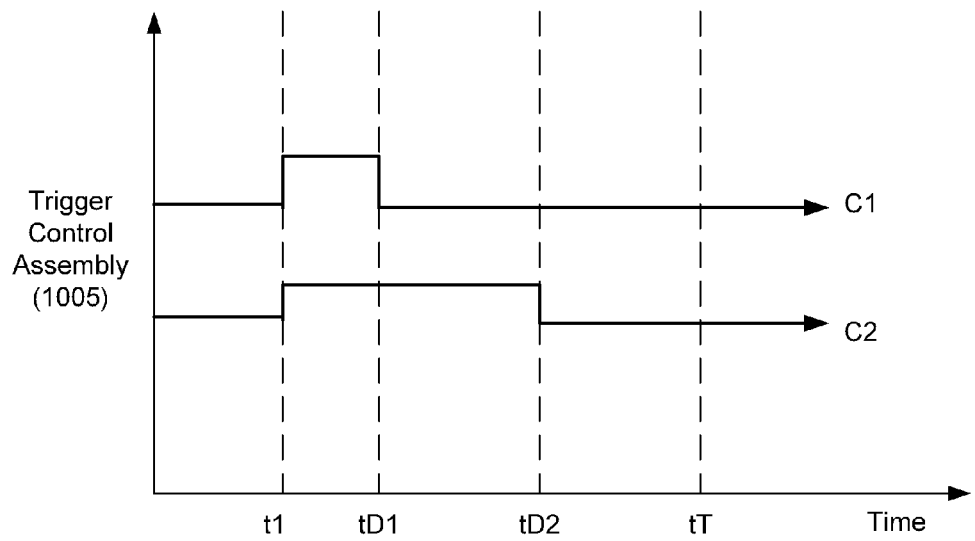

FIG. 22B depicts the operating state timelines C1, C2 of the trigger control assembly 1005 for the embodiment of the firing-mode circuit 1088 that defines a deactivation time tD having a constant value. Operating state timeline C1 illustrates the operation of the trigger control assembly 1005 when the pre-selected firing mode is a single round—the trigger assembly 1005 is actuated at time t1 and deactivated at time tD1 where the time t1→tD1 is the firing period required to "fire" a single round. Operating state timeline C3 illustrates the operation of the trigger control assembly 1005 when the pre-selected firing mode is a multiple round burst of three rounds—the trigger assembly 1005 is actuated at time t1 and at deactivated at time tD2 where the time t1→tD2 is the firing period required to "fire" a three-round burst (the firing period for timeline C2, i.e., t1→tD2, is approximately three times as long as the firing period for timeline C1, i.e., t1→tD1).

For the embodiment of the firing mode circuit 1088 that defines a deactivation time tD that has a variable value, the operating state timeline C has a deactivation time tD that is greater than the deactivation time tD1 (number of rounds "fired" in a multiple-round burst must be two or more) but less than the deactivation time tT of the sequencing circuit 1008 (to prevent operating conflicts between the safety control assembly 1003 and the trigger control assembly 1005 as described hereinabove). Thus, the trigger control assembly 1005 is activated at time t1 and is deactivated prior to time tT; i.e., the variable value of the deactivation time tD for the trigger control assembly 1005 is a discrete integer value of N within the range tD1<tD<tT where N defines the number of rounds included in the multiple-round burst, and where N is a pre-determined value selected by the operator via each of the single or burst mode selector 1740 and the preset selector 1741. In such a version, the preset selector 1741 may be connected to the mechanically triggered weapon 1200 such that it could control additional actuators dedicated to choosing the number of N rounds included in a multiple-round burst. Alternatively, in other weapons 1200 where the number of N rounds in the multiple-round burst is determined by the length of time the trigger 1204 remains in a "fire" position, the firing period selector 1705 may be used to choose the number of N rounds included in the multiple-round burst.

The microcontroller 1090 functions as the interface between the delay-time circuit 1086 of the sequencing circuit 1008 and the FET switch 1092. The micro controller 1090 is operative to control the operation of the FET switch 1092 by: (1) using the pre-selected delay time lag DT defined by the time-delay circuit 1086 to activate the FET switch 1092; and (2) using the firing period (deactivation time tD) defined by firing-mode circuit 1088 as the signal to deactivate the FET switch 1092. The microcontroller 1090 illustrated in the exemplary embodiment of the sequencing circuit 1008 shown in FIG. 21B is an Atmel AVR family ATMEGA48V-10PI micro controller.

The FET switch 1092 functions as the interface between the microcontroller 1090 and the trigger control assembly 1005 and is operative to amplify the current output from the micro controller 1090 to a value sufficient to operate the trigger control assembly 1005. The FET switch 1092 is operative, in response to the activation signal generated by the micro controller 1090, to couple the amplified current to the trigger control assembly 1005 for the activation thereof. The FET switch 1092 is further operative, in response to the deactivation signal generated by the microcontroller 1090, to terminate the current flowing to the trigger control assembly 1005, thereby deactivating the trigger control assembly 1005.

Figure 30:
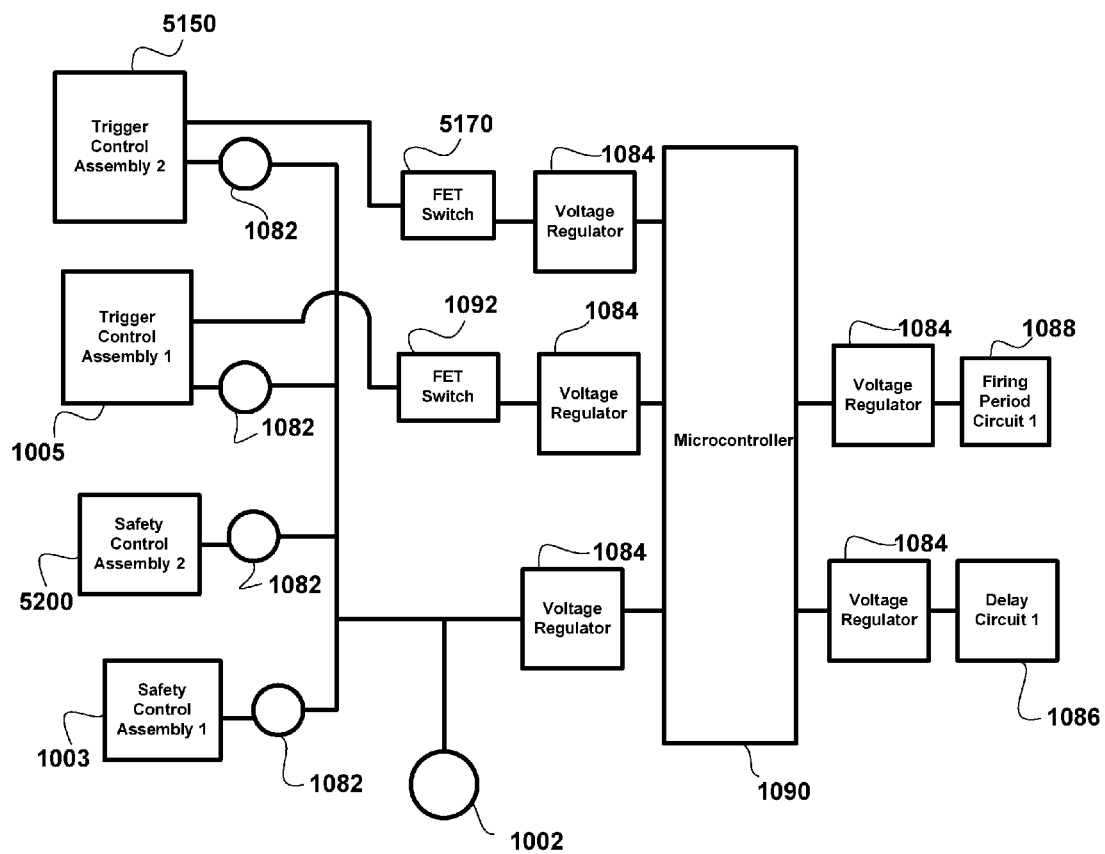
FIG. 30 is a schematic representation of an alternative sequencing circuit.

An alternative embodiment to the preferred sequencing circuit 1008 illustrated in FIG. 21B is illustrated in FIG. 30. This embodiment includes a sequencing circuit 1008 that can interface with and control the operation of two mechanically triggered weapons mounted on a robotic platform 1010. These weapons require an additional trigger control assembly 5150 and safety control assembly 5200, each responding to an internal command signal pulse 1002 to fire the additional weapon in unison with the first weapon. Implementation of the second trigger control assembly 5150 uses an additional FET switch 5170, while the second safety control assembly 5200 can be controlled using the same circuitry of the first safety control assembly 1003. Activation of the sequencing circuit 1008 will cause both safety control assemblies 1003, 5200 to unsafe the respective mechanically triggered weapons, and each trigger control assembly 1005, 5150 to activate the trigger of their respective weapons according to the parameters defined by the firing period circuits 1088 and the time delay circuit 1086. This alternative embodiment can be further altered to provide the circuitry necessary to accommodate more than two weapons. Furthermore, the embodiment can further provide safety control assemblies and trigger control assemblies operative to respond to individual command signals. Such an embodiment may allow multiple mechanically triggered weapons on the robotic platform to be fired individually rather than simultaneously.

An alternative to the embodiment displayed in FIG. 30, is an embodiment wherein the weaponized robotic platform 1000 includes two firing circuits, which are connected to the sequencing circuit 1008 to provide two different internal command signal pulses. This embodiment includes a microcontroller 1090 operative to simultaneously un-safe and trigger the mechanically triggered weapons in response to outputs from the two firing circuits.

Figure 31A:
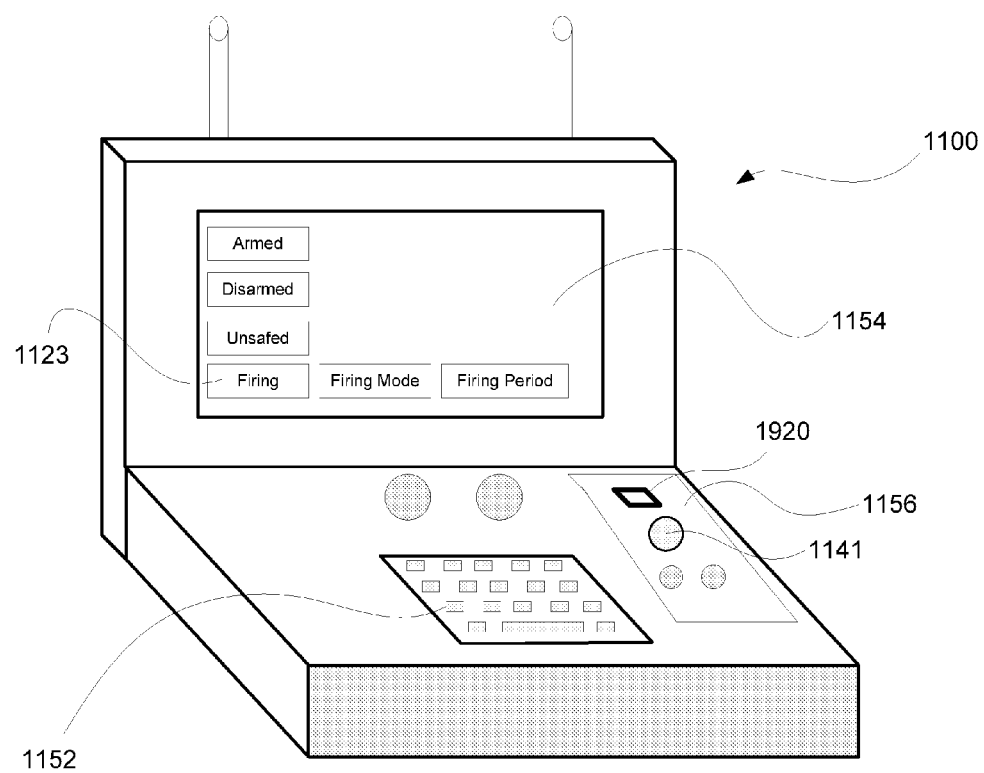
FIG. 31A illustrates an exemplary operator control unit.
Figure 31B:
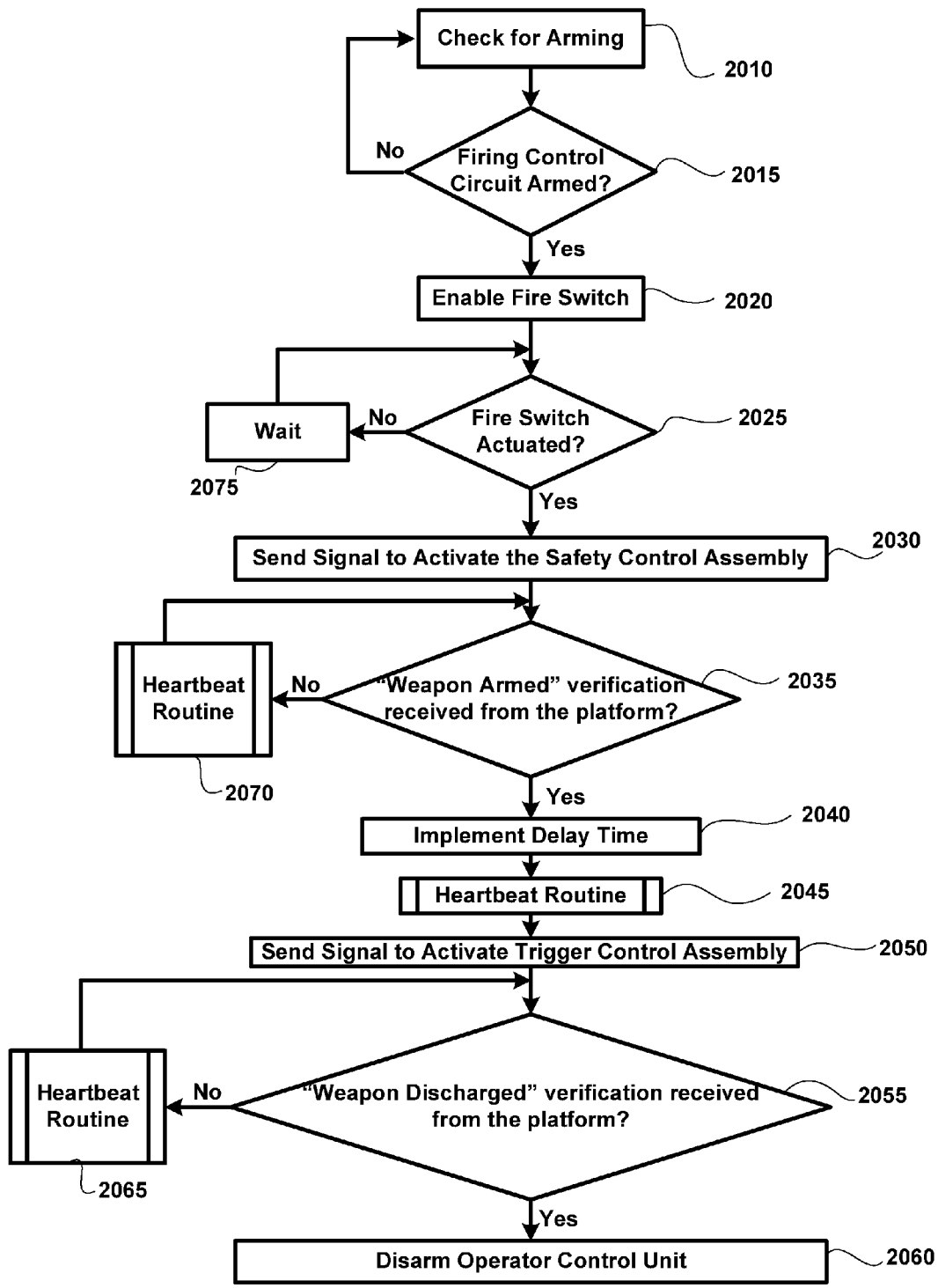
FIG. 31B and 31C illustrate schematic diagrams of methods in accordance with the present teachings.

Illustrated in FIGS. 31A and 31B are another alternative to the preferred system of the sequencing circuit 1008 and the firing circuit 20. This version of the system includes an operator control unit 1100 with a central control system 1120 that can house a software routine that implements the steps carried out by the sequencing circuit 1008 and further send commands to the communication system 1125 included in the operator control unit 1100 based on output from the sequencing routine. Illustrated in FIG. 31A is an operator control unit 1100 that includes a firing control circuit 1140 for firing a mechanically triggered weapon 1200 mounted onto a robotic platform 1010. The operator control unit 1100 must be armed to have the ability to remotely operate the safety control assembly 1003 and the trigger control assembly 1005 to fire the mechanically triggered weapon 1200. Arming the operator control unit 1100 requires the operator to insert the key 40 into the panel receiving cavity 1920 on the operator control unit 1100 and further turns the key 40 to arm the OC unit 1100. Alternatively, an additional button may be included on the firing control panel 1156 so that the OC unit 1100 becomes armed when the operator inserts the key 40 into the panel receiving cavity 1920 on the operator control unit 1100 and presses a button included on the control panel 1156, and which arms the OC unit 1100 when a proper key 40 is present. While this method of arming the operator control unit 1100 is described in relation to this particular alternative embodiment, either method may be used in the preferred as well as other versions of the remote firing system.

Further referring to FIG. 31A, also included on the firing control panel 1156 is a firing button 1141 that becomes operable when the operator control unit 1100 is armed. Preferably, the button 1141 becomes operable once the operator control unit 1100 is armed, and further interacts with circuitry within the operator control unit 1100 to send a signal to the firing circuit 20 included on the platform 1010 when the button 1141 is depressed. In the preferred version, the firing circuit 20 receives the signal sent from the operator control unit 1100 and further causes the sequencing circuit 1008 to activate the safety control assembly 1003 and further the trigger control assembly 1005 to discharge the weapon 1200. Other versions may include a firing circuit 20 that includes a sequencing component such that the firing circuit 20 may control the safety control assembly 1003 and the trigger control assembly 1005. In such an embodiment, the firing circuit 20 receives the signal from the OC unit 1100 sent on actuation of the firing button 1141, and further activates the safety control assembly 1003 and the trigger control assembly 1005 in a process substantially similar to the process carried out by the sequencing circuit 1008, to discharge the weapon 1200.

The alternative version illustrated in FIG. 31A includes a firing button 1141 that operates in combination with associated circuitry to send a signal to the operator control unit's central control system 1120 when the button 1141 is actuated. Such a version further includes a button 1141 that sends a signal to the central control system 1120 only when the operator control unit 1100 is armed. This restriction may be implemented using a FET switch to control the circuitry associated with the button 1141, or further using logic routines able to control transmission of a signal associated with actuation of the button 1141. When the central control system 1120 receives the signal that includes a logic flag indicating that the button was depressed 1141, the contents of the signal are passed on to a sequencing routine included in the central control system 1120.

FIG. 31B illustrates a sequencing routine that implements the steps carried out by the sequencing circuit 1008 on the operator control unit 1100. When a signal is received by the operator control unit's control system 1120 indicating that the firing button 1141 has been actuated, the sequencing routine is implemented. Step 2010 of the routine checks whether the OC unit 1100 is armed by polling the circuitry associated with the firing control panel 1156 to determine whether a key is present in the receiving cavity 1920 and whether actions have been taken to arm the OC unit 1100. These actions can include any one of turning the key 40, depressing an additional button or switch, or inputting a command into the OC unit 1100 indicating that the OC unit 1100 should arm itself. Buttons can include a switch, lever, button, or soft button included on the display screen 1154 and which function in response to a force applied to the screen in the area where the button is located, being interpreted as an action representative of depressing the button. When the OC unit 1100 is not armed 2015, then the routine continues to check to see whether the OC unit 1100 is armed. Otherwise, when the OC unit 1100 is armed 2015, the routine then enables the fire switch 1141 and checks the status of the switch 1141 to determine whether the switch 1141 has been actuated 2025. The routine waits 2075 until the fire switch 1141 is actuated, and when the button 1141 is actuated, the routine then commands the central control system 1120 to generate a signal 2030 to be sent by the communication system 1125 to the platform 1010. When such a signal is received by the platform 1010, the control system 1020 on the platform 1010 relays the signal to the safety control assembly 1003 where the signal is interpreted as a command to activate the safety control assembly 1003.

Upon receiving a signal command to activate the safety control assembly 1003, the control system 1020 included on the robotic platform 1010 obtains feedback data from feedback circuits 1378 connected to the safety control assembly 1003, and generates a "weapon armed" verification signal when data from the feedback circuits 1378 indicates that the safety control assembly 1003 is armed. This "weapon armed" verification signal is then transmitted via the communication system 1024 to the operator control unit 1100, where the signal is relayed to the sequencing routine. When the routine obtains a "weapon armed" verification signal, the routine then moves on to step 2040 and implements a delay time lag. When the routine fails to obtain a return "weapon armed" verification signal, the routine then polls the heartbeat routine 2070 illustrated in FIG. 14 and which transmits and receives test data packets to the robotic platform 1010 to determine whether or not the communication link between the operator control unit 1100 and the robotic platform 1010 exists and has a signal strength above a minimum threshold value. When the heartbeat routine 2070 fails to verify a robust communication link between the operator control unit 1100 and the robotic platform 1010, the sequencing routine times out and further disarms the operator control unit 1100 as illustrated in FIG. 31C.

Step 2040 implements a time lag, meaning that the routine waits a predetermined period of time before sending a signal to activate the trigger control assembly 1005. The delay time included in the preferred sequencing circuit 1008 is configured to wait no less than the amount of time necessary for the weapon's trigger 1204 to respond to the unsafing of the safety lever 1202A. This delay time lag is included in the sequencing circuit 1008 to mimic the mechanical delay that occurs between the time the weapon 1200 is unsafed and the time the trigger 1204 is operable to actuate and fire the weapon 1200. The delay time implemented 2040 by the sequencing routine also mimics the minimum amount of time necessary to overcome this mechanical delay. The length of the delay time lag can be altered by the user using either actuators included on the firing control panel 1156 or by inputting numerical values into the sequencing routine.

Before activating the trigger control assembly step 2050, the sequencing routine again calls the heartbeat routine 2045 illustrated in FIG. 14. This routine ensures that there is a strong communication link between the operator control unit 1100 and the robotic platform 1010. Should the heartbeat routine 2045 establish that there is not a strong communication link, the sequencing routine will time out, meaning that the sequencing routine will disarm the operator control unit 1100 and end the sequencing routine as illustrated in FIG. 31C. Where there is a robust communication link between the robot 1010 and the OC unit 1100, the sequencing routine generates a command signal that is sent by the communication system 1125 to the robotic platform 1010 where it is further transmitted to the trigger control assembly 1005. The trigger control assembly 1005 interprets the signal as a command to activate, and further operate the trigger 1204 to fire the weapon 1200. The trigger control assembly 1005 can further be connected to a logic gate array circuit (not shown), microcontroller, or other processing circuit able to input logic values and operate the trigger control assembly 1005 according to such values. This logic gate array circuit may further control the length of time the trigger 1204 is actuated according to a time value passed to the circuit via the command signal sent by the OC unit 1100. The firing time is then further configured via actuators and software routines included on the OC unit 1100. Alternatively, the firing mode and the firing period can be configured via controls included on a weapon controller 1007 connected to the robotic platform 1010. The robotic platform 1010 sends a "weapon discharged" verification signal back to the operator control unit 1100 when the trigger control assembly 1005 finishes actuating the weapon's trigger 1204. The operator control unit 1100 initiates the heartbeat routine 2065 to verify communication with the robotic platform 1010 when no verification signal is received 2055. Should the heartbeat routine fail to establish a signal, the sequencing routine then disarms the operator control unit 1100 and exits the sequencing routine as illustrated in FIG. 31C. When the "weapon discharged" verification signal is received, the sequencing routine then disarms the operator control unit 1100 and exits the sequencing routine.

Figure 31C:
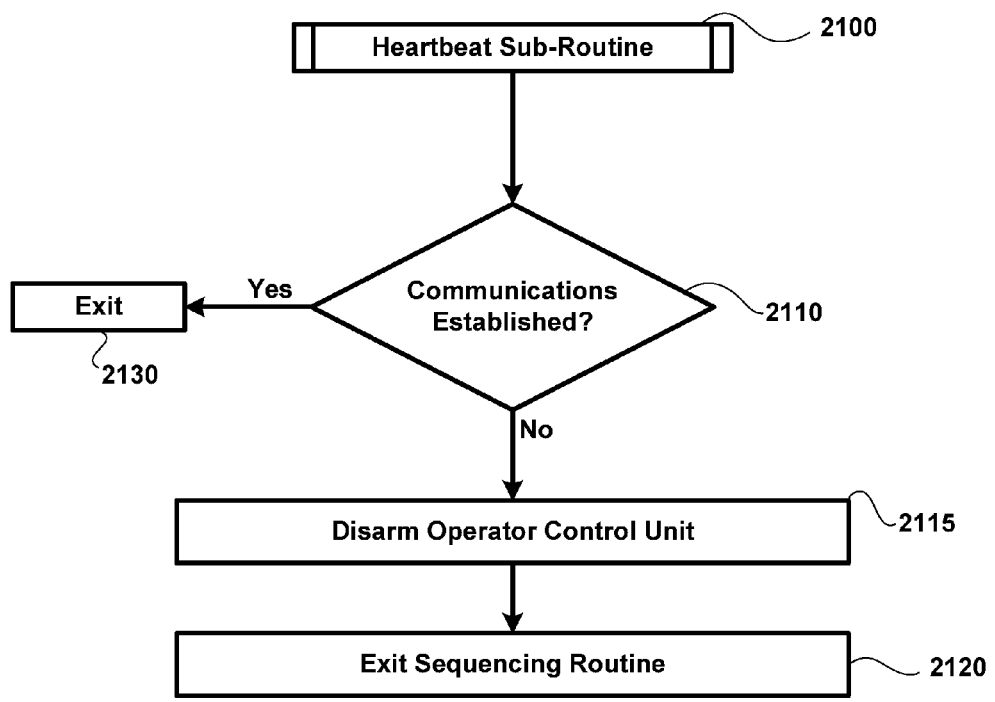

Illustrated in FIG. 31C is a heartbeat routine that implements the routine illustrated in FIG. 14 as a heartbeat subroutine 2100. When communications are verified as being established 2110, the heartbeat routine exits 2130 and returns to the sequencing routine illustrated in FIG. 31B. When communications are not verified as being established 2110, the routine then disarms the operator control unit 2115 and exits the sequencing routine 2120.

Preferably the operator control unit 1100 includes a display screen 1154 able to display the status of the operator control unit 1100 and the firing control panel 1156. In particular, graphics 1123 included on the screen may respond to statuses in the sequencing routine such that they indicate whether the operator control unit 1100 is armed, whether the safety control assembly 1003 on the robot 1010 is "safe" or "unsafe", the firing period and the firing mode of the trigger control assembly 1005, and whether or not the weapon 1200 has discharged. Alternatively, the graphics 1123 may include soft keys able to generate commands when depressed, such as a command to arm the operator control unit 1100, or a command to fire the weapon 1200.

What is claimed is:

1. A method for firing a weapon mounted on a robotic platform, comprising:
   receiving a control code sent by an operator control unit to the robotic platform;
   validating the control code;
   arming a firing circuit when the control code is valid;
   transmitting a signal to a sequencing circuit configured to control a mechanical control assembly connected to the weapon; and operating the mechanical control assembly with the sequencing circuit to arm a disarmed weapon, wait until a delay period has elapsed, trigger the weapon, and disarm the weapon,
   wherein validating the control codes include determining whether the control codes were encoded with a key programmed by the robotic platform.

2. The method of claim 1, wherein disarming the weapon includes removing a force from a spring included in the mechanical control assembly, and permitting a trigger disposed on the weapon to return to a start position.

3. The method of claim 2, wherein disarming the weapon further includes:
removing a force from another spring included in the mechanical control assembly; and
permitting a safety latch disposed on the weapon to return to a safe position.

4. The method of claim 1, wherein waiting until the delay period has elapsed comprises implementing a time lag after which the weapon is triggered.

5. The method of claim 4, wherein the duration of the time lag is selected by an operator of the robotic platform.

6. The method of claim 5, further comprising selecting the time lag by actuating a time delay selector.

7. The method of claim 4, wherein the time lag is defined by a delay circuit of the sequencing circuit.

8. The method of claim 4, wherein the time lag represents a delay that can occur between a time a signal is sent to arm the weapon and a time when a safety of the mechanical control assembly is completely disengaged to arm the weapon.

9. The method of claim 4, wherein the time lag represents a delay that can occur between a time a signal is sent to arm the weapon and a time when a trigger of the weapon is operable to actuate and fire the weapon.

10. The method of claim 1, wherein waiting until the delay period has elapsed ensures that a safety control assembly of the weapon has disengaged before the weapon is triggered.

11. A method for firing a weapon mounted on a robotic platform, comprising:
transmitting a signal to a sequencing circuit configured to control a mechanical control assembly connected to the weapon; and
operating the mechanical control assembly with the sequencing circuit to arm the weapon; wait until a time delay period has elapsed, the time delay period representing a delay that can occur between a time a signal is sent to arm the weapon and a time when a trigger of the weapon is operable to actuate and fire the weapon; and trigger the weapon; and
validating control codes before transmitting the signal to the sequencing circuit, wherein validating the control codes includes determining whether the control codes were encoded with a key programmed by the robotic platform.

12. The method of claim 11, further comprising disarming the weapon after triggering the weapon, wherein disarming the weapon includes removing a force from a spring included in the mechanical control assembly to permit a trigger disposed on the weapon to return to a start position.

13. The method of claim 11, wherein waiting until the time delay period has elapsed comprises implementing a time lag after which the weapon is triggered.

14. The method of claim 13, wherein the duration of the time lag is selected by an operator of the robotic platform.

15. The method of claim 14, further comprising selecting the time lag by actuating a time delay selector.

16. The method of claim 14, wherein the time lag is defined by a delay circuit of the sequencing circuit.

17. The method of claim 14, wherein the time lag represents a delay that can occur between a time a signal is sent to arm the weapon and a time when a trigger of the weapon is operable to actuate and fire the weapon.

18. The method of claim 11, wherein waiting until the time delay period has elapsed ensures that a safety control assembly of the weapon has disengaged before the weapon is triggered.

* * * * *